(12) United States Patent
Streater

(10) Patent No.: US 12,382,136 B2
(45) Date of Patent: Aug. 5, 2025

(54) METHODS FOR GENERATING VIDEOS, AND RELATED SYSTEMS AND SERVERS

(71) Applicant: BLACKBIRD PLC, London (GB)

(72) Inventor: Stephen Streater, London (GB)

(73) Assignee: BLACKBIRD PLC, London (GB)

( * ) Notice: Subject to any disclaimer, the term of this patent is extended or adjusted under 35 U.S.C. 154(b) by 121 days.

(21) Appl. No.: 18/263,450

(22) PCT Filed: Jan. 31, 2022

(86) PCT No.: PCT/GB2022/050256
§ 371 (c)(1),
(2) Date: Jul. 28, 2023

(87) PCT Pub. No.: WO2022/162400
PCT Pub. Date: Aug. 4, 2022

(65) Prior Publication Data
US 2024/0314396 A1    Sep. 19, 2024

(30) Foreign Application Priority Data

Jan. 29, 2021    (GB) ..................................... 2101285

(51) Int. Cl.
*H04N 21/466* (2011.01)
*H04N 21/262* (2011.01)
*H04N 21/45* (2011.01)
*H04N 21/482* (2011.01)

(52) U.S. Cl.
CPC ... *H04N 21/4668* (2013.01); *H04N 21/26258* (2013.01); *H04N 21/4532* (2013.01); *H04N 21/4826* (2013.01)

(58) Field of Classification Search
CPC ......... H04N 21/4668; H04N 21/26258; H04N 21/4532; H04N 21/4826
See application file for complete search history.

(56) References Cited

U.S. PATENT DOCUMENTS

| 8,151,194 B1* | 4/2012 | Chan ........................ G06F 3/01 709/224 |
| 9,465,435 B1* | 10/2016 | Zhang ................ H04N 21/8549 |
| 2006/0253542 A1* | 11/2006 | McCausland ........... H04L 51/04 709/207 |
| 2011/0107369 A1 | 5/2011 | Obrien et al. |
| 2014/0082209 A1* | 3/2014 | Moorer .............. H04N 21/2668 709/231 |

(Continued)

OTHER PUBLICATIONS

International Search Report, dated Jul. 11, 2022, issued in International Application No. PCT/GB2022/050256.

*Primary Examiner* — Thai Q Tran
*Assistant Examiner* — Jose M Mesa
(74) *Attorney, Agent, or Firm* — Saul Ewing LLP

(57) ABSTRACT

There is provided a computer-implemented method of generating a personalized video for a user, which is edited from an original video, e.g. using information collected about other users' preferences regarding the original video, to generate an Edit Decision List (EDL) defining the edits for the original video, and providing video output including the original video edited by the EDL. Related computer-implemented methods, systems, servers, user terminals and computer program products are provided.

20 Claims, 14 Drawing Sheets

(56) References Cited

U.S. PATENT DOCUMENTS

2016/0381257 A1* 12/2016 Kuo ................. H04N 23/45
                                                  348/38
2019/0057722 A1*  2/2019 Key ............. H04N 21/25866
2020/0195982 A1   6/2020 Streater et al.

* cited by examiner

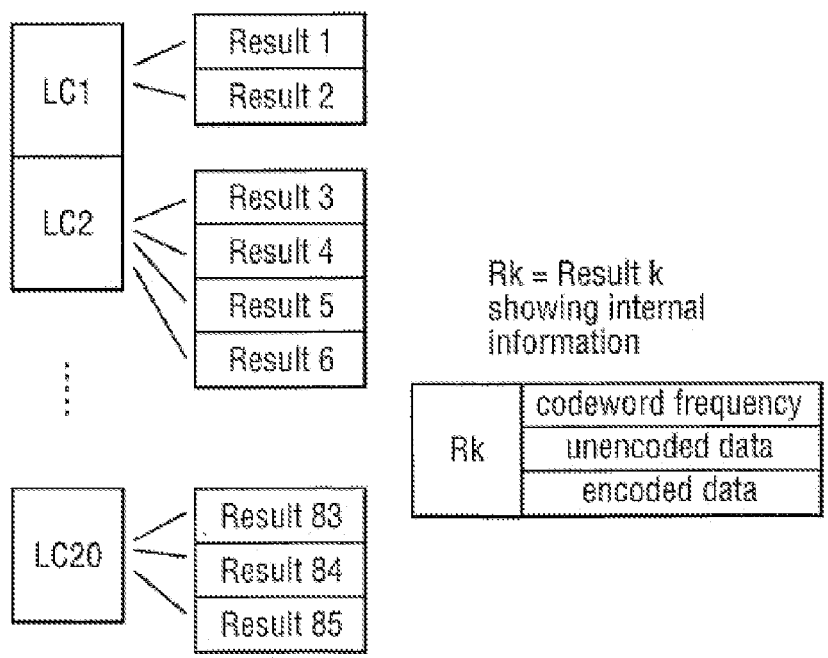

FIG. 7
Cuts encoding

| | Context | Result |
|---|---|---|
| Shape encoding: | CUT_CW | RLE of consecutive uniform blocks / Non-uniform shape |
| YUV encoding: | YUV from previous frame & whether current mini-block is uniform | YUV for mini-block |

FIG. 8
Delta encoding

| | Context | Result |
|---|---|---|
| Shape encoding: | Shape of corresponding mini-block on previous frame & which of the four neighbours on previous frame were uniform | Shape of mini-block |
| YUV encoding: | YUV from previous frame & whether current mini-block is uniform | YUV for mini-block |

METHODS FOR GENERATING VIDEOS, AND RELATED SYSTEMS AND SERVERS

CROSS-REFERENCE TO RELATED APPLICATIONS

This application claims the priority of International Application No. PCT/GB2022/050256 filed Jan. 31, 2022, which claims priority to GB Application No. 2101285.1, filed Jan. 29, 2021, the entire contents of which being fully incorporated herein by reference.

BACKGROUND OF THE INVENTION

1. Field of the Invention

The field of the invention relates to computer-implemented methods for generating videos from other videos, and to related systems, servers, user terminals and computer program products.

2. Technical Background

In 2019, it was reported that more than 500 hours of content were being uploaded to the popular video viewing site, YouTube, every minute, and that the average person could spend their entire lifetime trying to watch all the content uploaded to YouTube in just one day. Therefore there is a need for improved methods which enable viewers of videos to access content which is relevant to them, without having to watch a lot of content with lower relevance or no relevance to them.

In 2019 it was also reported that YouTube's videos were being watched at the rate of about 173,000 hours per minute, which compares with the 500 hours of content that were being uploaded to YouTube every minute. Such large amounts of video watching imply correspondingly large amounts of power consumption, by servers, data transmission apparatus, and user terminals. What is further needed is a way to enable viewers of videos to access content which is relevant to them, with reduced amounts of power consumption, which may reduce associated environmental damage, such as by greenhouse gas emissions associated with electrical power generation.

3. Discussion of Related Art

At present, the MPEG video standards are the typical standards used to generate video clips.

In the applicant's view, MPEG is a poor standard for generating edited and editable video clips for distribution, in an energy-efficient way, since every frame in a region of an MPEG file must be decompressed before frame-by-frame editing can be performed, even when only some frames are required, such as during navigation and rough cut. After editing has been performed, the new MPEG file must again be compressed before it can be distributed. And the new MPEG file must be compressed in its entirety before it can be distributed. And multiple versions of the compressed file need to be generated, so that they can be provided as appropriate, based for example on viewing device screen size and the available bandwidth for transmission to the viewing device. Even in high performance systems, the uploading of an MPEG video clip for distribution can take about as long as the duration of the clip itself, and the upload time can be unpredictable, because it may depend on load rates on the available networks. The various versions of the MPEG video clip then need to be uploaded to a content provider, which takes even more time. The MPEG files then need to be downloaded for viewing, which also takes time. And all these processes require electrical energy.

There is a problem in that if a large number of personalized videos were to be created using the MPEG standard, this would require a large amount of energy to be consumed. There is a need for ways of generating and playing personalized videos, using a lower amount of energy.

Regarding technical disclosures in relation to video files and video file editing, reference may be had to EP1738365B1, WO2005101408A1, U.S. Pat. No. 8,255,802B2, WO2005048607A1, U.S. Pat. No. 9,179,143B2, U.S. Pat. No. 8,711,944B2, WO2007077447A2, U.S. Pat. No. 8,660,181B2, WO2017021688A1, WO2018127695A2 and to WO2018197911A1, which are incorporated by reference.

SUMMARY OF THE INVENTION

According to a first aspect of the invention, there is provided a computer-implemented method of providing a personalized video, the method including the steps of:
  (i) receiving one or more video files;
  (ii) converting the one or more video files into a compressed format structure;
  (iii) storing the compressed format structure on a first server;
  (iv) receiving a request from a user of a user terminal to provide in a web browser executing on the user terminal, or in a video player executing on the user terminal, a personalized video play corresponding to a personalized video defined by the compressed format structure and a personalized electronic edit decision list;
  (v) accessing a profile of the user of the user terminal;
  (vi) accessing a record corresponding to the compressed format structure, the record including a record of respective portions of the compressed format structure corresponding to respective portions of video that have been selected by respective other users;
  (vii) accessing profiles of the respective other users, and identifying which respective other users' profiles most closely match the profile of the user;
  (viii) identifying portions of the compressed format structure corresponding to the respective portions of video which have been selected by the respective other users whose profiles most closely match the profile of the user;
  (ix) generating a personalized electronic edit decision list which generates from the compressed format structure a personalized video which provides respective portions of the one or more videos which have been selected by the respective other users whose profiles most closely match the profile of the user, and storing the personalized electronic edit decision list e.g. on the first server or on a second server, or on the user terminal;
  (x) sending or providing to the web browser code executable in the web browser, or to the video player code executable in the video player, to provide the personalized video play corresponding to the personalized video defined by the compressed format structure stored on the first server and the personalized electronic edit decision list e.g. stored on the first server or on the second server, or on the user terminal, and
  (xi) responding to requests from the code when executing in the web browser or in the video player, to provide content corresponding to the compressed format structure stored on the first server, in accordance with the personalized electronic edit decision list, e.g. stored on the first server or on the second server, or on the user terminal, to the web browser or to the video player, to provide the personalized video play.

An advantage of the method is that a personalized video is provided, in response to a user request, without transmitting an entire video file to a web browser, or to a video player, on a user terminal. An advantage of the method is that a personalized video is provided, using portions of one or more original videos, that are statistically more likely to be of interest to the viewer, than the one or more original videos. An advantage of the method is that a personalized video is provided, in which a reduced amount of data is transmitted to the user terminal, than for transmitting the one or more original videos, or for transmitting the one or more videos in the compressed format structure. An advantage is reduced energy usage.

The method may be one wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that a personalized video is provided, in which a reduced amount of data is transmitted to the user terminal. An advantage is that the compressed format structure enables the personalized video to be provided very quickly.

The method may be one wherein the compressed format structure includes loss free compression. An advantage is high quality of the personalized video.

The method may be one in which the loss free compression includes use of Transition Tables. An advantage is high quality of the personalized video.

The method may be one wherein the user can share the personalized EDL with another user.

The method may be one wherein the personalized electronic edit decision list is generated according to a user selected duration of the personalized video, by using respective portions of the one or more videos which have been selected by the respective other users whose profiles most closely match the profile of the user, to provide the user selected duration of the personalized video. An advantage is a customizable video.

The method may be one wherein the personalized electronic edit decision list is generated according to a user selected proportion (e.g. a percentage) of the duration of the one or more videos, by using respective portions of the one or more videos which have been selected by the respective other users whose profiles most closely match the profile of the user, to provide the user selected proportion (e.g. a percentage) of the duration of the personalized video. An advantage is a customizable video.

The method may be one in which one or more advertisements are selected for inclusion in the personalized video play, according to the user profile.

The method may be one in which the one or more advertisements are selected using an artificial intelligence (AI) system which uses the user profile as an input.

The method may be one in which the video Player supports click through, allowing viewers to click and order online, while the video Player waits to resume.

The method may be one wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

The method may be one wherein the method reduces global emissions of $CO_2$ compared to prior art methods, which is environmentally beneficial.

The method may be one wherein the user terminal is a desktop computer, or a laptop computer, or a smart TV, or a smartphone, or a tablet computer, or a smartwatch.

A user profile may include one or more of: a username, a user physical address, a user e-mail address, a user mobile telephone number, a history of videos viewed by the user, a list of videos viewed by the user, a list of search terms used by the user, a photograph of the user, an age of the user, a user name, videos the user has shared, videos the user has paid for, knowledge or expertise of the user.

According to a second aspect of the invention, there is provided a system including a server and a user terminal, the system configured to play a personalized video, wherein:

(i) the server is configured to receive one or more video files;

(ii) the server is configured to convert the one or more video files into a compressed format structure;

(iii) the server is configured to store the compressed format structure;

(iv) the server is configured to receive a request from a user of the user terminal to provide in a web browser executing on the user terminal, or in a video player executing on the user terminal, a personalized video play corresponding to a personalized video defined by the compressed format structure and a personalized electronic edit decision list;

(v) the server is configured to access a profile of the user of the user terminal;

(vi) the server is configured to access a record corresponding to the compressed format structure, the record including a record of respective portions of the compressed format structure corresponding to respective portions of video that have been selected by respective other users;

(vii) the server is configured to access profiles of the respective other users, and to identify which respective other users' profiles most closely match the profile of the user;

(viii) the server is configured to identify portions of the compressed format structure corresponding to the respective portions of video which have been selected by the respective other users whose profiles most closely match the profile of the user;

(ix) the server is configured to generate a personalized electronic edit decision list which generates from the compressed format structure a personalized video which provides respective portions of the one or more videos which have been selected by the respective other users whose profiles most closely match the profile of the user, and to store the personalized electronic edit decision list on the server, or on the user terminal;

(x) the server is configured to send or to provide to the web browser code executable in the web browser, or to the video player code executable in the video player, to provide the personalized video play corresponding to the personalized video defined by the compressed format structure stored on the server and the personalized electronic edit decision list stored on the server, or on the user terminal, and (xi) the server is configured to respond to requests from the code when executing in the web browser or in the video player, to provide content corresponding to the compressed format structure stored on the first server, in accordance with the personalized electronic edit decision list, to the web browser or to the video player, to provide the personalized video play.

The system may be configured to perform a method of any aspect of the first aspect of the invention.

According to a third aspect of the invention, there is provided a computer-implemented method of providing a personalized video, the method including the steps of:

(i) receiving one or more video files;

(ii) converting the one or more video files into a compressed format structure;

(iii) storing the compressed format structure on a first server;

(iv) storing on the first server metadata which characterizes portions of the one or more video files by viewing statistics;

(v) receiving a request from a user of a user terminal to provide in a web browser executing on the user terminal, or in a video player executing on the user terminal, a personalized video play corresponding to a personalized video defined by the compressed format structure and a personalized electronic edit decision list;

(vi) receiving a user-defined metric which defines a personalization metric to be used to provide the personalized video;

(vii) accessing the metadata which characterizes portions of the one or more video files by viewing statistics, and using the metadata to identify the portions of the one or more video files which best match the user-defined metric;

(viii) using the identified portions of the one or more video files to identify portions of the compressed format structure corresponding to the identified portions of the one or more video files which best match the user-defined metric;

(ix) generating the personalized electronic edit decision list which generates from the compressed format structure a personalized video which provides the identified portions of the one or more video files which best match the user-defined metric, and storing the personalized electronic edit decision list e.g. on the first server or on a second server, or on the user terminal;

(x) sending or providing to the web browser code executable in the web browser, or to the video player code executable in the video player, to provide the personalized video play corresponding to the personalized video defined by the compressed format structure stored on the first server and the personalized electronic edit decision list e.g. stored on the first server or on the second server, or on the user terminal, and (xi) responding to requests from the code when executing in the web browser or in the video player, to provide content corresponding to the compressed format structure stored on the first server, in accordance with the personalized electronic edit decision list, e.g. stored on the first server or on the second server, or on the user terminal, to the web browser or to the video player, to provide the personalized video play.

An advantage of the method is that a personalized video is provided, in response to receiving a user-defined metric, without transmitting an entire video file to a web browser, or to a video player, on a user terminal. An advantage of the method is that a personalized video is provided, using portions of one or more original videos, that are statistically more likely to be of interest to the viewer, than the one or more original videos. An advantage of the method is that a personalized video is provided, in which a reduced amount of data is transmitted to the user terminal, than for transmitting the one or more original videos, or for transmitting the one or more videos in the compressed format structure. An advantage is a customizable video. An advantage is reduced energy usage.

The method may be one wherein metadata which characterizes portions of the one or more video files by viewing statistics relate to one or more of: the most watched content; the least skipped content; the most engaged-with content; the most shared content.

The method may be one wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that a personalized video is provided, in which a reduced amount of data is transmitted to the user terminal. An advantage is that the compressed format structure enables the personalized video to be provided very quickly.

The method may be one wherein the video player uses a microphone and/or video camera to monitor and to measure user engagement while the user watches videos, and wherein the video player uses the measured user engagement of the user to choose which portions of a video file best match the measured user engagement, and generates an EDL to show the portions of a video file which best match the measured user engagement, and then plays a personalized video using the EDL. An advantage of the method is that a personalized video is provided, using portions of one or more original videos, that are statistically more likely to be of interest to the viewer, than the one or more original videos.

The method may be one wherein the user can share the personalized EDL with another user.

The method may be one wherein the compressed format structure includes loss free compression. An advantage is high quality of the personalized video.

The method may be one in which the loss free compression includes use of Transition Tables. An advantage is high quality of the personalized video.

The method may be one wherein the personalized electronic edit decision list is generated according to a user selected duration of the personalized video, by using respective portions of the one or more videos which best match the user-defined metric, to provide the user selected duration of the personalized video. An advantage is a customizable video.

The method may be one wherein the personalized electronic edit decision list is generated according to a user selected proportion (e.g. a percentage) of the duration of the one or more videos, by using respective portions of the one or more videos which best match the user-defined metric, to provide the user selected proportion (e.g. a percentage) of the duration of the personalized video. An advantage is a customizable video.

The method may be one in which one or more advertisements are selected for inclusion in the personalized video play, according to the user-defined metric.

The method may be one in which the one or more advertisements are selected using an artificial intelligence (AI) system which uses the user-defined metric as an input.

The method may be one in which the video Player supports click through, allowing viewers to click and order online, while the video Player waits to resume.

The method may be one wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

The method may be one wherein the method reduces global emissions of CO2 compared to prior art methods, which is environmentally beneficial.

The method may be one wherein the user terminal is a desktop computer, or a laptop computer, or a smart TV, or a smartphone, or a tablet computer, or a smartwatch.

According to a fourth aspect of the invention, there is provided a system including a server and a user terminal, the system configured to play a personalized video, wherein:
(i) the server is configured to receive one or more video files;
(ii) the server is configured to convert the one or more video files into a compressed format structure;
(iii) the server is configured to store the compressed format structure;
(iv) the server is configured to store metadata which characterizes portions of the one or more video files by viewing statistics;
(v) the server is configured to receive a request from the user terminal to provide in a web browser executing on the user terminal, or in a video player executing on the user terminal, a personalized video play corresponding to a personalized video defined by the compressed format structure and a personalized electronic edit decision list;
(vi) the server is configured to receive a user-defined metric which defines a personalization metric to be used to provide the personalized video;
(vii) the server is configured to access the metadata which characterizes portions of the one or more video files by viewing statistics, and to use the metadata to identify the portions of the one or more video files which best match the user-defined metric;
(viii) the server is configured to use the identified portions of the one or more video files to identify portions of the compressed format structure corresponding to the identified portions of the one or more video files which best match the user-defined metric;
(ix) the server is configured to generate the personalized electronic edit decision list which generates from the compressed format structure a personalized video which provides the identified portions of the one or more video files which best match the user-defined metric, and to store the personalized electronic edit decision list on the server, or on the user terminal;
(x) the server is configured to send or to provide to the web browser code executable in the web browser, or to the video player code executable in the video player, to provide the personalized video play corresponding to the personalized video defined by the compressed format structure stored on the server and the personalized electronic edit decision list, and
(xi) the server is configured to respond to requests from the code when executing in the web browser or in the video player, to provide content corresponding to the compressed format structure stored on the server, in accordance with the personalized electronic edit decision list, to the web browser or to the video player, to provide the personalized video play.

The system may be configured to perform a method of any aspect of the third aspect of the invention.

According to a fifth aspect of the invention, there is provided a computer-implemented method of providing a personalized video, the method including the steps of:
(i) receiving a plurality of video files;
(ii) converting the plurality of video files each into a compressed format structure;
(iii) storing the plurality of video files each in the compressed format structure on a first server;
(iv) storing on the first server metadata which characterizes portions of the plurality of video files by content type;
(v) a video player executing on a user terminal using a microphone and/or video camera of the user terminal to monitor and to measure user engagement while the user watches videos using the video player, and storing the measured user engagement of the user on the user terminal;
(vi) the video player executing on the user terminal identifying the content types with the highest user engagement, using the metadata and the stored measured user engagement of the user;
(vii) the video player executing on the user terminal selecting a video for display, based on a match between the identified content types with the highest user engagement, with a video including content corresponding to the identified content types with the highest user engagement, based on metadata of the video; and
(viii) the video player displaying the selected video, or offering to display the selected video.

An advantage of the method is that a personalized video is provided, which is statistically more likely to be of interest to the viewer, than a video selected at random. An advantage of the method is that a personalized video is provided, in which a reduced amount of data is transmitted to the user terminal, than for transmitting randomly selected videos which are rejected by the viewer, or for transmitting the randomly selected videos in the compressed format structure which are rejected by the viewer. An advantage is reduced energy usage, because a reduced amount of data is transmitted and played on the user terminal, compared to transmitting randomly selected videos.

The method may be one wherein the video player uses the identified content types with the highest user engagement to choose which portions of the video file best match the measured user engagement, and to generate a personalized electronic edit decision list, wherein the personalized electronic edit decision list generates from the compressed format structure a personalized video which provides the chosen portions of the video file which best match the measured user engagement, and storing the personalized electronic edit decision list e.g. stored on the user terminal;
the video player executing code to provide the personalized video play corresponding to a personalized video defined by the compressed format structure stored on the first server and the personalized electronic edit decision list e.g. stored on the user terminal, and responding to requests from the code when executing in the video player, to provide content corresponding to the compressed format structure stored on the first server, in accordance with the personalized electronic edit decision list, e.g. stored on the user terminal, to the video player, to provide the personalized video play.

An advantage of the method is that a personalized video is provided, using portions of an original video, that are statistically more likely to be of interest to the viewer, than the original video. An advantage of the method is that a personalized video is provided, in which a reduced amount of data is transmitted to the user terminal, than for transmitting the original video, or for transmitting the video in the compressed format structure. An advantage is reduced energy usage.

The method may be one wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that a personalized video is provided, in which a reduced amount of data is transmitted to the user terminal. An advantage is that the compressed format structure enables the personalized video to be provided very quickly.

The method may be one wherein the user can share the personalized EDL with another user.

The method may be one wherein the compressed format structure includes loss free compression. An advantage is high quality of the personalized video.

The method may be one wherein the loss free compression includes use of Transition Tables. An advantage is high quality of the personalized video.

The method may be one wherein the personalized electronic edit decision list is generated according to a user selected duration of the personalized video, by using respective portions of the video which best match the measured user engagement of the user, to provide the user selected duration of the personalized video. An advantage is a customizable video.

The method may be one wherein the personalized electronic edit decision list is generated according to a user selected proportion (e.g. a percentage) of the duration of the video, by using respective portions of the videos which best match the measured user engagement of the user, to provide the user selected proportion (e.g. a percentage) of the duration of the personalized video. An advantage is a customizable video.

The method may be one wherein one or more advertisements are selected for inclusion in the personalized video play, according to the identified content types with the highest user engagement.

The method may be one in which the one or more advertisements are selected using an artificial intelligence (AI) system which uses the identified content types with the highest user engagement as an input.

The method may be one in which the video Player supports click through, allowing viewers to click and order online, while the video Player waits to resume.

The method may be one wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

The method may be one wherein the method reduces global emissions of $CO_2$ compared to prior art methods, which is environmentally beneficial.

The method may be one wherein the user terminal is a desktop computer, or a laptop computer, or a smart TV, or a smartphone, or a tablet computer, or a smartwatch.

According to a sixth aspect of the invention, there is provided a system including a server and a user terminal, the system configured to display or to offer to display a selected video, wherein:

(i) the server is configured to receive a plurality of video files;

(ii) the server is configured to convert the plurality of video files each into a compressed format structure;

(iii) the server is configured to store the plurality of video files each in the compressed format structure;

(iv) the server is configured to store metadata which characterizes portions of the plurality of video files by content type;

(v) the user terminal is configured to execute a video player, to use a microphone and/or video camera of the user terminal to monitor and to measure user engagement while the user watches videos using the video player, and to store the measured user engagement of the user on the user terminal;

(vi) the user terminal is configured to execute the video player to identify the content types with the highest user engagement, using the metadata stored on the server and the stored measured user engagement of the user;

(vii) the user terminal is configured to execute the video player to select a video for display, based on a match between the identified content types with the highest user engagement, with a video stored on the server, the video stored on the server including content corresponding to the identified content types with the highest user engagement, based on metadata of the video; and (viii) the user terminal is configured to execute the video player to display the selected video, or to offer to display the selected video.

The system may be one configured to perform a method of any aspect of the fifth aspect of the invention.

According to a seventh aspect of the invention, there is provided a computer-implemented method of providing a personalized video, the method including the steps of:

(i) receiving one or more video files;

(ii) converting the one or more video files into a compressed format structure;

(iii) storing the compressed format structure on a first server;

(iv) receiving a request from a user of a user terminal to provide in a web browser executing on the user terminal, or in a video player executing on the user terminal, a personalized video play corresponding to a personalized video defined by the compressed format structure and a personalized electronic edit decision list;

(v) accessing a record corresponding to the compressed format structure, the record including a record of respective portions of the compressed format structure corresponding to respective portions of video that have been selected by respective other users;

(vi) identifying portions of the compressed format structure corresponding to the respective portions of video which have been selected by the respective other users;
(vii) generating a personalized electronic edit decision list which generates from the compressed format structure a personalized video which provides respective portions of the one or more videos which have been selected by the respective other users, and storing the personalized electronic edit decision list e.g. on the first server or on a second server, or on the user terminal;
(viii) sending or providing to the web browser code executable in the web browser, or to the video player code executable in the video player, to provide the personalized video play corresponding to the personalized video defined by the compressed format structure stored on the first server and the personalized electronic edit decision list e.g. stored on the first server or on the second server, or on the user terminal, and (ix) responding to requests from the code when executing in the web browser or in the video player, to provide content corresponding to the compressed format structure stored on the first server, in accordance with the personalized electronic edit decision list, e.g. stored on the first server or on the second server, or on the user terminal, to the web browser or to the video player, to provide the personalized video play.

An advantage of the method is that a personalized video is provided, without transmitting one or more entire video files to a web browser, or to a video player, on a user terminal. An advantage of the method is that a personalized video is provided, using portions of one or more original videos, that have been selected to be likely of interest to the viewer, than the one or more original videos. An advantage of the method is that a personalized video is provided, in which a reduced amount of data is transmitted to the user terminal, than for transmitting the one or more original videos, or for transmitting the one or more videos in the compressed format structure. An advantage is a customized video. An advantage is reduced energy usage.

The method may be applied to one or more videos of a business meeting.

The method may be one wherein the method includes the step of receiving a selection of a combination of the other users' designations of interesting or useful content, and using the selection to identify the portions of the compressed format structure corresponding to the respective portions of video which have been selected by the respective other users. An advantage of the method is that a personalized video is provided, using portions of one or more original videos, that are have been selected to be more likely of interest to the viewer, than the one or more original videos. An advantage is reduced energy usage.

The method may be one wherein the method includes the step of receiving a selection of a topic to filter, and using the selection to exclude portions of the compressed format structure corresponding to the respective portions of video which correspond to the selected topic to filter, to modify the personalized electronic edit decision list to exclude the excluded portions of the compressed format structure. An advantage of the method is that a personalized video is provided, using portions of one or more original videos, that are have been selected to be more likely of interest to the viewer, than the one or more original videos. An advantage is reduced energy usage.

The method may be one wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that a personalized video is provided, in which a reduced amount of data is transmitted to the user terminal. An advantage is that the compressed format structure enables the personalized video to be provided very quickly.

The method may be one wherein the user can share the personalized EDL with another user.

The method may be one wherein the compressed format structure includes loss free compression. An advantage is high quality of the personalized video.

The method may be one in which the loss free compression includes use of Transition Tables. An advantage is high quality of the personalized video.

The method may be one wherein the personalized electronic edit decision list is generated according to a user selected duration of the personalized video, by using respective portions of the one or more videos which have been selected by the respective other users, to provide the user selected duration of the personalized video. An advantage is a customizable video.

The method may be one wherein the personalized electronic edit decision list is generated according to a user selected proportion (e.g. a percentage) of the duration of the one or more videos, by using respective portions of the one or more videos which have been selected by the respective other users, to provide the user selected proportion (e.g. a percentage) of the duration of the personalized video. An advantage is a customizable video.

The method may be one in which one or more advertisements are selected for inclusion in the personalized video play, according to the respective portions of video that have been selected by respective other users.

The method may be one in which the one or more advertisements are selected using an artificial intelligence (AI) system which uses the respective portions of video that have been selected by respective other users as an input.

The method may be one in which the video Player supports click through, allowing viewers to click and order online, while the video Player waits to resume.

The method may be one wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

The method may be one wherein the method reduces global emissions of $CO_2$ compared to prior art methods, which is environmentally beneficial.

The method may be one wherein the user terminal is a desktop computer, or a laptop computer, or a smart TV, or a smartphone, or a tablet computer, or a smartwatch.

According to an eighth aspect of the invention, there is provided a system including a server and a user terminal, the system configured to play a personalized video, wherein:
(i) the server is configured to receive one or more video files;
(ii) the server is configured to convert the one or more video files into a compressed format structure;

(iii) the server is configured to store the compressed format structure;

(iv) the server is configured to receive a request from a user terminal to provide in a web browser executing on the user terminal, or in a video player executing on the user terminal, a personalized video play corresponding to a personalized video defined by the compressed format structure and a personalized electronic edit decision list (v) the server is configured to access a record corresponding to the compressed format structure, the record including a record of respective portions of the compressed format structure corresponding to respective portions of video that have been selected by respective other users;

(vi) the server is configured to identify portions of the compressed format structure corresponding to the respective portions of video which have been selected by the respective other users;

(vii) the server is configured to generate a personalized electronic edit decision list which generates from the compressed format structure a personalized video which provides respective portions of the one or more videos which have been selected by the respective other users, and to store the personalized electronic edit decision list on the server, or on the user terminal;

(viii) the server is configured to send or to provide to the web browser code executable in the web browser, or to the video player code executable in the video player, to provide the personalized video play corresponding to the personalized video defined by the compressed format structure stored on the server and the personalized electronic edit decision list, and (ix) the server is configured to respond to requests from the code when executing in the web browser or in the video player, to provide content corresponding to the compressed format structure stored on the server, in accordance with the personalized electronic edit decision list, to the web browser or to the video player, to provide the personalized video play.

The system may be configured to perform a method of any aspect of the seventh aspect of the invention.

According to a ninth aspect of the invention, there is provided a computer-implemented method of providing a personalized video, the method including the steps of:

(i) receiving one or more video files;

(ii) converting the one or more video files into a compressed format structure;

(iii) storing the compressed format structure on a first server;

(iv) storing on the first server metadata which characterizes portions of the one or more video files by types of content;

(v) receiving a request from a user of a user terminal to provide in a web browser executing on the user terminal, or in a video player executing on the user terminal, a video play corresponding to a video defined by the compressed format structure and an electronic edit decision list;

(vi) receiving from the user an indication of a content type to be skipped during the video play;

(vii) accessing the metadata to identify portions of the video file which include the indicated content type to be skipped during the video play, and modifying the electronic edit decision list so as to exclude the portions of the compressed format structure corresponding to the video file which include the indicated content type to be skipped;

(viii) storing the modified electronic edit decision list e.g. on the first server or on a second server, or on the user terminal;

(ix) sending or providing to the web browser code executable in the web browser, or to the video player code executable in the video player, to provide the video play corresponding to the video defined by the compressed format structure stored on the first server and the modified electronic edit decision list e.g. stored on the first server or on the second server, or on the user terminal, and (x) responding to requests from the code when executing in the web browser or in the video player, to provide content corresponding to the compressed format structure stored on the first server, in accordance with the modified electronic edit decision list e.g. stored on the first server or on the second server, or on the user terminal, to the web browser or to the video player, to provide the video play.

An advantage of the method is that a personalized video is provided, in response to receiving a user selection, without transmitting one or more entire video files to a web browser, or to a video player, on a user terminal. An advantage of the method is that a personalized video is provided, using portions of one or more original videos, that are implicitly more likely to be of interest to the viewer, than the one or more original videos. An advantage of the method is that a personalized video is provided, in which a reduced amount of data is transmitted to the user terminal, than for transmitting the one or more original videos, or for transmitting the one or more videos in the compressed format structure. An advantage is a customizable video. An advantage is reduced energy usage.

The method may be one wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that a personalized video is provided, in which a reduced amount of data is transmitted to the user terminal. An advantage is that the compressed format structure enables the personalized video to be provided very quickly.

The method may be one wherein the indication of the content type to be skipped during the video play is or includes an indication of a portion of the video to be skipped, which corresponds to the content type to be skipped. An advantage of the method is that a personalized video is provided, using portions of one or more original videos, that are implicitly more likely to be of interest to the viewer, than the one or more original videos.

The method may be one wherein the indication of the content type to be skipped during the video play is or includes a selection of a content type to be skipped from a menu of content types (e.g. in a drop-down menu). An advantage of the method is that a personalized video is provided, using portions of one or more original videos, that are implicitly more likely to be of interest to the viewer, than the one or more original videos.

The method may be one wherein the modification to the EDL is performed by a video player executing on the client computer. An advantage is that the EDL may be modified very quickly.

The method may be one wherein the user can share the modified EDL with another user.

The method may be one in which the compressed format structure includes loss free compression. An advantage is high quality of the personalized video.

The method may be one in which the loss free compression includes use of Transition Tables. An advantage is high quality of the personalized video.

The method may be one wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

The method may be one wherein the method reduces global emissions of CO2 compared to prior art methods, which is environmentally beneficial.

The method may be one wherein the user terminal is a desktop computer, or a laptop computer, or a smart TV, or a smartphone, or a tablet computer, or a smartwatch.

According to a tenth aspect of the invention, there is provided a system including a server and a user terminal, the system configured to play a video, wherein:
  (i) the server is configured to receive one or more video files;
  (ii) the server is configured to convert the one or more video files into a compressed format structure;
  (iii) the server is configured to store the compressed format structure;
  (iv) the server is configured to store metadata which characterizes portions of the one or more video files by types of content;
  (v) the server is configured to receive a request from a user of the user terminal to provide in a web browser executing on the user terminal, or in a video player executing on the user terminal, a video play corresponding to a video defined by the compressed format structure and an electronic edit decision list;
  (vi) the server is configured to receive from the user of the user terminal an indication of a content type to be skipped during the video play;
  (vii) the server is configured to access the metadata to identify portions of the one or more video files which include the indicated content type to be skipped during the video play, and to modify the electronic edit decision list so as to exclude the portions of the compressed format structure corresponding to the one or more video files which include the indicated content type to be skipped;
  (viii) the server is configured to store the modified electronic edit decision list;
  (ix) the server is configured to send or to provide to the web browser code executable in the web browser, or to the video player code executable in the video player, to provide the video play corresponding to the video defined by the compressed format structure stored on the first and the modified electronic edit decision list, and
  (x) the server is configured to respond to requests from the code when executing in the web browser or in the video player, to provide content corresponding to the compressed format structure stored on the server, in accordance with the modified electronic edit decision list, to the web browser or to the video player, to provide the video play.

The system may be configured to perform the method of any aspect of the ninth aspect of the invention.

According to an eleventh aspect of the invention, there is provided a computer-implemented method of providing a personalized video, the method including the steps of:
  (i) receiving one or more video files;
  (ii) converting the one or more video files into a compressed format structure;
  (iii) storing the compressed format structure on a first server;
  (iv) storing on the first server metadata which characterizes portions of the one or more video files by types of content;
  (v) receiving from the user an indication of a content type to be included during a video play;
  (vi) accessing the metadata to identify portions of the one or more video files which include the indicated content type to be included during the video play, and generating a personalized electronic edit decision list so as to include the portions of the compressed format structure corresponding to the one or more video files which include the indicated content type to be included;
  (vii) storing the personalized electronic edit decision list e.g. on the first server or on a second server, or on the user terminal;
  (viii) receiving a request from a user to provide in a web browser executing on a user terminal, or in a video player executing on a user terminal, a personalized video play corresponding to a video defined by the compressed format structure and the personalized electronic edit decision list;
  (ix) sending or providing to the web browser code executable in the web browser, or to the video player code executable in the video player, to provide the personalized video play corresponding to the video defined by the compressed format structure stored on the first server and the personalized electronic edit decision list e.g. stored on the first server or on the second server, or on the user terminal, and
  (x) responding to requests from the code when executing in the web browser or in the video player, to provide content corresponding to the compressed format structure stored on the first server, in accordance with the personalized electronic edit decision list e.g. stored on the first server or on the second server, or on the user terminal, to the web browser or to the video player, to provide the personalized video play.

An advantage of the method is that a personalized video is provided, in response to receiving a user selection, without transmitting one or more entire video files to a web browser, or to a video player, on a user terminal. An advantage of the method is that a personalized video is provided, using portions of one or more original videos, that are selected to be more likely to be of interest to the viewer, than the one or more original videos. An advantage of the method is that a personalized video is provided, in which a reduced amount of data is transmitted to the user terminal, than for transmitting the one or more original videos, or for transmitting the videos in the compressed format structure. An advantage is a customizable video. An advantage is reduced energy usage.

The method may be one wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that a personalized video is provided, in which a reduced amount of data is transmitted to the user terminal. An advantage is that the compressed format structure enables the personalized video to be provided very quickly.

The method may be one wherein the indication of the content type to be included during the video play is or includes an indication of a portion of the video to be included, which corresponds to the content type to be included. An advantage of the method is that a personalized video is provided, using portions of one or more original videos, that are selected to be more likely to be of interest to the viewer, than the one or more original videos.

The method may be one wherein the indication of the content type to be included during the video play is or includes a selection of a content type to be included from a menu of content types (e.g. in a drop-down menu). An advantage of the method is that a personalized video is provided, using portions of one or more original videos, that are selected to be more likely to be of interest to the viewer, than the one or more original videos.

The method may be one wherein the generation of the EDL is performed by a video player executing on the client computer. An advantage is that the EDL may be generated very quickly.

The method may be one wherein the user can share the generated EDL with another user.

The method may be one in which the compressed format structure includes loss free compression. An advantage is high quality of the personalized video.

The method may be one in which the loss free compression includes use of Transition Tables. An advantage is high quality of the personalized video.

The method may be one in which one or more advertisements are selected for inclusion in the personalized video play, according to the indicated content type to be included during the video play.

The method may be one in which the one or more advertisements are selected using an artificial intelligence (AI) system which uses the indicated content type to be included during the video play as an input.

The method may be one in which the video Player supports click through, allowing viewers to click and order online, while the video Player waits to resume.

The method may be one wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

The method may be one wherein the method reduces global emissions of $CO_2$ compared to prior art methods, which is environmentally beneficial.

The method may be one wherein the user terminal is a desktop computer, or a laptop computer, or a smart TV, or a smartphone, or a tablet computer, or a smartwatch.

According to a twelfth aspect of the invention, there is provided a system including a server and a user terminal, the system configured to play a personalized video, wherein:
 (i) the server is configured to receive one or more video files;
 (ii) the server is configured to convert the one or more video files into a compressed format structure;
 (iii) the server is configured to store the compressed format structure;
 (iv) the server is configured to storing metadata which characterizes portions of the one or more video files by types of content;
 (v) the server is configured to receive from the user of the user terminal an indication of a content type to be included during a video play;
 (vi) the server is configured to access the metadata to identify portions of the one or more video files which include the indicated content type to be included during the video play, and to generate a personalized electronic edit decision list so as to include the portions of the compressed format structure corresponding to the one or more video files which include the indicated content type to be included;
 (vii) the server is configured to store the personalized electronic edit decision list;
 (viii) the server is configured to receive a request from a user of the user terminal to provide in a web browser executing on the user terminal, or in a video player executing on the user terminal, a personalized video play corresponding to a video defined by the compressed format structure and the personalized electronic edit decision list;
 (ix) the server is configured to send or to provide to the web browser code executable in the web browser, or to the video player code executable in the video player, to provide the personalized video play corresponding to the video defined by the compressed format structure stored on the server and the personalized electronic edit decision list, and
 (x) the server is configured to respond to requests from the code when executing in the web browser or in the video player, to provide content corresponding to the compressed format structure stored on the server, in accordance with the personalized electronic edit decision list, to provide the personalized video play.

The system of may be configured to perform a method of any aspect of the eleventh aspect of the invention.

According to a thirteenth aspect of the invention, there is provided a computer-implemented method of providing a personalized video, the method including the steps of:
 (i) receiving one or more video files;
 (ii) converting the one or more video files into a compressed format structure;
 (iii) storing the compressed format structure on a first server;
 (iv) storing on the first server metadata which characterizes portions of the one or more video files by types of content;
 (v) receiving from the user an indication of a content type to be excluded during a video play;
 (vi) accessing the metadata to identify portions of the video file which exclude the indicated content type to be excluded during the video play, and generating a personalized electronic edit decision list so as to exclude the portions of the compressed format structure corresponding to the one or more video files which exclude the indicated content type to be excluded;

(vii) storing the personalized electronic edit decision list e.g. on the first server or on a second server, or on the user terminal;

(viii) receiving a request from a user to provide in a web browser executing on a user terminal, or in a video player executing on a user terminal, a personalized video play corresponding to a video defined by the compressed format structure and the personalized electronic edit decision list;

(ix) sending or providing to the web browser code executable in the web browser or in the video player to provide the personalized video play corresponding to the video defined by the compressed format structure stored on the first server and the personalized electronic edit decision list e.g. stored on the first server or on the second server, or on the user terminal, and (x) responding to requests from the code when executing in the web browser or in the video player, to provide content corresponding to the compressed format structure stored on the first server, in accordance with the personalized electronic edit decision list e.g. stored on the first server or on the second server, or on the user terminal, to the web browser or to the video player, to provide the personalized video play.

An advantage of the method is that a personalized video is provided, in response to receiving a user selection, without transmitting one or more entire video files to a web browser, or to a video player, on a user terminal. An advantage of the method is that a personalized video is provided, using portions of one or more original videos, that are selected to be more likely to be of interest to the viewer, than the one or more original videos. An advantage of the method is that a personalized video is provided, in which a reduced amount of data is transmitted to the user terminal, than for transmitting the one or more original videos, or for transmitting the one or more videos in the compressed format structure. An advantage is a customizable video. An advantage is reduced energy usage.

The method may be one wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that a personalized video is provided, in which a reduced amount of data is transmitted to the user terminal. An advantage is that the compressed format structure enables the personalized video to be provided very quickly.

The method may be one wherein the indication of the content type to be excluded during the video play is or includes an indication of a portion of the one or more videos to be excluded, which corresponds to the content type to be excluded. An advantage of the method is that a personalized video is provided, using portions of one or more original videos, that are selected to be more likely to be of interest to the viewer, than the one or more original videos.

The method may be one wherein the indication of the content type to be excluded during the video play is or includes a selection of a content type to be excluded from a menu of content types (e.g. in a drop-down menu). An advantage of the method is that a personalized video is provided, using portions of one or more original videos, that are selected to be more likely to be of interest to the viewer, than the one or more original videos.

The method may be one wherein the generation of the EDL is performed by a video player executing on the client computer. An advantage is that the EDL may be generated very quickly.

The method may be one wherein the user can share the generated EDL with another user.

The method may be one in which the compressed format structure includes loss free compression. An advantage is high quality of the personalized video.

The method may be one in which the loss free compression includes use of Transition Tables. An advantage is high quality of the personalized video.

The method may be one wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

The method may be one wherein the method reduces global emissions of $CO_2$ compared to prior art methods, which is environmentally beneficial.

The method may be one wherein the user terminal is a desktop computer, or a laptop computer, or a smart TV, or a smartphone, or a tablet computer, or a smartwatch.

According to a fourteenth aspect of the invention, there is provided a system including a server and a user terminal, the system configured to play a personalized video, wherein:

(i) the server is configured to receive one or more video files;

(ii) the server is configured to convert the one or more video files into a compressed format structure;

(iii) the server is configured to store the compressed format structure;

(iv) the server is configured to store metadata which characterizes portions of the one or more video files by types of content;

(v) the server is configured to receive from the user an indication of a content type to be excluded during a video play;

(vi) the server is configured to access the metadata to identify portions of the one or more video files which exclude the indicated content type to be excluded during the video play, and to generate a personalized electronic edit decision list so as to exclude the portions of the compressed format structure corresponding to the one or more video files which exclude the indicated content type to be excluded;

(vii) the server is configured to store the personalized electronic edit decision list;

(viii) the server is configured to receive a request from a user to provide in a web browser executing on a user terminal, or in a video player executing on a user terminal, a personalized video play corresponding to a video defined by the compressed format structure and the personalized electronic edit decision list;

(ix) the server is configured to send or to provide to the web browser code executable in the web browser or in the video player to provide the personalized video play corresponding to the video defined by the compressed format structure stored on the first server and the personalized electronic edit decision list, and (x) the server is configured to respond to requests from the code when executing in the web browser or in the video player, to provide content corresponding to the compressed format structure stored on the first server, in accordance with the personalized electronic edit decision list, to the web browser or to the video player, to provide the personalized video play.

The system may be configured to perform a method of any aspect of the thirteenth aspect of the invention.

According to a fifteenth aspect of the invention, there is provided a computer-implemented method of providing a personalized video, the method including the steps of:

(i) receiving a plurality of video files;
(ii) converting the plurality of video files each into a compressed format structure;
(iii) storing the compressed format structures of the plurality of videos on a first server;
(iv) storing on the first server metadata which characterizes portions of the plurality of video files by types of content;
(v) receiving from the user an indication of a content type to be included during a video play;
(vi) accessing the metadata to identify portions of the plurality of video files which include the indicated content type to be included during the video play, and generating a personalized electronic edit decision list so as to include the portions of the compressed format structures corresponding to the plurality of video files which include the indicated content type to be included;
(vii) storing the personalized electronic edit decision list e.g. on the first server or on a second server, or on the user terminal;
(viii) receiving a request from a user to provide in a web browser executing on a user terminal, or in a video player executing on a user terminal, a personalized video play corresponding to a video defined by the compressed format structure and the personalized electronic edit decision list;
(ix) sending or providing to the web browser code executable in the web browser, or to the video player code executable in the video player, to provide the personalized video play corresponding to the video defined by the compressed format structures stored on the first server and the personalized electronic edit decision list e.g. stored on the first server or on the second server, or on the user terminal, and
(x) responding to requests from the code when executing in the web browser or in the video player, to provide content corresponding to the compressed format structures stored on the first server, in accordance with the personalized electronic edit decision list e.g. stored on the first server or on the second server, or on the user terminal, to the web browser or to the video player, to provide the personalized video play.

An advantage of the method is that a personalized video is provided, in response to receiving a user selection, without transmitting entire video files to a web browser, or to a video player, on a user terminal. An advantage of the method is that a personalized video is provided, using portions of original videos, that are selected to be more likely to be of interest to the viewer, than the original videos. An advantage of the method is that a personalized video is provided, in which a reduced amount of data is transmitted to the user terminal, than for transmitting the original videos, or for transmitting the personalized video in the compressed format structure. An advantage is a customizable video. An advantage is reduced energy usage.

The method may be one wherein the method is used in a Security and Surveillance application. An advantage is improved Security and Surveillance.

The method may be one wherein the compressed format structures include a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that a personalized video is provided, in which a reduced amount of data is transmitted to the user terminal. An advantage is that the compressed format structure enables the personalized video to be provided very quickly.

The method may be one wherein the indication of the content type to be included during the video play is or includes an indication of a portion of the video to be included, which corresponds to the content type to be included. An advantage of the method is that a personalized video is provided, using portions of original videos, that are selected to be more likely to be of interest to the viewer, than the original videos.

The method may be one wherein the indication of the content type to be included during the video play is or includes a selection of a content type to be included from a menu of content types (e.g. in a drop-down menu). An advantage of the method is that a personalized video is provided, using portions of original videos, that are selected to be more likely to be of interest to the viewer, than the original videos.

The method may be one wherein the generation of the EDL is performed by a video player executing on the client computer. An advantage is that the EDL may be generated very quickly.

The method may be one wherein the user can share the generated EDL with another user.

The method may be one in which the compressed format structure includes loss free compression. An advantage is high quality of the personalized video.

The method may be one in which the loss free compression includes use of Transition Tables. An advantage is high quality of the personalized video.

The method may be one in which one or more advertisements are selected for inclusion in the personalized video play, according to the indicated content type to be included during the video play.

The method may be one in which the one or more advertisements are selected using an artificial intelligence (AI) system which uses the indicated content type to be included during the video play as an input.

The method may be one in which the video Player supports click through, allowing viewers to click and order online, while the video Player waits to resume.

The method may be one wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

The method may be one wherein the method reduces global emissions of CO2 compared to prior art methods, which is environmentally beneficial.

The method may be one wherein the user terminal is a desktop computer, or a laptop computer, or a smart TV, or a smartphone, or a tablet computer, or a smartwatch.

According to a sixteenth aspect of the invention, there is provided a system including a server and a user terminal, the system configured to play a personalized video, wherein:
- (i) the server is configured to receive a plurality of video files;
- (ii) the server is configured to convert the plurality of video files each into a compressed format structure;
- (iii) the server is configured to store the compressed format structures of the plurality of videos on a first server;
- (iv) the server is configured to store on the first server metadata which characterizes portions of the plurality of video files by types of content;
- (v) the server is configured to receive from the user an indication of a content type to be included during a video play;
- (vi) the server is configured to access the metadata to identify portions of the plurality of video files which include the indicated content type to be included during the video play, and to generate a personalized electronic edit decision list so as to include the portions of the compressed format structures corresponding to the plurality of video files which include the indicated content type to be included;
- (vii) the server is configured to store the personalized electronic edit decision list;
- (viii) the server is configured to receive a request from a user of the user terminal to provide in a web browser executing on a user terminal, or in a video player executing on a user terminal, a personalized video play corresponding to a video defined by the compressed format structure and the personalized electronic edit decision list;
- (ix) the server is configured to send or to provide to the web browser code executable in the web browser, or to the video player code executable in the video player, to provide the personalized video play corresponding to the video defined by the compressed format structures stored on the first server and the personalized electronic edit decision list, and
- (x) the server is configured to respond to requests from the code when executing in the web browser or in the video player, to provide content corresponding to the compressed format structures stored on the server, in accordance with the personalized electronic edit decision list, to the web browser or to the video player, to provide the personalized video play.

The system may be one configured to perform the method of any aspect of the fifteenth aspect of the invention.

According to a seventeenth aspect of the invention, there is provided a computer-implemented method of removing video content from a server, the method including the steps of:
- (i) receiving a plurality of video files;
- (ii) converting the plurality of video files each into a compressed format structure;
- (iii) storing the compressed format structures of the plurality of videos on the server;
- (iv) receiving from a user terminal playing the video using the compressed format structure, such as by playing using an EDL, an indication that the video includes inappropriate content;
- (v) storing in metadata of the video a record that a user terminal or a user account transmitted an indication that the video includes inappropriate content;
- (vi) repeating steps (iv) to (v) for a plurality of user terminals or user accounts, until a pre-defined threshold is reached; and
- (vii) removing access to the video via the server, or restricting access to the video via the server to certain sections of the viewers (e.g adults only), or restricting access to the video via the server to user accounts of users with a similar profile to the users of the user terminals or user accounts that indicated the inappropriate content, in response to the pre-defined threshold having been reached.

An advantage is that a video potentially including inappropriate content is quickly removed from being available, or has its availability restricted, for example without having to wait for a human operator to investigate. An advantage is that harm caused by inappropriate content is reduced.

The method may be one wherein the compressed format structures include a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy. An advantage is that associated EDLs can be removed or restricted, which can be done very quickly, so that harm caused by inappropriate content is reduced.

The method may be one wherein the inappropriate content is sex, violence, or generally unpleasant content.

The method may be one wherein the pre-defined threshold is based on a minimum number of indications that the video includes inappropriate content, or a minimum percentage of viewers who have indicated that the video includes inappropriate content, or on another function such as one proportional to the square root of the number of viewers who have indicated that the video includes inappropriate content. An advantage is that consistent criteria can be used to assess if inappropriate content should be removed from being available, or have its availability restricted.

The method may be one wherein the user terminal is a desktop computer, or a laptop computer, or a smart TV, or a smartphone, or a tablet computer, or a smartwatch.

According to an eighteenth aspect of the invention, there is provided a system including a server and a user terminal for responding to an indication that a video includes inappropriate content, wherein:
- (i) the server is configured to receive a plurality of video files;
- (ii) the server is configured to convert the plurality of video files each into a compressed format structure;
- (iii) the server is configured to store the compressed format structures of the plurality of videos on the server;
- (iv) the server is configured to receive from a user terminal playing the video using the compressed format structure, such as by playing using an EDL, an indication that the video includes inappropriate content;
- (v) the server is configured to store in metadata of the video a record that a user terminal or a user account transmitted an indication that the video includes inappropriate content;
- (vi) the server is configured to repeat (iv) to (v) for a plurality of user terminals or user accounts, until a pre-defined threshold is reached; and (vii) the server is configured to remove access to the video, or to restrict access to the video via the server to certain sections of the viewers (e.g adults only), or to restrict access to the video via the server to user accounts of users with a similar profile to the users of the user terminals or user accounts that indicated the inappropriate content, in response to the pre-defined threshold having been reached.

The system may be configured to perform the method of any aspect of the seventeenth aspect of the invention.

According to an aspect of the invention, there is provided a computer-implemented method of generating a personalized video for a user, which is edited from an original video, using information collected about other users' preferences regarding the original video to generate an Edit Decision List (EDL) defining the edits for the original video, and providing video output including the original video edited by the EDL.

According to an aspect of the invention, there is provided a method for generating bespoke videos for viewers at low cost and low latency by a Server using information it has collected from video Player software executing on client machine(s) regarding viewers' previous preferences to generate an Edit Decision List defining the edits for media being played back for one or more Viewers.

According to an aspect of the invention, there is provided a method for generating bespoke videos for viewers at low cost and low latency by implementing most or all of the rendering of the video from the Cloud at the client Player, and making use of the processing resources available to the Player on each viewer's device to render the edits in the video during playback, as well as optionally information available to the Player on viewers' preferences collected by the video server.

Any previous method may be one where the previous viewing preferences of the Viewer watching the Video has are included in deciding the content of the EDL.

According to an aspect of the invention, there is provided a method where the viewing behaviour of the Viewer informs the Player as to the view preferences and the Player edits its own EDL to spend more time on the type of content the viewer has been watching, and less time or no time on the type of content the Viewer has played through faster or given another indication of content that is not preferred by the Viewer.

Any previous method may be one where viewers of the video can also clip content from the EDL being watched or navigated using the Player.

Any previous method may be one where the videos clipped by the viewers can also be shared from the Player interface.

Any previous method may be one where the Server makes use of the knowledge of which clips have been made when making decisions about which video frames to provide views of.

According to an aspect of the invention (or for any previous method), there is provided a method in which the Player has a drop menu which allows the Viewer to select from a number of presets which instantly re-edit the video based on the preference or combination of preferences chosen from the menu (eg for a sports video, Aces, Double faults, rallies, serves, points one by one of the players of the game, game points, set points, match points).

Any previous method may be one with a précis option (e.g. provided by the user terminal) where the viewer can request and the server generate a shortened version of the video.

Any previous method may be one with a précis option (e.g. provided by the user terminal) where the shortened video EDL is dynamic and based on the most popular viewed content at the time.

Any previous method may be one where the shortened version generated is generated on the Server including making use of the information about which clips have been shared.

Any previous method may be one where the shortened version generated is generated on the Server including making use of the information about engagement of shared clips, or how many views shared clips have had, or how many reshapes shared clips have had.

Any previous method may be one where the précis method is chosen by voice command through a voice input system.

Any previous method may be one using Blackbird codec to limit the amount of video downloaded during fast forward/backwards and navigation.

Any previous method may be one where the Blackbird Splurge is used to minimise the time taken to find a particular piece of video and/or audio.

Any previous method may be one where the Player provides a "skip to next significant change" button, and differences in the Splurge at one or more temporal resolutions are used to determine the size of differences between frames without having to download the actual frames in advance.

Any previous method may be one where the level of interest is determined by the viewing habits of other viewers, and sections most selected by other people are shown.

Any previous method may be one where security footage can be automatically edited in the Player, using the Splurge at various temporal resolutions to find and home in on frames with significant differences which can be displayed in the Player.

Any previous method may be one where viewers can indicate while watching a video and/or navigating through which sections are interesting and a video with such interesting sections is available for the viewer and/or others to watch.

Any previous method may be one where multiple people can indicate their preferences and an EDL for a video is generated with combinations of viewers preferred content and the EDL-modified video is available for the viewer and/or others to watch.

Any previous method may be one where a selection system such as a menu allows viewing selection of all the frames selected by combinations of people, including particular individuals and/or the majority of viewers who expressed a preference.

Any previous method may be one where the video is from a video conferencing system and the resultant video shows a shortened video with only the parts of the meeting which people found interesting or useful.

Any previous method may be one where the shortened video can be watched, and at any point the parts a viewer finds interesting can be expanded to include more of the original content.

Any previous method may be one where a video and all shares of it through the system can be removed by the Server after a period of time or number of views or at the discretion of the content publisher.

Any previous method may be one where content can be flagged as inappropriate by viewers, and when thresholds determined by the provider are passed, the Server can immediately remove the original video and all copies, including shares through the system.

Any previous method may be one where the EDL generated for the Player uses third party personalization algorithms to select the areas of interest in the media.

Any previous method may be one where the video is edited by the Player during watching to preferentially show types of content which the viewer has watched so far and skipping past types of content the viewer has skipped over so far in the video, based on metadata attached to the frames, frames which looked similar in the video splurge or characteristics of the audio splurge.

Any previous method may be one where carbon dioxide emissions are reduced through the efficiencies available in the Blackbird Player.

Any previous method may be one where the metadata attached to the video frames is used to determine which ads to show, and where to stitch the ads into the video.

Any previous method may be one where the Player implementation is in Javascript and can run on multiple devices including PCs, smartphones and smart TVs through a web browser.

Any previous method may be one where the Player runs as a mobile phone app.

Any previous method may be one where the real time rendering of edits is performed as described in the international patent publication number WO 2018/197911 A1, or as described in the sections herein entitled "TECHNICAL DISCLOSURES" and "DETAILS RELATING TO THE TECHNICAL DISCLOSURES".

Aspects of the invention may be combined. A match may be defined as having a statistical measure which exceeds a threshold, such as a threshold correlation coefficient, for example, as would be clear to one skilled in the art. A best match may be defined as having an optimum statistical measure, such as a highest correlation coefficient, for example, as would be clear to one skilled in the art.

In the above methods, systems and servers, the one or more videos may be a live stream. For example, a viewer may start viewing after the start of a live sporting event, and be presented with an auto-edited version to bring them up to the live part. For example, the one or more videos could be a never-ending surveillance video, and the viewer could be presented with the parts of the video where something happened since the viewer last watched. In an example, new files are added as new video is created, but in another example files are extended, or extended until they are a predetermined size (e.g. 2 GB) and then a new file is started.

In the above methods, method steps may be performed concurrently e.g. in the case of a live feed, e.g. for a pipeline where things are constantly arriving at one end of the pipeline for processing and then processed results are made available at the other end of the pipeline.

In the above methods, method steps may be performed sequentially.

In alternatives to the above methods, systems and servers, the one or more video files are received in the compressed format structure and stored at the server, rather than being converted into a compressed format structure at the server.

BRIEF DESCRIPTION OF THE FIGURES

Aspects of the invention will now be described, by way of example(s), with reference to the following Figures, in which:

FIG. 5 shows an example of global accessible context for Transition Tables.

FIG. 6 shows an example of Transition Tables with local context (e.g. LC1, etc.) and corresponding resulting values which have been predicted so far.

FIG. 7 shows an example of typical context information for cuts.

FIG. 8 shows an example of typical context information for delta frames.

DETAILED DESCRIPTION

Overview

Figure 1:
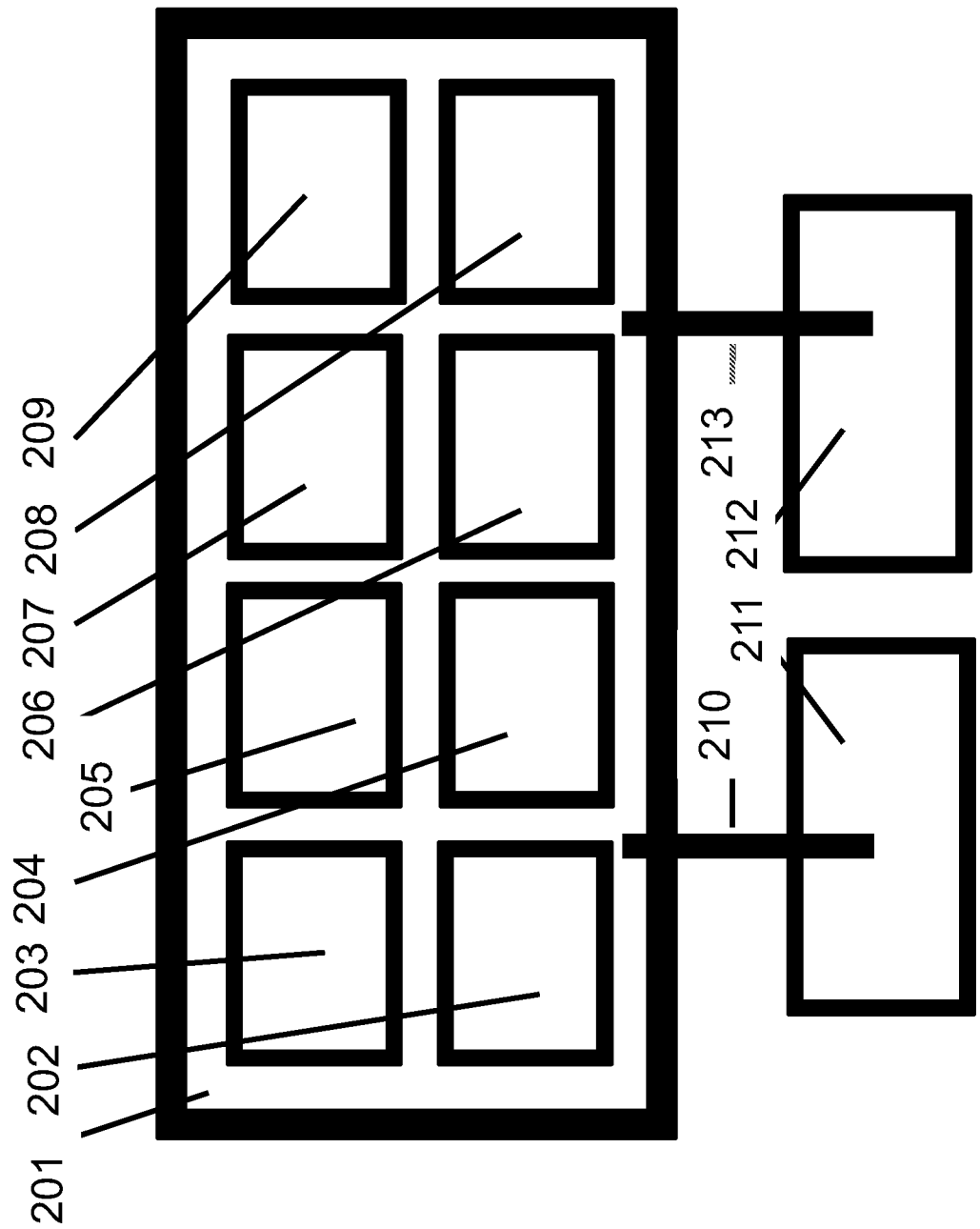
FIG. 1 shows an example of a Server/Client system suitable for video Hyper-personalization (201 Server; 202 Video content; 203 Audio content; 204 Image content; 205 Other media content; 206 Metadata describing the media content; 207 Metadata describing content usage; 208 Player code; 209 API interface; 210 Network connection between Server and a Client (other network connections not shown); 211 One of one or more Clients' browsers (other Clients' browsers not shown), and a Viewer or Viewers; 212 One of one or more Clients' Apps or applications (other Clients' Apps or applications not shown), and a Viewer or Viewers; 213 Network connection between a Server and a Client (other network connections between the server and clients not shown)).

There is provided a system including a Server, where the server may be distributed across multiple sites and may contain multiple physical elements, the system further including one or a plurality of clients, which may be independently controlled or operated. The Server stores media content, e.g. including video, photographs and/or audio. The Server can also store metadata about that video, such as frame size and frame rate and content descriptions originating from content creators or users. The Server can also store content usage and preference metadata, such as what videos or even frames have been watched, how much time has been spent on each frame, what has been liked, what has been clipped, what has been shared, what has been skipped, what has been flagged e.g. for censoring, copyright or deletion. The Server can also store timing information about when the content can be served or viewed. The Server can also store rights information about who can and/or can't watch the content. The Server can also store user-entered information or computer-generated information, such as from an Artificial Intelligence (AI) system, which can be interpreted in ways to be determined by particular implementations. The Server can also store Edit Decision Lists (EDLs) which are instructions on how to construct new media out of other media components. The Server can also store one or more Players which can be downloaded with the media if needed to allow viewer or user access to the content, from a client device. The Server may also have an Application Programming Interface (API) which allows third parties to access and/or change the content or metadata. FIG. 1 shows an example of a server-client system.

A sever-client system may be the core of a very powerful system. The Player instances, which may be installed as applications or apps, or may be part of a web page, for example as a JavaScript code or installed mobile apps, can download or stream content, pre-recorded or live, from the Server. The content will typically contain an Edit Decision List (EDL), which specifies which other content is to be downloaded and how it is to be constructed and displayed in the Player for each Player frame position. The Player frame position is typically controlled through the Player interface by a human Viewer, though programs can also take this role through an Application Programming Interface (API) and process the content in other ways such as through an AI system.

The Player software may be connected to the Server, so not only can the Viewer controls inform the Player about which content to request from the Server, and how to construct it into the appropriate viewing experience, but the Server has access to any of the information available to the Player, such as which frames were displayed, how much time the Viewer lingered on each frame, which frames were skipped through quickly or shuttled past, which frames of the video were watched, liked or clipped, as well as performance metrics and any other information the Player supports from time-to-time.

The Server can also make any of its metadata, including usage and content metadata, available to the Player for improving the Viewer experience or otherwise, and also can make any of this metadata, as well as the media content, available to itself to generate EDLs to serve to the Player, including bespoke EDLs for each particular instance or media playback.

In an example, as much processing is performed by the Player as possible, as this will typically be a lower power consumption device, such as a mobile phone, compared to a Server, such as a Cloud Server, which will be a high-performance computer with need for a cooling system. Processing distribution has to be balanced by the need to transfer data to the Player for processing, so the intention is that this transferred data will be small in size, such as metadata, and we note also that video processing is carried out by the Player.

Information used to create bespoke edits for the Player, either by the Server or the Player itself, is intended to be kept small in size by the use of metadata and where video itself needs processing, the navigation bar (sometimes referred to as a "splurge") (see e.g. the section below entitled "A METHOD FOR ENABLING EFFICIENT NAVIGATION OF VIDEO") at various temporal resolutions can also be used to cut the spatial and temporal resolution of any video and the audio processed to speed up processing and, where processing is on the client, reduce the data transferred.

In an example, you can download into a client video player from a server the navigation bar (sometimes referred to as a "splurge") corresponding to an existing video on the server, where the navigation bar includes one (typically vertical) stripe of pixels per frame (or per group of consecutive frames) in the video (see e.g. the section below entitled "A METHOD FOR ENABLING EFFICIENT NAVIGATION OF VIDEO"). The file size of the navigation bar is very much less than the file size of the existing video. At any time, for example once an area of interest in the navigation bar is identified, higher time (or spatial) resolution navigation bar data can be used in that region. The navigation bar can be processed in the player on the client device, e.g. on a mobile device. An advantage is that if the navigation bar is used for (or to assist with) video editing on the client device (e.g. mobile device) in the video player application, this vastly reduces energy consumption, compared to processing an original video on the server. Energy consumption reduction can reduce global emissions of $CO_2$, which is environmentally beneficial.

As the Players and the Server are part of the same system, they all benefit from the metadata collected, including metadata about which media was played. With access to the actual frames watched and other viewing behaviour like playing at double speed or 4× speed, shuttling through the content and restarting at a different point, over all users, a new user requesting a shortened version of a video through the Player interface can be served only the most watched subset of the content, in an example.

Users have the option of signing in to the system, increasing the level of personalization possible. Personally identifiable information about individuals would only be stored subject to the relevant legal and ethical constraints.

The metadata for a video is also available to a Player, so if a particular type of content is skipped while the video is being watched, for example a particular speaker or those parts of a sports game where a rival team has possession, the Player can adjust its EDL on-the-fly to remove those parts from the rest of the video, so the viewer doesn't download and play back content the Viewer is not interested in.

Many decisions about the contents of the EDL will involve adjusting weights based on a variety of inputs from both general viewers and also the particular user.

The Player also allows for clipping and resharing of parts of existing EDLs. This increases viewer engagement and allows each viewer to assist in the personalization process for their friends and followers. The metadata data for which shots are clipped and which parts (if any) of those shots are viewed is all available to the Server—and hence the Players—to inform the server's decisions about how to improve viewing experience.

There will be many inter-dependencies between media preferred within each person's content, making it possible to create personas or preference scores for new pieces of content. This will allow video preferences from people with similar profiles to inform any video personalization for each user.

Preferences can also be expressed manually, through a drop down menu for example, where the viewer chooses which type of content to prefer. For example for tennis content, this may contain an option for each player, the officials, the score, serves, aces, rallies, player interjections, crowd engagement, or other features which people may want to include or exclude. A slider bar could indicate a required length or summarise level/percentage for a particular video. All the data available from the viewer and/or other viewers would allow the best content to be shown, such as the most watched, the least skipped, the most engaged-with content, the most shared content, or other metrics depending on the use case.

The Player may also have access to the microphone or video camera where appropriate, and monitor viewer engagement to enable automatically choosing the types of video shots to be shown, depending on viewer commands or general level of attention or otherwise, such as a human would often do in a conversation.

Every operation, from manual navigation, where the navigation bar (see e.g. the section below entitled "A METHOD FOR ENABLING EFFICIENT NAVIGATION OF VIDEO") (sometimes referred to as "Splurge") exposes the sweep of media content in the EDL with minimal download, to manual navigation, where the codec minimises data download, is aimed at reducing Server load, client load, data transferred and environmental impact.

The intention is that $CO_2$ emissions produced by video streaming, a measurable percentage of global emissions, will be reduced by allowing efficient navigation and bespoke videos, including shortened versions which contain only the most interesting parts.

In the Security and Surveillance sector, the ability to efficiently process the navigation bar (sometimes referred to as "Splurge") (see e.g. the section below entitled "A METHOD FOR ENABLING EFFICIENT NAVIGATION OF VIDEO") and deliver bespoke EDLs is a boon. Hours of content from multiple cameras can be reduced to a few clips in a bespoke EDL. With the choice of content processing on the Player, this can be scaled at minimal cost to high volume consumer applications.

In Education, the feedback to teachers about which parts of the videos are best—and worst—understood, as indicated by viewer statistics, is a great way of getting direct feedback in a remote learning situation. The Player, which also only requires low bandwidth, becomes an excellent interactive video tool.

In Business, where long discussions in meetings often deliver quite concise conclusions, the ability for participants (or others) to mark in a video(s) interesting or useful sections (as well as irrelevant or unwanted sections) either while the video(s) is ongoing or later, allows people to see summaries of the video(s) with the option to select any combination of people's designations of interesting or useful content, as well as optionally the ability to filter by discussion topic. Having quick and easily created summaries will massively increase the utility of meeting recordings.

The power of the Server and Player could be used to stitch the most highly relevant adverts into the video. The Player supports click through, allowing viewers to click and order online, while the Player waits patiently to resume.

One of the issues for consumer video creation is dealing with the release of inappropriate content, whether copyright violations or one of a number of categories such as sex, violence, or generally unpleasant content. In an example, the connection of the Players to the Server allows every viewer to express their dislike of content, such as through a flag or series of flags for different perceived violations. The Server can then take appropriate action when appropriate thresholds are reached, such as removing the content for all EDLs served, restricting the content to certain sections of the viewers, e.g. adults, or not serve the content to people similar to the flagger or people with a similar profile to the flagger eg if they don't like a particular type of music or don't understand a particular language, or don't like listening to a particular politician. For example, thresholds could be based on a minimum number of complaints, the percentage of viewers who have complained, or another function such as one proportional to the square root of the number of viewers, which would allow videos to spread a little (i.e. to be disseminated to some extent) to get a fair assessment and enough data on the complainant types before a ban is enacted, e.g. to prevent one political group trying to censor its rivals—e.g. such a group would only be able to censor the content amongst themselves.

In an example, the Player supports multiple options, which are set at publishing time in the Editor (in a preferred implementation, the Blackbird video Platform and Editor is used). Options include, but are not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

We can monitor user activity to see what videos a user has watched, or what videos other users have watched, e.g. the monitoring using a server, or the monitoring using a server in communication with a video player on a client computer. The results of this monitoring can be used to provide a personalized video (e.g. edited from an original video) for a user to watch. There can be a video viewer user interface e.g. with a slider bar, so for a video you want to watch, which you decide is long and boring, say Prime Minister's questions, and you select to watch a limited time amount from it, e.g. 20 seconds of it, then the limited time amount from it (e.g. the 20 seconds of it) you are provided with is determined based on viewing data of the video, e.g. on what other users clicked and shared e.g. using the slider bar interface, to provide personalized video, or e.g. based on your past viewing activities.

In a video conference application, there is a list of (e.g. four) attendees, and in the screen interface there is a selectable icon (e.g. a button) which during playback an editor or an attendee selects to indicate liked content or important content. Selectable icons may be provided for identifying other classes of content. Then for providing personalized video, in the interface, there is a (e.g. drop down) menu, where you can select to view e.g. what the representatives of a company in the meeting said, or what participant X at the meeting said, or the 'liked' content, to provide the personalized video.

To edit an original video into a personalized video, an Edit Decision List (EDL) can be used to edit the original video into a personalized video. An EDL includes a list of editing instructions. The EDL can be carried out on the original video on a server.

The above can be provided in a server-client system. Video can be served from the server, e.g. from the cloud. The server can collect (e.g. viewing) information about one user. The server can collect (e.g. viewing) information about many users. In some examples, the server provides the editing. In some examples, the client device provides the editing, e.g. the client device could provide a surveillance type analysis to see what has been happening in a video stream. Or a server could provide a surveillance type analysis to see what has been happening in a video stream.

We can use a navigation bar (sometimes referred to as a "splurge") (see e.g. the section below entitled "A METHOD FOR ENABLING EFFICIENT NAVIGATION OF VIDEO") in an on-screen user interface. In an example, the navigation bar includes one (typically vertical) stripe of pixels per frame (or per group of consecutive frames) in the video. So if something significant happens in a frame (or in a group of consecutive frames), the corresponding stripe will look very different to the stripe corresponding to the previous frame (or to the previous group of consecutive frames). The navigation bar can be used for editing on lots of different timescales.

In an example, you can download into a client video player from a server the navigation bar (sometimes referred to as a "splurge") (see e.g. the section below entitled "A METHOD FOR ENABLING EFFICIENT NAVIGATION OF VIDEO") corresponding to an existing video on the server, where the navigation bar includes one (typically vertical) stripe of pixels per frame (or per group of consecutive frames) in the video. The file size of the navigation bar is very much less than the file size of the existing video. The navigation bar can be processed in the player on the client device, e.g. on a mobile device. An advantage is that if the navigation bar is used for (or to assist with) video editing on the client device (e.g. mobile device) in the video player application, this vastly reduces energy consumption, compared to processing an original video on the server. Energy consumption reduction can reduce global emissions of CO2, which is environmentally beneficial.

Hyper Personalized Video

Consider what functions a major user of a codec would like to use. A codec is a device or computer program which encodes or decodes a data stream or signal. Codec is a portmanteau of coder/decoder.

Time efficient video editing is important because much of the cost of editing is paying someone's salary, so if you can speed up editing by a factor of two, you can reduce the video editing cost by a factor of two.

Internet infrastructure owners appreciate efficient codecs, because efficient codecs can strongly reduce the amount of data traffic the infrastructure carries, which means that the infrastructure can service more users with the same hardware.

Most people don't edit videos. Most people who edit videos don't encourage others to edit videos. So video editing technology is not widely used amongst the public.

In YouTube and on TikTok, the content is made by relatively few people; the most widely viewed content is not made by random people, but instead it is made by professional or semi-professional people.

A content creation site, where perhaps half the content is created by members of the public (e.g. TikTok) could be interested in video editing tools for their users to use.

A lot of videos made by members of the public are just one clip. Multi-clip videos seem to be too much effort for many video makers who are members of the public.

Editing is a "Mapping" problem in that the editor person has to consider all the content (i.e. like looking at a map), to make the story, to make everything fit together and to determine what is important and what is not important. It can take eg. 100 minutes, to edit an original 10 minute video, to make a 1 minute final video. Most people do not want to do this.

What can we do to be more relevant to the e.g. TikTok-type user experience?

We can provide frame-accurate access. E.g person standing next to llama, llama's tongue comes out quickly and grabs the sandwich from the person. You can watch this action frame-by-frame to see exactly how it happened. E.g. play video in slow motion.

We provide the possibility to skim through video content. This is more important for longer content than for shorter content. E.g. can play through at 2× speed, or 4× speed. More relevant to YouTube than to TikTok.

Consider the difference between "sit-back" and "lean-forward" content. "Sit back" is e.g. Netflix: Usually, longer, higher value content, already well edited. A viewer may need to go back to an earlier point in the video, to check something, eg. what someone said. But this is not so common, as a viewer's need. Also consider recorded video feed. When reviewing, you might want to skip though a lot of material, to get to one particular point. E.g. election night coverage, where you want to get to one particular election result. Also, you might want to go backwards on a live video feed, and we can do this.

Why is it hard to do a fast skim-through with current video technology? Standard video technology assumes you are not going to do anything with the video except play it back. E.g. MPEG: can't easily change brightness, for example.

For example, using an efficient codec, a video content provider on the web can save on server costs (e.g. virtual server costs), where these costs are often considerable.

Distribution is a much bigger market than video editing. For our video editing, we can work in the cloud, which is much cheaper than other systems. Video editing can be provided with other services, e.g. in Google Workspace (formerly Google G suite). Our video editor can run in a browser.

A lot of distribution is done by big websites e.g. Twitter, Facebook, Instagram, YouTube.

Consider individualized video. Currently every video on popular sites has been rendered from a video which was edited and re-rendered from an original video. Re-rendering from an original video uses a lot of processor time. If you had to do this for each viewer of say, 20 million viewers, that will get very expensive. In Faster-than-live (see e.g. WO2018197911A1, or the sections herein entitled "TECHNICAL DISCLOSURES" and "DETAILS RELATING TO THE TECHNICAL DISCLOSURES") you don't need to do the re-render, because the render is done on the player, and you can publish your video instantly, whatever the associated editing is of an original video. Individualized video can then be provided. Imagine there is a football match, and someone (or some algorithm) is logging the content. Viewer A is most interested in the red team, and the fouls. Viewer B is interested in the blue team, and the goalkeeping action. Imagine there is a tennis match, and viewer C wants to see all the break points. Viewer D wants to see all the aces and all the double faults. Viewer E wants to see all the times the crowd cheered. Each viewer can decide what they want to view, e.g. from a (e.g. drop-down) list in a computer screen user interface. Then the personalized video can be generated and provided, essentially instantly, for the viewer.

Or you can watch a viewer as they watch the live feed, and you notice what they really look at. E.g. in Formula 1 they tend to look at the tyre changes, or the overtaking. The video player can give you the option to watch the whole programme, or to watch a summary, and when you select the summary it provides a summary that has been personalized to your preferences, which could be your explicitly stated preferences, or your preferences that have been inferred from your viewing behaviour. In an example, the individualized video could be generated in less than one millisecond.

By using the faster-than-live (see e.g. WO2018197911A1, or the sections herein entitled "TECHNICAL DISCLOSURES" and "DETAILS RELATING TO THE TECHNICAL DISCLOSURES") approach, the individualized video is generated much more quickly and much more cheaply than in other approaches.

The same approach of generating individualized video can be used for generating individualized video advertising content. An algorithm that works out what you like viewing, to then select content for your individualized video content, or individualized video advertising content. The algorithm could use an artificial intelligence (AI) system. The AI system need only be run once on an original video, or on an original set of videos, to categorize all the content, which can then be selected as required to generate individualized video content, or individualized video advertising content. This can even be done on a live video feed.

This approach can be used to bypass the less interesting content e.g. on live video or on recorded video media. You can even select video content based on what, on average, people want to see. E.g. the content that was watched by the majority of the viewers, or the content categories that the majority of the viewers selected.

You could also have content selected by a targeted video length, eg. "I want a one minute video of this 90 minute football match", or "I want a three minute video of this 90 minute football match". Or one could request the most interesting user selected fraction (e.g. 1%, 5% or 10%) of the video content, for example. This could be selected by voice command to a voice input system e.g. Alexa.

While listening and viewing e.g. on a video call, you can indicate the interesting bits, e.g. with mouse or key press, and these parts can then be assembled at the end into a summary video. The summary video can be assembled based on audience input e.g. the parts which the majority identifies as interesting.

Or in the player, if you find part of the video summary interesting, you can select that part (e.g. click it) and the video summary will be expanded to include more of that part of the original video.

The Faster-than-live (see e.g. WO2018197911A1, or the sections herein entitled "TECHNICAL DISCLOSURES" and "DETAILS RELATING TO THE TECHNICAL DISCLOSURES") approach is very effective for taking down content in a video website where that content has been shared many times. Since what is made available is the editing instructions of an original video. By taking down the original video, all the editing instructions no longer work, hence all the copies can be taken down at the same time. Content may be taken down immediately, or after a time period (e.g. one hour) which allows for some video sharing between users, but where the sharing is time-limited.

Because our technology can run on a web browser, e.g. executing java code, it can run on a wide number of devices, eg. on a computer, on a smartphone or on a smart TV.

This technology could be used to provide a video summary of a video meeting, e.g. of a selectable length e.g. a 5 minute summary of a one hour meeting, or a 3 minute summary of a one hour meeting.

Security video surveillance is a possible application. E.g. watching an office over weekend. Just want to see the video bits when something actually happens.

This technology can be tied in with personalization algorithms, e.g. Google's personalization algorithms, for selecting video content.

And this hyper personalization video technology can be implemented eg. in the Faster-than-live (see e.g. WO2018197911A1, or the sections herein entitled "TECHNICAL DISCLOSURES" and "DETAILS RELATING TO THE TECHNICAL DISCLOSURES") approach, so that it can be implemented for many users on many devices very quickly, which was not possible before.

Hyper personalization Concepts

1. A method for generating bespoke videos for viewers at low cost and low latency by a Server using information it has collected from video Player software executing on client machine(s) regarding viewers' previous preferences to generate an Edit Decision List defining the edits for media being played back for one or more Viewers.
2. A method for generating bespoke videos for viewers at low cost and low latency by implementing most or all of the rendering of the video from the Cloud at the client Player, and making use of the processing resources available to the Player on each viewer's device to render the edits in the video during playback, as well as optionally information available to the Player on viewers' preferences collected by the video server.
3. A method of any previous concept, where the previous viewing preferences of the Viewer watching the Video has a higher weight in deciding the content of the EDL.
4. A method according to concept 2 where the viewing behaviour of the Viewer informs the Player as to the view preferences and the Player edits its own EDL to spend more time on the type of content the viewer has been watching, and less time or no time on the type of content the Viewer has played through faster or other indication of content that is not preferred by the Viewer.
5. Method according to any previous concept, where viewers of the video can also clip content from the EDL being watched/navigated using the Player.
6. A method of any previous concept, where the videos clipped by the viewers can also be shared from the Player interface.
7. A method of any previous concept, where the Server makes use of the knowledge of which clips have been made when making decisions about which video frames to provide views of.
8. A method where the Player has a drop menu which allows the Viewer to select from a number of presets which instantly re-edit the video based on the preference or combination of preferences chosen from the menu (eg for a sports video, Aces, Double faults, rallies, serves, points one by one of the players of the game, game points, set points, match points).
9. A method of any previous concept, with a précis option where the viewer can request and the server generate a shortened version of the video.
10. A method of any previous concept, with a précis option where the shortened video EDL is dynamic and based on the most popular viewed content at the time.
11. A method of any previous concept, where the shortened version generated is generated on the Server making use of the information about which clips have been shared.
12. A method of any previous concept, where the shortened version generated is generated on the Server making use of the information about engagement of shared clips, how many views shared clips have had, how many reshapes shares clips have had.
13. A method of any previous concept, where the précis method is chosen by voice command through a voice input system.
14. A method of any previous concept, with Blackbird codec to limit the amount of video downloaded during fast forward/backwards and navigation.
15. A method of any previous concept, where the Blackbird Splurge is used to minimise the time taken to find a particular piece of video and/or audio.
16. A method of any previous concept, where the Player provides a "skip to next significant change" button, and differences in the Splurge at one or more temporal resolutions are used to determine the size of differences between frames without having to download the actual frames in advance.
17. A method of any previous concept, where the level of interest is determined by the viewing habits of other viewers, and sections most selected by other people are shown.
18. A method of any previous concept, where security footage can be automatically edited in the Player, using the Splurge at various temporal resolutions to find and home in on frames with significant differences which can be displayed in the Player.
19. A method of any previous concept, where viewers can indicate while watching a video and/or navigating through which sections are interesting and a video with such interesting sections is available for the viewer and/or others to watch.
20. A method of any previous concept, where multiple people can indicate their preferences and a video with combinations of viewers preferred content is available for the viewer and/or others to watch.
21. A method of any previous concept, where a selection system such as a menu allows viewing selection of all the frames selected by combinations of people, including particular individuals and/or the majority of viewers who expressed a preference.
22. A method of any previous concept, where the video is from a video conferencing system and the resultant video shows a shortened video with only the parts of the meeting which people found interesting or useful.
23. A method of any previous concept, where the shortened video can be watched, and at any point the parts a viewer finds interesting can be expanded to include more of the original content.
24. A method of any previous concept, where a video and all shares of it through the system can be removed by the Server after a period of time or number of views or at the discretion of the content publisher.
25. A method of any previous concept, where content can be flagged as inappropriate by viewers, and when thresholds determined by the provider are passed, the Server can immediately remove the original video and all copies, including shares through the system.
26. A method of any previous concept, where the EDL generated for the Player uses third party personalization algorithms to select the areas of interest in the media.
27. A method of any previous concept, where the video is edited by the Player during watching to preferentially show types of content which the viewer has watched so far and skipping past types of content the viewer has skipped over so far in the video, based on metadata attached to the frames, frames which looked similar in the video splurge or characteristics of the audio splurge.
28. A method of any previous concept, where carbon dioxide emissions are reduced through the efficiencies available in the Blackbird Player.
29. A method of any previous concept, where the metadata attached to the video frames is used to determine which ads to show, and where to stitch the ads into the video.
30. A method of any previous concept, where the Player implementation is in Javascript and can run on multiple devices including PCs, smartphones and smart TVs through a web browser.
31. A method of any previous concept, where the Player runs as a mobile phone app.
32. A method of any previous concept, where the real time rendering of edits is performed as described in the international patent publication number WO 2018/197911 A1, or as described in the sections herein entitled "TECHNICAL DISCLOSURES" and "DETAILS RELATING TO THE TECHNICAL DISCLOSURES".

Technical Disclosures

This section of this document relates to technical disclosures made in WO2018197911A1, which may relate to the inventions of the present document.

According to a first aspect of these technical disclosures, there is provided a computer-implemented method of providing video clip playback, the method including the steps of:
(i) receiving a video feed;
(ii) converting the video feed into a compressed format structure, the compressed format structure including a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;

(iii) uploading the compressed format structure to a first server;

(iv) receiving an electronic edit decision list which defines how to manipulate the compressed format structure;

(v) saving the electronic edit decision list to the first server, or to a second server;

(vi) receiving a request to provide in a web browser executing on a user terminal a video clip playback corresponding to a video clip defined by the compressed format structure and the electronic edit decision list;

(vii) sending to the web browser code executable in the web browser to provide the video clip playback corresponding to the video clip defined by the compressed format structure stored on the first server and the electronic edit decision list saved on the first server or on the second server, and (viii) responding to requests from the code when executing in the web browser, to provide content corresponding to the compressed format structure stored on the first server, in accordance with the electronic edit decision list saved on the first server or on the second server, to the web browser, to provide the video clip playback.

An advantage of the method is that video clips may be provided for playback very quickly. An advantage of the method is that video clips may be provided for playback before a corresponding "live" broadcast is available to the public. An advantage of the method is that video clips may be provided for playback without using MPEG format files. An advantage of the method is that video clips may be provided for playback to a user using a web browser executing on a user terminal.

In an example of a compressed format structure, the lowest level of temporal resolution of frames of the hierarchy provides a frame at every second, such as at 0 s, 1 s, 2 s, 3 s. The next lowest level of temporal resolution of frames of the hierarchy provides a frame at every half second, such as at 0.5 s, 1.5 s, 2.5 s, 3.5 s. But to play the frames at the resolution of the next lowest level of temporal resolution of frames of the hierarchy, it is necessary to use frames from the two lowest levels of the hierarchy, to provide frames at 0 s, 0.5 s, 1 s, 1.5 s, 2 s, 2.5 s, 3 s, 3.5 s. The next next lowest level of temporal resolution of frames of the hierarchy provides a frame at every quarter second, such as at 0.25 s, 0.75 s, 1.25 s, 1.75 s, 2.25 s, 2.75 s, 3.25 s, 3.75 s. But to play the frames at the resolution of the next next lowest level of temporal resolution of frames of the hierarchy, it is necessary to use frames from the three lowest levels of the hierarchy, to provide frames at 0 s, 0.25 s, 0.5 s, 0.75 s, 1 s, 1.25 s, 1.5 s, 1.75 s, 2 s, 2.25 s, 2.5 s, 2.75 s, 3 s, 3.25 s, 3.5 s, 3.75 s.

The method may be one in which the video feed is a live video feed. An advantage of the method is that video clips may be provided for playback before a corresponding "live" broadcast is available to the public.

The method may be one in which the live video feed is a live sports video feed.

The method may be one in which the video clip playback is real time video clip playback. An advantage of the method is that video clips may be provided for playback very quickly.

The method may be one in which converting the video feed into the compressed format structure is performed in real time. An advantage of the method is that video clips may be provided for playback very quickly.

The method may be one in which the code executable in the web browser is JavaScript code. An advantage is that video clip playback may be provided very simply in a web browser user interface familiar to a typical user, without requiring the user to install playback software or hardware.

The method may be one including the step of executing the code in the web browser to provide the video clip playback corresponding to the video clip defined by the compressed format structure stored on the first server and the electronic edit decision list saved on the first server or on the second server. An advantage of the method is that video clips may be provided for playback very quickly.

The method may be one including the step of the web browser code executing in the web browser to provide backwards play and forwards play at multiple speeds and at high displayed frame rate. An advantage of the method is that versatile playback functions are provided.

The method may be one including the step of the web browser code executing in the web browser to create no significant garbage while the web browser code is running. An advantage is very well controlled memory management while the code is running in the web browser. A further advantage is that the programming language garbage collector does not block program execution for long enough to cause skipped frames on playback.

The method may be one in which the web browser code is executable in the web browser without configuration or installation. An advantage is ease of use by a user.

The method may be one including the step of providing the compressed format structure in chunks to a video editor, wherein the video editor is operable to generate the electronic edit decision list. An advantage is that the video clip may be generated and accessed more quickly.

The method may be one in which the video editor is operable to provide editing accurate to a single frame. An advantage is that a video clip with the desired start frame and with the desired end frame may be generated. This is desirable, in order to generate very high quality video clips.

The method may be one in which the video editor is arranged to request and to receive frames at the highest level of temporal resolution in the hierarchy, in the vicinity of a selected frame.

The method may be one in which the video editor includes video/audio précis display hardware and/or software, which provides a visual summary of the video and/or audio, such as a navigation bar, which summarises the content at multiple temporal scales and allows fast and convenient jog and/or shuttle navigation through an action such as mouse clicking or dragging on a display, as well as further uses such as rapid scene detection and detection of significant parts of the content by an artificial intelligence (AI) algorithm.

The method may be one in which the first server is a cloud server. An advantage is more efficient distribution of a video clip to users situated on the world wide web.

The method may be one in which the second server is a cloud server. An advantage is more efficient distribution of a video clip to users situated on the world wide web.

The method may be one including the step of the electronic edit decision list being generated even though the compressed format structure has not finished being stored on the first server. An advantage of the method is that video clips may be provided for playback very quickly. An advantage of the method is that video clips may be provided for playback before a corresponding "live" broadcast is available to the public.

The method may be one including the step of the compressed format structure being stored on an ingest server, before the compressed format structure is uploaded to the first server. An advantage of the method is that video clips may be provided for playback very quickly. An advantage of the method is that video clips may be provided for playback before a corresponding "live" broadcast is available to the public.

The method may be one in which the code is executable to download relevant video, audio, still, text and other files, including metadata files, from the first server or from the ingest server.

The method may be one in which the code is executable to read and to interpret the electronic EDL.

The method may be one in which the code is executable to combine files in the compressed format structure to play back the edited video at any of the spatial resolutions in the compressed format structure. An advantage is the flexibility to deliver the most suitable spatial resolution given limitations on data delivery speed to the user terminal.

The method may be one including an Edit step, in which a video editor system enables editing of video, audio, slides, titles and other media and metadata through the first server, to provide one or more electronic Edit Decision Lists.

The method may be one including a Player view step, in which opening a browser or other software gives access to the edited videos by real time playback of the electronic EDLs saved in step (v).

The method may be one in which a Player, which runs entirely in JavaScript and has a relatively small footprint, is included in the web page code.

The method may be one including being able to provide video clips in less than 60 seconds from an original recording made using a video camera.

The method may be one including being able to provide video clips in less than 30 seconds from an original recording made using a video camera.

The method may be one including providing the video clip playback on a mobile computing device, on a mobile phone, on a smartphone, on a tablet computer, on a smart watch, on a laptop computer, on a desktop computers, or on a smart TV.

The method may be one in which the code is executable to provide live controls over some combination of video resolution, image size, playback speed, position through jog and/or shuttle, keyboard short cuts and other controls.

The method may be one in which the compressed format structure includes loss free compression.

The method may be one in which the loss free compression includes use of Transition Tables; an example of the use of Transition Tables is described in the "IMPROVEMENTS TO REPRESENTATIONS OF COMPRESSED VIDEO" section of this document.

The method may be one in which the code uses a video codec, wherein the video codec supports private keys to randomise the initial state of its Transition Tables, making each bitstream randomised.

The method may be one in which a new player, incompatible with a previous player, is generated by providing new private keys.

The method may be one in which an order in which video and audio of the compressed format structure is uploaded to the first server is determined by an upload ordering system.

The method may be one including the steps of the upload ordering system
  (a) uploading non-uploaded compressed audio, where available, as the highest priority;
  (b) uploading non-uploaded coarsest temporal resolution video frames as the next highest priority;
  (c) uploading the non-uploaded next-coarsest temporal resolution video frames as the next highest priority;
  (d) uploading in this way until all video and audio frames have been uploaded.

The method may be one in which the method includes use of an Electronic EDL interpreter library hardware and/or software to enable electronic EDLs, and the sources they link to, to be converted into decompressed frames and audio samples, in real time for playback.

The method may be one in which the method includes use of a Web-based video editor operable to create a cloud-hosted web page which can be accessed over a wide area network such as the internet and which contains a video player which plays back the published video.

The method may be one in which no time is required to upload an edited video to a renderer, or to a distribution network, because the video clip playback corresponds to a video clip defined by the compressed format structure and the electronic edit decision list, and because the video clip playback is provided using the web browser code.

In a different example, the method of the first aspect of these technical disclosures is modified to provide a method which includes only steps (i) to (v) of the method of the first aspect of these technical disclosures. In a different example, the method of the first aspect of these technical disclosures is modified to provide a method which includes only steps (i) to (vi) of the method of the first aspect of these technical disclosures. In a different example, the method of the first aspect of these technical disclosures is modified to provide a method which includes only steps (i) to (vii) of the method of the first aspect of these technical disclosures.

According to a second aspect of these technical disclosures, there is provided a processing system including a processor and a first server, the system configured to provide video clip playback, wherein
  (i) the processor is configured to receive a video feed;
  (ii) the processor is configured to convert the video feed into a compressed format structure, the compressed format structure including a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;
  (iii) the processor is configured to upload the compressed format structure to a first server;
  (iv) the processor is configured to receive an electronic edit decision list which defines how to manipulate the compressed format structure;
  (v) the processor is configured to save the electronic edit decision list to the first server, or to a second server wherein the system includes the second server;
  (vi) the processor is configured to receive a request to provide in a web browser executing on a user terminal a video clip playback corresponding to a video clip defined by the compressed format structure and the electronic edit decision list;
  (vii) the processor is configured to send to the web browser code executable in the web browser to provide the video clip playback corresponding to the video clip defined by the compressed format structure stored on the first server and the electronic edit decision list saved on the first server or on the second server, and
  (viii) the processor is configured to respond to requests from the code when executing in the web browser, to provide content corresponding to the compressed format structure stored on the first server, in accordance with the electronic edit decision list saved on the first server or on the second server, to the web browser, to provide the video clip playback.

The system may be configured to perform a method of any aspect according to a first aspect of these technical disclosures.

In a different example, the system of the second aspect of these technical disclosures is modified to provide a system which includes only limitations (i) to (v) of the system of the second aspect of these technical disclosures. In a different example, the system of the second aspect of these technical disclosures is modified to provide a system which includes only limitations (i) to (vi) of the system of the second aspect of these technical disclosures. In a different example, the system of the second aspect of these technical disclosures is modified to provide a system which includes only limitations (i) to (vii) of the system of the second aspect of these technical disclosures.

According to a third aspect of these technical disclosures, there is provided a processor, wherein
  (i) the processor is configured to receive a video feed;
  (ii) the processor is configured to convert the video feed into a compressed format structure, the compressed format structure including a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;
  (iii) the processor is configured to upload the compressed format structure to a first server;
  (iv) the processor is configured to receive an electronic edit decision list which defines how to manipulate the compressed format structure;
  (v) the processor is configured to save the electronic edit decision list to the first server or to a second server;
  (vi) the processor is configured to receive a request to provide in a web browser executing on a user terminal a video clip playback corresponding to a video clip defined by the compressed format structure and the electronic edit decision list;
  (vii) the processor is configured to send to the web browser code executable in the web browser to provide the video clip playback corresponding to the video clip defined by the compressed format structure stored on the first server and the electronic edit decision list saved on the first server or on the second server, and
  (viii) the processor is configured to respond to requests from the code when executing in the web browser, to provide content corresponding to the compressed format structure stored on the first server, in accordance with the electronic edit decision list saved on the first server or on the second server, to the web browser, to provide the video clip playback.

The processor may be configured to perform a method of any aspect according to a first aspect of these technical disclosures.

In a different example, the processor of the third aspect of these technical disclosures is modified to provide a processor which includes only limitations (i) to (v) of the processor of the third aspect of these technical disclosures. In a different example, the processor of the third aspect of these technical disclosures is modified to provide a processor which includes only limitations (i) to (vi) of the processor of the third aspect of these technical disclosures. In a different example, the processor of the third aspect of these technical disclosures is modified to provide a processor which includes only limitations (i) to (vii) of the processor of the third aspect of these technical disclosures.

According to a fourth aspect of these technical disclosures, there is provided computer code, downloadable to a web browser executing on a user terminal and executable in the web browser to provide a video clip playback corresponding to a video clip defined by a compressed format structure stored on a first server and an electronic edit decision list saved on the first server or on a second server, wherein the compressed format structure includes a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy, the computer code executable in the web browser to:
  (i) request content corresponding to the compressed format structure stored on the first server, in accordance with the electronic edit decision list saved on the first server or on the second server, and
  (ii) provide the video clip playback.

An advantage is that video clip playback may be provided very simply in a web browser user interface familiar to a typical user, without requiring the user to install playback software or hardware.

The computer code may be arranged not to generate significant quantities of garbage. An advantage is improved memory management. A further advantage is that the programming language garbage collector does not block program execution for long enough to cause skipped frames on playback.

The computer code may be Java code or JavaScript code.

The computer code may be executable in the browser without configuration or installation.

The computer code may be executable in the browser to provide one or more of the following options:
  a choice of video size;
  a full-screen option;
  jog at full video playback resolution;
  shuttle at full video playback resolution;
  playback at multiple speeds forwards and backwards;
  a help screen;
  support for keyboard short cuts;
  an informative navigation bar (177);
  playback of a quickly provided published video clip, as soon as it is published;
  gradual degradation of experience where bandwidth is limited;
  minimal delays for buffering;
  internal caches for compressed and decompressed data;
  ability to skip frames on playback where required;
  ability to clip sections of Ingest (1710) videos or FTL Web Player (1715) videos and republish new web pages containing these subsets.

The computer code may be executable in the browser to provide the video clip playback in real time without any pre-rendering.

The computer code may be executable in the browser to request content directly from an ingest (Edge) server, or from the cloud, which prioritises such uploads.

The computer code may be executable in the browser to request the relevant frames before they are reached and to play back as many frames as are available.

The computer code may be executable in the browser to maximise frame rate, without buffering, by downloading, decompressing and displaying appropriate groups of video frames as it plays back.

The computer code may be executable in the browser to use the most local copy of the files it requires, minimising server load, and maximising download speed.

The computer code may be executable in the browser such that memory used is allocated in one block at the start.

The computer code may be executable in the browser to use its own memory management system.

The computer code may be included in web page code.

In a different example, there is provided computer code, executable on a user terminal and not executable in a web browser, the computer code executable to provide a video clip playback corresponding to a video clip defined by a compressed format structure stored on a first server and an electronic edit decision list saved on the first server or on a second server, wherein the compressed format structure includes a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy, the computer code executable on the user terminal to:

(i) request content corresponding to the compressed format structure stored on the first server, in accordance with the electronic edit decision list saved on the first server or on the second server, and (ii) to provide the video clip playback.

Such a computer code different example could be provided in an application for a smartphone, for a tablet computer, for a desktop computer, for a smart watch or for a smart TV.

According to a fifth aspect of these technical disclosures, there is provided a system including the processing system of any aspect according to the second aspect of these technical disclosures, a user terminal, and the computer code according to any aspect of the fourth aspect of these technical disclosures, the computer code executing in the web browser on the user terminal.

Details Relating to the Technical Disclosures

This section of this document relates to technical disclosures made in WO2018197911A1, which may relate to the inventions of the present document.

First of all, it is worth understanding what the term "live" on a television or radio broadcast actually signifies. To meet regulatory requirements, such as beeping out swear words or masking out offensive video content, the transmission is often delayed by up to 30 seconds. This gives time for the offending content to be deleted or replaced. You can hear this for yourself by taking part in a live radio phone in.

Keeping the "live" illusion is the main reason they are always at pains to tell you to switch off any radios you have on-hearing a repeat of a previously broadcast section would give the game away. So, often "live" broadcast is not actually live, but delayed by 30 seconds or so.

Internet editing solutions often take in a "live" internet protocol (IP) video feed, such as in HTTP Live Streaming (HLS) format. With a ten second file chunk size, these formats can be forty seconds behind real time by the time they are published. For example, a typical data flow may introduce the following delays: 1 second compression latency on the feed coming in; 10 seconds wait to compress to the end of a 10 second chunk; 4 seconds to upload the default resolution to a server; 10 seconds to decompress and recompress in various data rates for distribution; 5 seconds for the player to realise the chunk is available; 10 seconds to download file to decompress; 5 seconds to decompress and display file (allowing some slack for lost packets so these don't break the smooth video playback).

The upshot is that whether the feed comes from a live TV broadcast (the smartphone pirated case) or a live HLS stream (the professional IP case), an approximately 30 second latency on the availability of the source limits the delay of the edited highlights to at least 30 seconds.

An advantage of these technical disclosures is that it may allow the edited content to appear before either the TV broadcast or the HLS internet feed arrives "live"-hence Faster than Live (FTL).

Example of a Method for Providing Video Clips Very Quickly

There is provided a Camera step (161), in which a camera or cameras represents any video source(s) which delivers a live feed, which passes on a live video feed to a video codec; the camera is for example a professional video camera with an SDI port, or a smartphone with a built-in camera, or a live e-Sports computer screen source. A video codec is an electronic circuit or software that compresses or decompresses digital video. It converts uncompressed video to a compressed format or vice versa. In the context of video compression, "codec" is a portmanteau of "enCODer" and "DECoder".

There is provided a Live ingest step (162) to one or multiple resolutions, including reading in video feed(s) and creating multiple resolution video output files for editing and playback in an internet-friendly format; uploading such videos to the cloud or other publicly accessible internet servers.

There is provided an Edit step (163), in which a video editor system enables editing of video, audio, slides, titles and other media and metadata through the cloud or other internet servers, to provide one or more electronic Edit Decision Lists.

There is provided a Cloud hosting step (164), in which the electronic Edit Decision Lists (EDLs) of videos or other media edited in the Edit step above are saved in the cloud, or other publicly accessible servers, where the sources for the edited videos are already uploaded, or are uploading from step 162 above.

There is provided a Player view step (165), in which opening a browser or other software gives access to the edited videos by real time playback of the electronic EDLs saved in step 164 including: reading and interpreting the electronic EDL in step 164; downloading relevant video, audio, still, text and other files (including metadata files) from the Cloud in step 164 or the Live ingest computer(s) in step 162; combining the files to play back the edited video at any of the resolutions mentioned in relation to step 162; giving the viewer live controls over some combination of video resolution, image size, playback speed, position through jog and/or shuttle, keyboard short cuts and other controls.

In an example, video clips may be provided in less than 30 seconds from the original recording made using a video camera. In an example, video clips may be provided in less than 60 seconds from the original recording made using a video camera.

The method may be used to enable the viewing of video clips on mobile computing devices, on mobile phones, on smartphones, on tablet computers, on smart watches, on laptop computers, on desktop computers, and on smart TVs. The method may be used to enable the viewing of video clips using a web browser.

Figure 16:
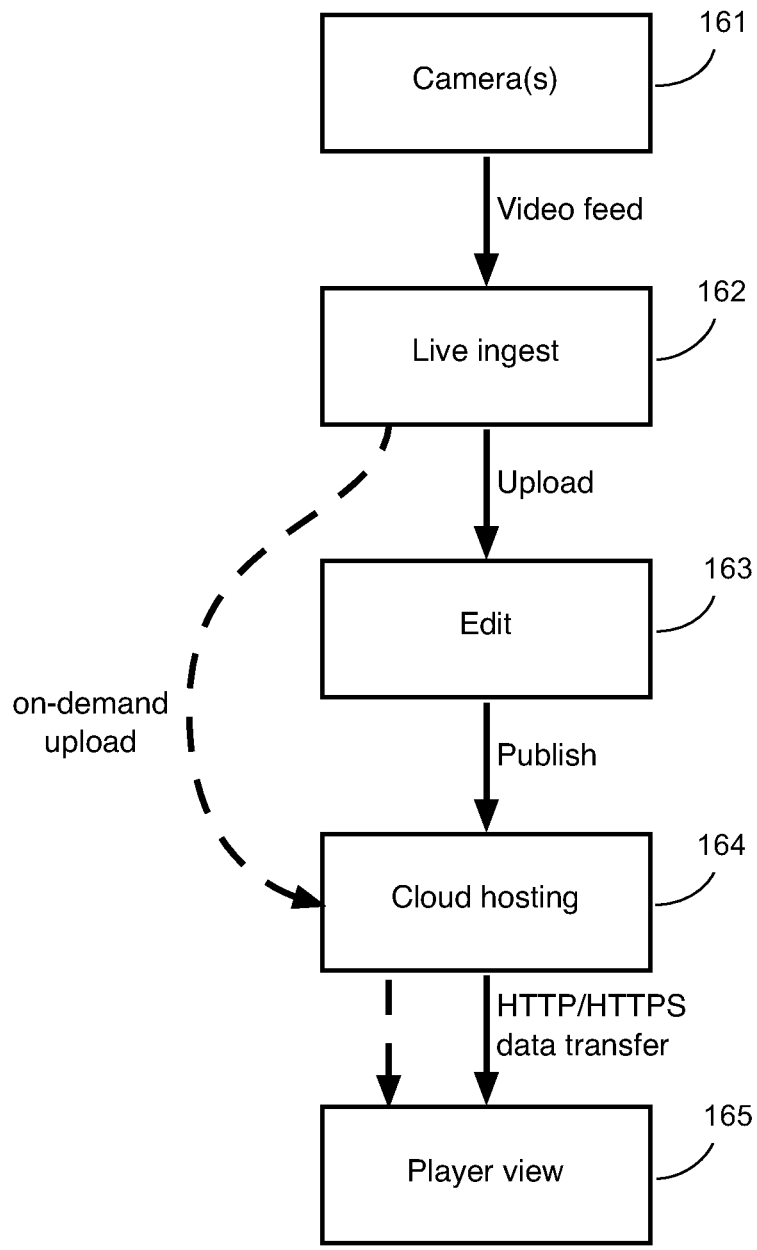
FIG. 16 is an example of a method for providing video clips very quickly.

An example of the above method for providing video clips very quickly is provided in FIG. 16.

Example of a System for Providing Video Clips Very Quickly

There is provided Loss free compression hardware and/or software (176). This is an optional system component for reducing the datarate of the compressed video output, eg. as output by step 162. The loss free compression system, such as Transition Tables (e.g. Forbidden Technologies' Transition Tables), an example of which is described in the "IMPROVEMENTS TO REPRESENTATIONS OF COMPRESSED VIDEO" section of this document, will typically have the following properties:

- it must (or should) run quickly so that it can handle the volume of data in live video feeds;
- it must (or should) not lock up for significant periods as the incoming live video stream will not wait for the compression;
- it must (or should) be able to compress live feeds as they come in, rather than seeing a whole file in order to compress the data;

In addition, the corresponding decompression will typically include the following properties:

- it must (or should) run quickly as the player may be real time;
- it must not (or should not) lock up for noticeable periods of time as the video playback must be smooth;
- it must not (or should not) generate significant quantities of garbage as garbage collectors in web languages such as JavaScript and Java can lock up for multiple video frames;
- it must (or should) have a small enough executable to be downloaded in a web page before the video is played without causing inconvenience to the user;
- it must (or should) have a small enough memory footprint to run in a browser.

There is provided Video/audio précis display hardware and/or software (177), which provides a visual summary of the video and/or audio, such as a navigation bar, which summarises the content at multiple scales and allows fast and convenient jog and/or shuttle navigation through an action such as mouse clicking or dragging on the display, as well as further uses such as rapid scene detection and (not detailed in this document, but as would be understood by one skilled in the art) detection of significant parts of the content by an artificial intelligence (AI) algorithm.

There is provided a Video codec hardware and/or software (178), including video compression/decompression hardware and/or software which allows the video to be compressed/decompressed, preferably with the following compression properties:

- the compression should be able to handle live sources in real time, preferably at multiple resolutions;
- the compressed video produced should be in a form which allows decompression of live feeds with low latency (for example, <5 seconds);
- the video quality should be sufficiently high for end viewers;
- the compression should preferably be fast enough to run in software on a standard device (e.g. a desktop computer);
- the compression should support a range of resolutions;
- the compression should create video which can be decompressed quickly from any point (eg. to support video editing and efficient navigation);
- the compression should produce compressed video which allows multiple (but not necessarily all) temporal subsets to be accessed without reference to content not included in those temporal subsets;

The video codec will typically also have the following decompression properties:

- the decompression must (or should) be efficient to allow real time playback;
- it must (or should) be possible to synchronise the video and the audio tracks;
- it must (or should) be possible to combine multiple video and audio tracks in real time so electronic EDLs can be rendered during playback;
- the decompression must (or should) be able to playback live feeds with low latency (e.g. <5 seconds);
- the ability to play backwards and forwards at multiple speeds and at high displayed frame rate;
- the decompression must not (or should not) create significant garbage while it is running, as garbage on typical web languages causes the software to lock up for the duration of multiple video frames.

There is provided an audio codec hardware and/or software (179), including audio compression/decompression hardware and/or software, which allows the audio to be compressed/decompressed, typically with the following compression properties:

- the compression should be able to handle live sources in real time;
- the audio quality should be sufficiently high for end viewers;
- the compression should preferably be fast enough to run in software on a standard device (eg. a desktop computer);
- the compression should support a range of qualities and audio sample rates;
- the compression should produce compressed audio which can be decompressed from a live stream with low latency (eg. <2 s).

The audio codec will typically also have the following decompression properties:

- the decompression must (or should) be efficient to allow real time playback;
- the decompression must (or should) be able to decompress a live stream with low latency (eg. <2 seconds);
- it must (or should) be possible to synchronise multiple audio tracks to any video tracks;
- it must (or should) be possible to combine multiple video and audio tracks in real time so electronic EDLs can be rendered during playback;
- the decompression must not (or should not) create significant garbage while it is running, as garbage on typical web languages causes the software to lock up for the duration of multiple video frames.

There is provided an Ingest system (1710), which is a system for taking in a video feed, typically with the following additional features:

- video and audio is compressed in real time;
- video is uploaded to a host cloud system through a network link;
- the order which video and audio is uploaded is determined by an Upload ordering system (1711).

In addition, the Ingest may include:

- an upload proxy;
- a download proxy;

the creation of a multi-scale video and/or audio summary (177).

the ability to render electronic EDLs locally.

There is provided an Upload ordering system (1711), which is a system implementing a method of deciding which media data to upload, uploading as requested by another application, such as a video editor or video player, or as a result of a request by a connected cloud server, including as a result of a request from an application connected to the cloud, or as a result of a mirror method which makes copies of content on the cloud. Mirroring ordering typically includes:

uploading non-uploaded compressed audio, where available, as the highest priority;

uploading non-uploaded coarsest temporal resolution video frames as the next highest priority;

uploading the non-uploaded next-coarsest temporal resolution video frames as the next highest priority;

uploading in this fashion until all video and audio frames have been uploaded.

In parallel, the mirror can request the upload of the précis (177).

There is provided a Download ordering system (1712), which enables applications using the video ingested by Ingest (1710) to request content. The download ordering provided includes:

frames of video and samples of audio which are required by an application to be displayed shortly;

when playing, frames ahead of the current play position which are expected to be displayed shortly;

when not playing, frames in the vicinity of the current play position which could be jogged or shuttled to shortly display, given the current resolution of the navigation tool, or frames which could be played back shortly if the video playback was to be started. In addition, a sprinkling of frames across the navigation bar are downloaded so nearby frames can be accessed quickly during shuttle.

In one implementation, the frames are downloaded in chunks, each chunk being split into multiple files of video frames of decreasing temporal spacing, and multiple files are downloaded concurrently, with only one file from each chunk being downloaded at a time.

There is provided an Electronic EDL interpreter library hardware and/or software (1713) which allows electronic EDLs, and the sources they link to, to be converted into decompressed frames and audio samples, in real time for playback. It also allows random access to frames of video via a navigation bar, such as the précis (177). Where there is insufficient bandwidth to download all the content before it is required, the library returns a lower video frame rate. It also gives the option to select the video bitstream from a choice of video resolutions, altering the bandwidth requirements. It also includes an internal cache which contains compressed video and audio, as well as decompressed video frames and audio samples. It also renders electronic EDLs in real time, supporting multiple concurrent video and audio tracks. In the preferred implementation, it supports 12 video and 36 audio tracks.

There is provided a Web-based video editor (1714): a video editor which runs in a web browser, or is launched from a web browser, which, in the preferred implementation, doesn't require configuration or installation of software written by a supplier of this technology. The editor should ideally be frame accurate, work in conjunction with the other components shown in FIG. 17 to improve performance, and it must support an option, which, very quickly (eg. in a fraction of a second), creates a cloud-hosted web page which can be accessed over a wide area network such as the internet and which contains a video player which plays back the published video.

There is provided a Web Player (1715), such as a JavaScript player (e.g. Blackbird's JavaScript player), in which the Web Player runs in a browser without configuration or installation, accessible to a wide audience, which allows playback of live and/or edited content, with a range of options which may include, amongst others:

a choice of video size;

a full-screen option;

jog at full video playback resolution;

shuttle at full video playback resolution;

playback at multiple speeds forwards and backwards;

a help screen;

support for keyboard short cuts;

an informative navigation bar, eg. (177);

playback of a quickly provided published video clip, as soon as it is published;

gradual degradation of experience where bandwidth is limited;

minimal delays for buffering;

internal caches for compressed and decompressed data;

ability to skip frames on playback where required;

ability to clip sections of Ingest (1710) videos and republish new web pages containing these subsets.

In an example, video clips may be provided in less than 30 seconds from the original recording made using a video camera. In an example, video clips may be provided in less than 60 seconds from the original recording made using a video camera.

The system may be used to enable the viewing of video clips on mobile computing devices, on mobile phones, on smartphones, on tablet computers, on smart watches, on laptop computers, on desktop computers, and on smart TVs. The system may be used to enable the viewing of video clips using a web browser.

Figure 17:
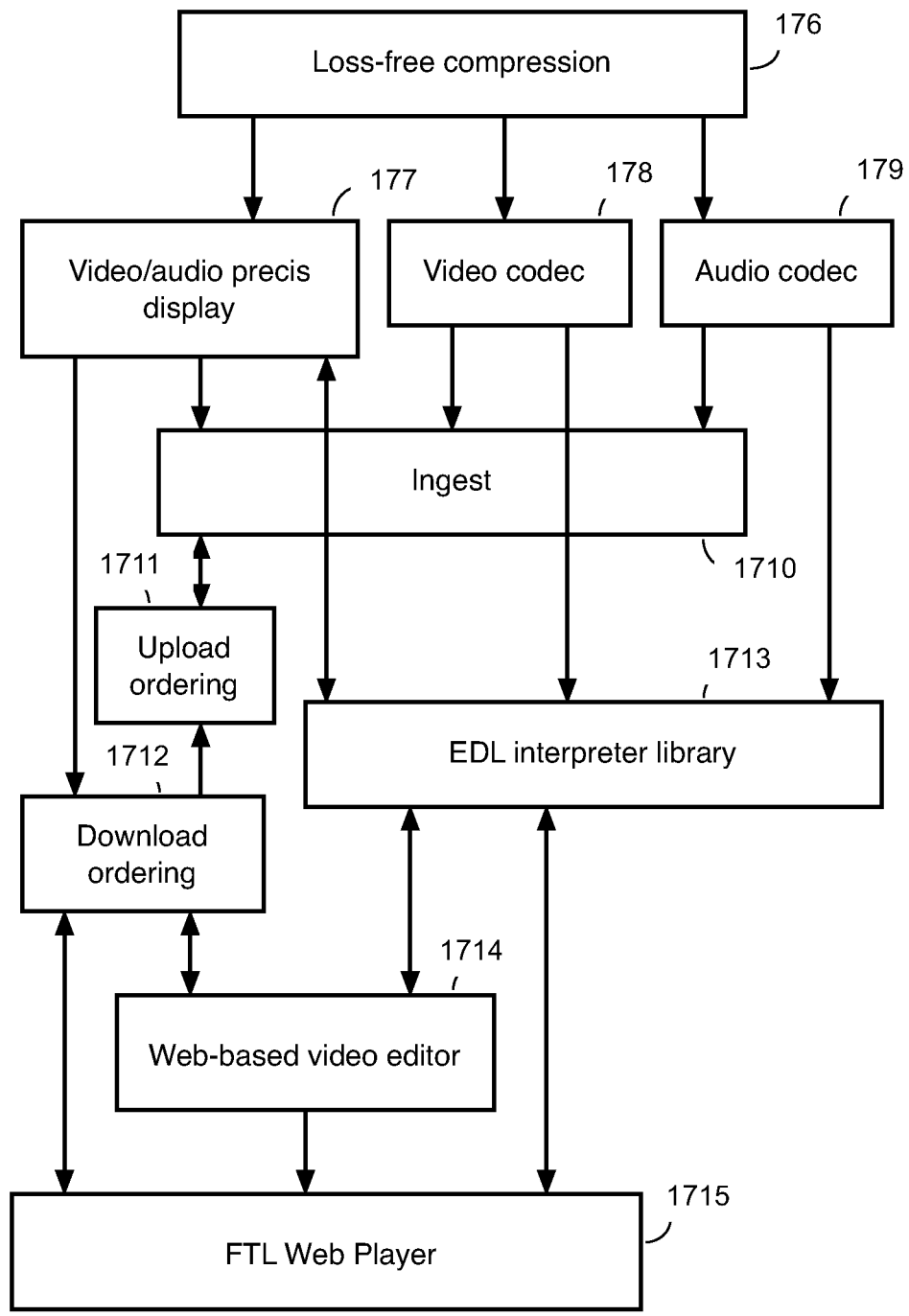
FIG. 17 is an example of a system for providing video clips very quickly.
Figure 18:
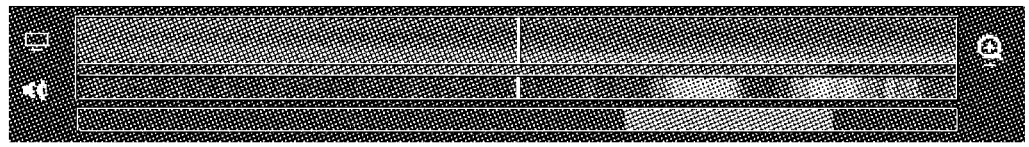
FIGS. 18 to 22 provide examples of a sequence of source image frames processed to provide a method of enabling efficient navigation of video.
Figure 19:
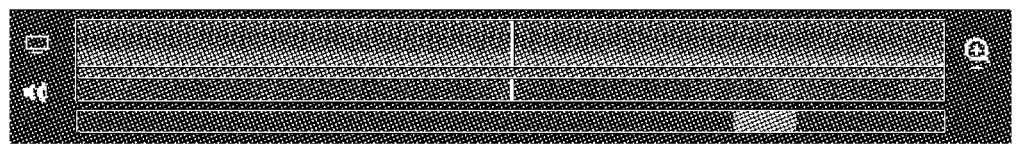
Figure 20:
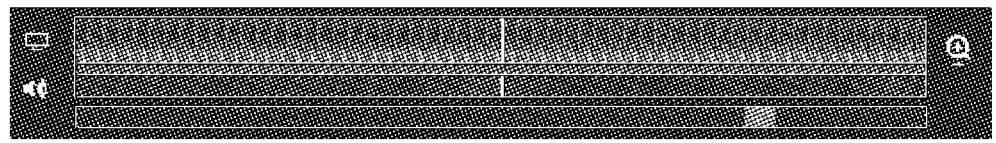
Figure 21:
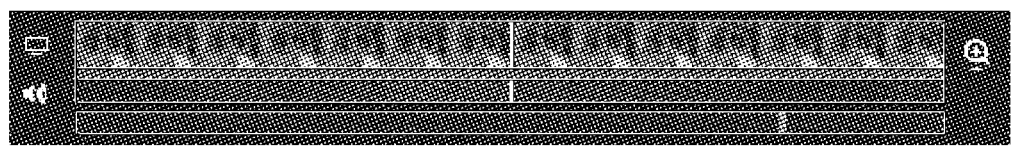
Figure 22:
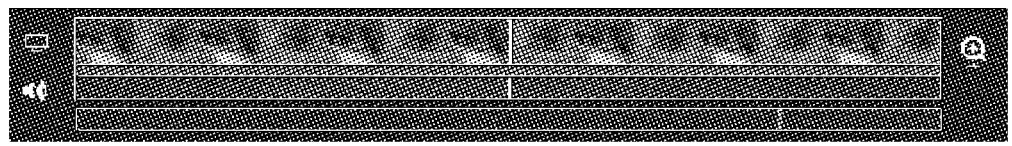
Figure 23:
FIG. 23 is an example of additional horizontal reductions, in a method of enabling efficient navigation of video.
Figure 24:
FIG. 24 is an example of a computer display providing a method of enabling efficient navigation of video.

An example of the above system for providing video clips very quickly is provided in FIG. 17. In FIG. 17, each arrow signifies "is used by".

Example Workflow

In an example, the workflow comprises four elements: (1) Ingest, (2) Editing, (3) Publishing and (4) Distribution.

(1) Ingest. A video suite (e.g. the Blackbird video suite (www.blackbird.video)) allows live ingest from Serial Digital Interface (SDI) feeds. This uses the sources production staff can use to decide whether to add beeps to the audio, or other censorship methods. These feeds are available at the broadcaster through physical SDI cables, and have no 30 second latency—in fact not even a one frame latency. By using these feeds, the client has an immediate up to 30 second advantage over pirates recording the broadcast source.

Ingest software (eg. Forbidden's ingest software (http://www.forbidden.co.uk/products/apps/)) running on local hardware, such as a Blackbird Edge Server, can compress the video stream as it comes in, transcoding it into a specialist cloud video editing proxy codec, eg. Blackbird codec, which is designed to support efficient cloud editing.

Blackbird Edge Server (https://www.blackbird.video/) enables the ingest of live and non-live content from baseband SDI, IP streams, and files. Encoded streams are captured to mezzanine (that is, a lower resolution version of the original source which is good enough quality to render published edits from), high resolution and the unique Blackbird proxy for use within the Blackbird Cloud platform.

Both stream and file-based content can be used for a variety of enrichment, production, captioning and publishing workflows.

Blackbird is a proprietary video codec developed by Forbidden Technologies and used by their flagship product (now renamed from Forscene to Blackbird). Blackbird is designed for both editing and video playback over variable speed internet connections. Blackbird can provide consistent picture quality on slow connections by allowing the player, editor or other application to vary the frame rate of the video downloads and subsequent decompression and playback. The Blackbird video codec facilitates a content-aware dynamic frame rate. The codec can create a lightweight proxy, which can be used to deliver a live stream from an event.

The Forbidden Technologies video formats, such as Blackbird 9, include one or more chunks of video information, each typically covering approximately one or two seconds of video content, with audio information in sections of typically ten seconds.

These sections are often combined in sections of e.g. 20 chunks at a time to increase storage efficiency and access speed from hard disk storage. But while they are being combined, the ingest server makes each section available without waiting for the subsequent sections.

In an example application of the above technical approach, a 32 frame section of video shot in 30 frame per second NTSC video format may be available for upload to the cloud for editing just over a second after the relevant frame was recorded and the live action happened.

(2) Editing. An editor (e.g. the Blackbird editor), which runs on a local computer connected to a cloud back end, pulls ingested video down from the cloud as required. If the relevant frames of video being requested have not yet been uploaded into the cloud, the cloud server hosting the editor (e.g. the Blackbird editor) pulls the video up from ingest server (eg the Blackbird Edge Server) where it is being ingested and then passes it on to the editor.

Each period of video proxy is split into pieces representing the period of time, but containing information about different frame rates in the period. This allows very rapid editing of near live content, even over relatively slow connections.

A method may be provided which allows rapid navigation of the live feeds. An example is provided in the "A Method for Enabling Efficient Navigation of Video" section of this document. The splitting of each period of video allows clip in and out points to be selected to frame accuracy without having to display or even download all the frames in a clip. As a result, clips can be chosen with perfect frame accuracy in less time than it takes the person editing the content to view or even download each clip. Clips can be logged and/or reviewed in parallel.

Similarly, clips can be combined in the editor (e.g. the Blackbird editor) instantly as they are selected, making it possible to edit content as it comes in with minimal latency compared to the live feed.

Consequently, a period of action which takes 20 seconds can have clips chosen from it and edited together while the action is going on, and the edit completed shortly after the action has finished. The editor can also add standard effects including (but not limited to) titles, transitions, colour correction, audio levels, logos, and branded sting video clips at the start and end of the edited video. The stings may be added automatically each time the video is published. A logo sting is the little animation of a logo at the end of a video or commercial.

Thus a 20 second period of action may be fully edited by 25 seconds after the action starts, ie 5 seconds after it ends. On a broadcast with a 30 second transmission delay, the edit in this case would be finished 5 seconds before the start of the source is broadcast.

(3) Publishing. In typical commercial solutions, publishing of edited internet video typically requires a video file in a standard player format, such as MPEG. This file must be made by rendering the edits from the original sources, with titles, colour correction, audio levels, stings and any other edited features being calculated frame-by-frame and the result incorporated into the new video file. A 10 second edited highlight can require around 10 seconds to render before it can be distributed—and a further few seconds to upload to the next stage of the workflow. A minute long edit (for example an altercation) could take a minute to render and significant time to upload.

A JavaScript player (e.g. Blackbird's JavaScript player) may allow the edited video to be played back in real time without any pre-rendering. The JavaScript player (e.g. Blackbird's JavaScript player) plays back in real time by rendering the edits on the fly, like the editor (eg. the Blackbird editor) used to create the edits in the video in the first place. The result is that the publishing is essentially instant: all that needs to happen is that the player needs to be told where the electronic Edit Decision List (EDL) is stored in the cloud. The electronic EDL already points to the relevant content, also accessible through the cloud, needed to construct the finished video.

An edit decision list or EDL is used in the post-production process of film editing and video editing. The list contains an ordered list of reel and timecode data representing where each video clip can be obtained in order to conform the final cut. EDLs are created by editing systems, or can be paper documents constructed by hand such as shot logging. These days, linear video editing systems have been superseded by non-linear editing (NLE) systems which can output EDLs electronically to allow autoconform—the recreation of an edited programme from the original sources (usually video tapes) and the editing decisions in the EDL. Electronic EDLs are also often used in the digital video editing world, so rather than referring to reels they can refer to sequences of images stored on disk.

Consequently, it takes essentially no time to publish edited videos which have been edited (e.g. in Blackbird editor) for playback on the web-based player (e.g. Blackbird's JavaScript player).

(4) Distribution. In a traditional system, an editor must upload a flat rendered edited video master to a re-renderer device which makes multiple versions from the master. These are made at various data rates and qualities for different devices and connection speeds. This upload can take anywhere from seconds to minutes, depending on the ease of moving the content from a local edit computer to the re-renderer system. This re-renderer then has to produce multiple copies, which again takes time. This content then needs to be moved to the distribution network servers. Finally, in order to view the content, the end user must download this video for playback. This process can take significant time for a live event situation, where time is of the essence.

The technical approach in this example works differently—and much faster. The proxy video as ingested live is already of a quality suitable for distribution. Also, by the time it is published, it is typically already in the cloud (eg. the Blackbird Cloud). The cloud service used (e.g. the Blackbird Cloud, which is hosted on the internet backbone) has significant bandwidth—sufficient for distribution to end users.

Furthermore, the ingest process can produce multiple proxies concurrently, each at a different resolution. Any proxy can play over a wide range of bandwidth connections with no delays for buffering during playback: the player can skip frames if the download is too slow to play every frame. In this case, where the bandwidth is insufficient to playback every frame, the displayed frames are approximately evenly spaced, with audio prioritised, to maximise the viewer experience.

On a low bandwidth connection, smaller proxy videos will need lower bandwidth and consequently play at a higher frame rate than a larger proxy. Hence there is no need for a separate re-render stage for multiple resolutions—the viewer chooses a resolution of the appropriate size for their bandwidth, and the web-based player (e.g. Blackbird's JavaScript player) plays back the edit from the proxy videos of the relevant size. Although this process can be automated, the manual option allows the viewer some control over the bandwidth of their feed—important on expensive data-limited mobile contracts.

In combination, these features mean that readying the published video for distribution takes a very small amount of time.

When the player uses Hypertext Transfer Protocol (HTTP) files, these can be cached in the local browser and at devices all along the internet route, significantly reducing the load on the cloud service (eg. the Blackbird Cloud). The more popular a video, the better it will cache (giving a higher cache hit rate), and the higher the serving efficiency. If the demand is sufficiently widely distributed to overload the server, despite the caching, the system may automatically reduce the frame rate of the video players, while allowing playback to continue without stopping. When the full server bandwidth is saturated, not all users can see full frame rate, and frame rates start to drop (while still providing video and audio without delays for buffering). The continuous adaptation allows a high (e.g. up to 20×) number of concurrent users to experience continuous video (with audio), at ever lower frame rates.

In this example, no time is required to upload the edited video to a renderer, or to a distribution network, because the video is already the right content in the right place, and because the edited video is played back using the web-based player (e.g. Blackbird's JavaScript player) which uses an electronic EDL to select and play the edited video in real time.

Conclusion

The example workflows allow live video productions to be ingested, edited, published, distributed and viewed in seconds-faster than the typical up to 30 s live delay for broadcast television.

Details of Some Components in an Example System
Ingest
Low Latency to Editor

Problem solved: fastest possible publish-editing has to start as soon as possible.

Solution: video must be put into chunks (chunked) as there are too many frames to upload efficiently separately. Chunks cannot be entire video because this makes editing out subsections slow. Chunks are described in more detail in the section of this document entitled "A Method Of Compressing Video Data And A Media Player For Implementing the Method".

Chunking of Frames

Problem solved: Fast access to any part of the content; playback at any speed to allow efficient navigation; network friendly access.

Solution: A chunk is all the frames between one point in time and another point in time. Frames in a chunk are stored in temporal groups, with differing separation/temporal density for the frames in each group. Groups from eg 20 consecutive chunks can be combined to minimise number of disc accesses. A navigation tool (eg. Blackbird Waveform) at various zoom levels can access all frames for a number of group levels, depending on the zoom (except when zoomed right out when only some key frames can be accessed). An example of such a navigation tool is provided in the "A Method for Enabling Efficient Navigation of Video" section of this document.

Upload Priorities

Problem solved: to allow useful access as soon as possible, and before all the content is uploaded.

Solution: the audio is uploaded first (and very quickly because of its low data rate). When this is up to date, the key frame groups are uploaded. When both of these uploads are up to date, the coarsest temporal resolution delta frames are uploaded. When all of the above uploads are up to date, the next coarsest temporal resolution is uploaded etc. until all the content is uploaded. As new groups arrive during a live video ingest, the process starts each new upload by looking at the highest priorities first, as above. The editor or other application software can request higher temporal resolution groups near the current frame being viewed in the editor or other application allowing frame accurate editing or navigation around points of interest (such as in and out points), so frame accurate edits can be completed (and published with an example system) before the remainder of the groups within the clip are fully uploaded, with the result that you don't have to wait for the finest grained frames to arrive before you can complete your frame accurate edit.

Multiple Concurrent Proxy Sizes

Problem solved: To allow viewers to influence the amount of internet bandwidth they use; to support viewers and editors with varying internet connection speeds, screen areas and processing time.

Solution: ingest produces video files at multiple resolutions concurrently eg 180p, 216p, 288p, 360p, 540p, 720p, 1080p. These are all 16:9 width:height ratio but this is not a requirement, with 9:16, 1:1, 4:3, and other ratios as required. (In the case of an MPEG-style source, the source is decoded only once, and compressed to all these resolutions.) (Pixels are averaged when producing lower resolution versions to reduce noise.)

A Suitable Codec (Eg. Blackbird Codec)

Problem solved: standard video codecs cannot deliver either easy access or a good experience for cloud video activities, including navigation, editing and fast publishing, and to some extent playback.

Solution: A tailor made suitable cloud video codec which allows rapid workable access to the content from any point, which is efficient enough to run in a browser without installation or configuration (because of its efficient use of processor time), can work on limited internet bandwidth, and supports responsive experience by use of such features as caching and speculative processing. Related disclosures are provided in the "A METHOD OF COMPRESSING VIDEO DATA AND A MEDIA PLAYER FOR IMPLE- MENTING THE METHOD" and "IMPROVEMENTS TO REPRESENTATIONS OF COMPRESSED VIDEO" sections of this document.

Mobile App Options

Problem solved: mobile devices are the commonest computing-enabled devices, and they lack powerful cloud video tools.

Solution: Initially apps for Android tablets and phones, Apple iPad, and later web-based player (eg. JavaScript Blackbird Player) for playback in mobile web browsers. Unlike hardware supported MPEG solutions, the technical approach (eg. the Blackbird solution) is entirely in software and can support numerous features other than video playback, including high frame rate display during shuttling, clipping and sharing, playback at multiple speeds etc.

Edit

Navigation (Eg. Blackbird Waveform Navigation)

Problem solved: to show a précis of a video+audio video, which highlights activity (or lack of it) in a video. It also affords quick access to relevant areas of a video.

Solution: An example of such a navigation tool is provided in the "A Method for Enabling Efficient Navigation of Video" section of this document. The tool should display a summary of a video where every frame influences the visible display, and the summary can be displayed at a vast range of scales from multiple levels of frame accurate access to, in principle, any level of coarseness. There is a visual metaphor associating time in the Navigation (eg. Blackbird Waveform navigation) tool to horizontal space in many scenes. This makes the tool very intuitive.

A navigation tool (eg. Blackbird Waveform) at various zoom levels can access all frames for a number of group levels, depending on the zoom (except when zoomed right out when only some key frames can be accessed). An example of such a navigation tool is provided in the "A Method for Enabling Efficient Navigation of Video" section of this document.

Real Time Playback/Rendering

Problem: waiting for rendering slows down editing process

Solution: software that is so efficient that it renders during playback

Responsiveness

Possible Solutions: folder loads; navigation tool resolution downloads; zoomed out navigation tool in solid-state drive (SSD) database (DB); key frames in SSD-DB to speed up shuttling; caching of decompressed frames (and compressed frames); multi-core decoding; few buttons on interface by using secondary mouse clicks and drags for advanced features, drag and drop combines a source with an action (determined by the destination).

Upload on Demand where Needed

Problem: Video may not all be yet uploaded to cloud

Solution: Edit software, player software, and other applications, downloads video from the cloud (eg the Blackbird cloud), often speculatively, when it calculates you will be needing it.

Primary and Secondary Buttons for Simple Usage and Advanced Ones

Problem: Beginners need to be able to learn how to use the system quickly without irrelevant user interface clutter; advanced users need quick and efficient access to comprehensive capabilities. Making use of a secondary button to give an advanced version of the primary button action eg single step backwards and forwards, enable audio/enable audio levels, colour correction on video window, open files root or previous folder, undo/redo. This secondary button halves the number of buttons, simplifying the interface appearance and allowing bigger buttons which makes it faster to use. Plays buttons are video windows themselves—the biggest buttons on the screen (we introduced this idea back in 1991).

Built in Chat

Problem: Communication between team members (including support) is difficult both globally and even on a different floor of the same building.

Solution: Built in chat where you can share ideas through text and video content privately or publicly, as well as get technical support.

Remote Control (eg. Blackbird Remote Control)

Problem: Supporting someone who is new and doesn't even know the names used for the buttons Solution: Remote control allows the support member to control the user's editor instance (eg. Blackbird editor) remotely from his/her own computer. No software is installed on the client machine, as everything runs through the editor via the cloud and runs in the editor sandbox.

Drag and Drop Allows Compatibility with Mobile App Versions

Problem: People want to run software on their mobiles, which don't have a keyboard or mouse; people have big fingers compared with the accuracy of a mouse pointer.

Solution: use drag and drop interface with big buttons.

Launched from a Browser

Problem: Many companies don't allow installation of software; users may not be allowed to install software on other people's computers, which they might want to use to run our cloud software; software can be out of date. Availability of video editing software running without installation is limited.

Solution: Cloud software launched from browser, running without configuration or installation. We are the leaders in providing such tools.

Problem: Garbage collection, a process whereby unused memory is freed up by the system automatically, is not generally under the control of the software, and also not generally suitable for a real time environment as program execution can lock up during this process Solution: Write an entire infrastructure, including video codecs and windowing library, which doesn't generate garbage in Java or JavaScript (as in the Blackbird system, for example).

Publish

FTL supports the near instant creation of a web page suitable for being in an iframe (a Hypertext Markup Language (HTML) element), with an electronic EDL player.

Problem: How to get an edited video viewable on the web as quickly as possible.

Solution: to, in a fraction of a second, make a stand-alone page, containing embeddable edited video, which is hosted in the cloud on a fast internet connection.

Drag and Drop Integrated Publishing

Problem: How to get edited video from your editing system to viewers quickly.

Solution: We implement a system of preset buttons which act as drag and drop targets, which produce the result specified in the settings eg resize window options, electronic EDL re-publish via clipping interface, help button options, full screen playback options, or as appropriate.

Distribution/Viewing

Playback from Web Page

See above

PC/Mac/Mobile Via Browser

Playback using web-based player (e.g. Blackbird's JavaScript player) renders electronic EDL without installation.

Problem: A viewer needs to see an edited video without delay. Rendering and uploading an edited video takes time, delaying viewing and thus causing a cost.

Solution: Make video available without rendering via a web link which plays on browsers. Video is hosted on the cloud (eg. Blackbird Cloud) and is available anywhere in the world. The video is played back using a web-based player (e.g. Blackbird's JavaScript player), which plays back the videos represented by the edits in real time on any PC/Mac/modern mobile device. Multiple resolutions are available.

JavaScript Implementation

Problem: video player software needs to play back on any device without requiring installation or configuration. Java, for example, is not always pre-installed these days.

Solution: The video is compressed using a suitable compressor (eg. Blackbird®) and the Player, which runs entirely in JavaScript and has a relatively small footprint, is included in the web page code. Suitable compressors are described in the "A METHOD OF COMPRESSING VIDEO DATA AND A MEDIA PLAYER FOR IMPLEMENTING THE METHOD" and "IMPROVEMENTS TO REPRESENTATIONS OF COMPRESSED VIDEO" sections of this document. New more efficient implementations, such as WebAssembly, are also supported. This takes less storage, runs faster, and increases efficiency further.

Frame Accurate Navigation in Player

A navigation tool (eg. Blackbird Waveform) is provided. An example of such a navigation tool is provided in the "A Method for Enabling Efficient Navigation of Video" section of this document.

Clipper on Player with Republishing

Problem: You want to enable viewers to share part of your published video—for example to share a scene from a film or a news story from a news programme.

Solution: The web-based player (e.g. Blackbird's JavaScript player) includes a clipper option, which generates a new web page which contains a subset of the video clip between marked in and out points. This can be played back (and re-clipped) in the same way as the original. In FTL, generating this is as fast as the original publish.

Any Material not Uploaded is Still Visible on Demand

Problem: Your ingest takes place in a limited bandwidth environment. You want to enable viewers to watch your edited video even before the whole content is uploaded.

Solution: the web-based player (e.g. Blackbird's JavaScript player) is allowed to request content directly from the ingest (Edge) server, or from the cloud, which prioritises such uploads. This allows viewers to watch content which hasn't finished uploading. The web-based player (e.g. Blackbird's JavaScript player) requests the relevant frames before they are reached and plays back as many frames as are available.

Choice of Image Size During Playback

Problem: Bandwidth may be costly or limited on a viewer's device in their location, and processor time may be limited. They don't necessarily want to download the highest quality video available.

Solution: The example system supplies multiple resolutions. The user can switch between them.

A navigation tool (eg. Blackbird Waveform) is provided. An example of such a navigation tool is provided in the "A Method for Enabling Efficient Navigation of Video" section of this document.

Automatic Adaptation for Low Bandwidth Client Internet

Problem: Client may have limited bandwidth to play back video.

Solution: Rather than buffer, the web-based player (e.g. Blackbird's JavaScript player) maximises frame rate (without buffering) by downloading, decompressing and displaying appropriate groups of video frames as it plays back.

Automatic Adaptation for the Internet Connection Speed of Busy Servers

Problem: Server bandwidth may be saturated by hosting of popular videos.

Solution: Clients limit their frame rate requested to match the amount they are actually downloading by only requesting a higher frame rate group when the lower groups have all arrived. As a result, the server automatically serves lower frame rates to users to meet the limit of its available upload bandwidth.

Cached Video for Playback

Problem: The same video is served to multiple people wasting server bandwidth and increasing cost.

Solution: Videos are cacheable by any switch or proxy on the internet between the server and the client. Thus the web-based player (e.g. Blackbird's JavaScript player) can use the most local copy of the files it requires, minimising server load, and maximising download speed.

Private Key Encryption (Eg. Blackbird Private Key Encryption)

Problem: Some videos are charged for. How do you allow HTTP and hence caching and low server load by not encrypting all the videos, while giving some level of protection to the videos?

Solution: Where HTTPS is not required, the video codec (eg. Blackbird video codec) also supports private keys to randomise the initial state of its Transition Tables, making each bitstream randomised. Each player can contain this private key, but if the video codec is not a published standard (eg. because it is a Blackbird video codec), there are currently no third party players, and it would be uneconomical to hack a player. New incompatible players can be generated easily by providing new keys, so any attempt to create a pirated player could be made incompatible quickly, limiting its utility and useful lifetime—in a world of FTL where value is time-sensitive.

Improvements to Representations of Compressed Video

This section of this document relates to disclosures made in WO2005048607A1, U.S. Pat. No. 9,179,143B2 and U.S. Pat. No. 8,711,944B2, which may relate to the inventions of the present document.

There is provided a method of compressing digital data comprising the steps of (i) reading digital data as series of binary coded words representing a context and a codeword to be compressed, (ii) calculating distribution output data for the input data and assigning variable length codewords to the result; and (iii) periodically recalculating the codewords in accordance with a predetermined schedule, in order to continuously update the codewords and their lengths.

This disclosure relates to a method of processing of digital information such as video information. This digital video information may be either compressed for storage and then later transmission, or may be compressed and transmitted live with a small latency.

Transmission is for example over the internet.

There is a need for highly efficient compression techniques to be developed to enable transmission of video or other data in real time over the internet because of the restrictions in the bandwidth. In addition, the increasing need for high volume of content and rising end-user expectations mean that a market is developing for live compression at high frame rate and image size.

An object of this disclosure is to provide such compression techniques.

The video to be compressed can be considered as comprising a plurality of frames, each frame made up of individual picture elements, or pixels. Each pixel can be represented by three components, usually either RGB (red, green and blue) or YUV (luminance and two chrominance values). These components can be any number of bits each, but eight bits of each is usually considered sufficient.

The human eye is more sensitive to the location of edges in the Y values of pixels than the location of edges in U and V. For this reason, the preferred implementation here uses the YUV representation for pixels.

The image size can vary, with more pixels giving higher resolution and higher quality, but at the cost of higher data rate. Where the source video is in PAL format, the image fields have 288 lines with 25 frames per second. Square pixels give a source image size of 384×288 pixels. The preferred implementation has a resolution of 376×280 pixels using the central pixels of a 384×288 pixel image, in order to remove edge pixels which are prone to noise and which are not normally displayed on a TV set.

The images available to the computer generally contain noise so that the values of the image components fluctuate. These source images may be filtered as the first stage of the compression process. The filtering reduces the data rate and improves the image quality of the compressed video.

A further stage analyses the contents of the video frame-by-frame and determines which of a number of possible types pixel should be allocated to. These broadly correspond to pixels in high contrast areas and pixels in low contrast areas.

The pixels are hard to compress individually, but there are high correlations between each pixel and its near neighbours. To aid compression, the image is split into one of a number of different types of components. The simpler parts of the image split into rectangular components, called "super-blocks" in this application, which can be thought of as single entities with their own structure. These blocks can be any size, but in the preferred implementation described below, the super-blocks are all the same size and are 8×8 pixel squares. More structurally complex parts of the image where the connection between pixels further apart is less obvious are split up into smaller rectangular components, called "mini-blocks" in this application.

It is apparent that if each super-block is compressed separately, the errors resulting from the compression process can combine across edges between super-blocks thus illustrating the block-like nature of the compression by highlighting edges between blocks, which is undesirable. To avoid this problem, the mini-blocks are tokenised with an accurate representation and these are compressed in a loss free way.

Each super-block or mini-block is encoded as containing YUV information of its constituent pixels.

This U and V information is stored at lower spatial resolution than the Y information, in one implementation with only one value of each of U and V for every mini-block. The super-blocks are split into regions. The colour of each one of these regions is represented by one UV pair.

Real Time Filtering

An aim is to remove noise from the input video, as noise is by definition hard to compress. The filtering mechanism takes frames one at a time. It compares the current frame with the previous filtered frame on a pixel-by-pixel basis. The value for the previous pixel is used unless there is a significant difference. This can occur in a variety of ways. In one, the value of the pixel in the latest frame is a long way from the value in the previous filtered frame. In another, the difference is smaller, but consistently in the same direction. In another, the difference is even smaller, but cumulatively, over a period of time, has tended to be in the same direction. In these the first two cases, the pixel value is updated to the new value. In the third case, the filtered pixel value is updated by a small amount in the direction of the captured video. The allowable error near a spatial edge is increased depending on the local contrast to cut out the effects of spatial jitter on the input video.

Real Time Motion Estimation

The video frames are filtered into "Noah regions". Thus the pixels near to edges are all labelled. In a typical scene, only between 2% and 20% of the pixels in the image turn out to have the edge labelling. There are three types of motion estimation used. In the first, whole frame pan detection using integer number of pixels is implemented.

These motions can be implemented efficiently over the whole image on playback as pixels can be copied to new locations and no blurring is needed. This uses the edge areas from the Noah regions only, as the edges contain the information needed for an accurate motion search. The second is sub-pixel motion removal over the whole image.

This uses the edge areas from the Noah regions only, as the edges contain the information needed for an accurate motion search. The edge pixels in the image, estimated by example from the Noah filtering stage, are matched with copies of themselves with translations of up to e.g. 2 pixels, but accurate to e.g. 1/64 pixel (using a blurring function to smooth the error function) and small rotations. The best match is calculated by a directed search starting at a large scale and increasing the resolution until the required sub-pixel accuracy is attained. This transformation is then applied in reverse to the new image frame and filtering continues as before. These changes are typically ignored on playback. The effect is to remove artefacts caused by camera shake, significantly reducing data rate and giving an increase in image quality. The third type examines local areas of the image. Where a significant proportion of the pixels are updated, for example on an 8×8 pixel block, either motion vectors are tested in this area with patches for the now smaller temporal deltas, or a simplified super-block representation is used giving either 1 or 2 YUVs per block, and patches are made to this.

Real Time Fade Representation

The encoding is principally achieved by representing the differences between consecutive compressed frames. In some cases, the changes in brightness are spatially correlated. In this case, the image is split into blocks or regions, and codewords are used to specify a change over the entire region, with differences with these new values rather than differences to the previous frame itself being used.

Segment Noah Regions-Find Edges

A typical image includes areas with low contrast and areas of high contrast, or edges. The segmentation stage described here analyses the image and decides whether any pixel is near an edge or not. It does this by looking at the variance in a small area containing the pixel. For speed, in the current implementation, this involves looking at a 3×3 square of pixels with the current pixel at the centre, although implementations on faster machines can look at a larger area. The pixels which are not near edges are compressed using an efficient but simple representation which includes multiple pixels—for example 2×2 blocks or 8×8 blocks, which are interpolated on playback. The remaining pixels near edges are represented as either e.g., 8×8 blocks with a number of YUV areas (typically 2 or 3) if the edge is simply the boundary between two or more large regions which just happen to meet here, or as 2×2 blocks with 1 Y and one UV per block in the case that the above simple model does not apply e.g. when there is too much detail in the area because the objects in this area are too small.

Miniblockify

The image is made up of regions, which are created from the Noah regions. The relatively smooth areas are represented by spatially relatively sparse YUV values, with the more detailed regions such as the Noah edges being represented by 2×2 blocks which are either uniform YUV, or include a UV for the block and maximum Y and a minimum Y, with a codeword to specify which of the pixels in the block should be the maximum Y value and which should be the minimum. To further reduce the datarate, the Y pairs in the non-uniform blocks are restricted to a subset of all possible Y pairs which is more sparse when the Y values are far apart.

Transitions with Variable Lengths Codewords

Compressing video includes in part predicting what the next frame will be, as accurately as possible from the available data, or context. Then the (small) unpredictable element is what is sent in the bitstream, and this is combined with the prediction to give the result. The transition methods described here are designed to facilitate this process. On compression, the available context and codeword to compress are passed to the system. This then adds this information to its current distribution (which it is found performs well when it starts with no prejudice as the likely relationship between the context and the output codeword). The distribution output data for this context is calculated and variable length codewords assigned to the outcomes which have arisen. These variable length codewords are not calculated each time the system is queried as the cost/reward ratio makes it unviable, particularly as the codewords have to be recalculated on the player at the corresponding times they are calculated on the compressor. Instead, the codewords are recalculated from time to time. For example, every new frame, or every time the number of codewords has doubled. Recalculation every time an output word is entered for the first time is too costly in many cases, but this is aided by not using all the codeword space every time the codewords are recalculated. Codeword space at the long end is left available, and when new codewords are needed then next one is taken. As these codewords have never occurred up to this point, they are assumed to be rare, and so giving them long codewords is not a significant hindrance. When the codeword space is all used up, the codewords are recalculated. The minimum datarate for Huffman codewords is a very flat and wide minimum, so using the distribution from the codewords which have occurred so far is a good approximation to the optimal. Recalculating the codewords has to happen quickly in a real time system. The codewords are kept sorted in order of frequency, with the most frequent codewords first. In an example, the sorting is a mixture of bin sort using linked lists which is O(n) for the rare codewords which change order quite a lot, and bubble sort for the common codewords which by their nature do not change order by very much each time a new codeword is added. The codewords are calculated by keeping a record of the unused codeword space, and the proportion of the total remaining codewords the next data to encode takes. The shorted codeword when the new codeword does not exceed its correct proportion of the available codeword space is used. There are further constraints: in order to keep the codes as prefix codes and to allow spare space for new codewords, codewords never get shorter in length, and each codeword takes up an integer power of two of the total codeword space. This method creates the new codewords into a lookup table for quick encoding in O(n) where n is the number of sorted codewords.

Memory Management

To facilitate Java playback, all the memory used is allocated in one block at the start. As garbage collection algorithms on Java virtual machines are unpredictable, and many stop the system for periods which are long in comparison to the length of a video frame, the computer method or apparatus may use its own memory management system. This involves allocating enough memory for e.g. 2 destination codewords for each source codeword when it is first encountered. New transitions are added as and when they occur, and when the available space for them overflows, the old memory is ignored, and new memory of twice the size is allocated. Although up to half the memory may end up unused, the many rare transitions take almost no memory, and the system scales very well and makes no assumption about the distribution of transitions.

Give Compressed Codeword for this Uncompressed Codeword

Every time a codeword occurs in a transition for the second or subsequent time, its frequency is updated and it is re-sorted. When it occurs for the first time in this transition however, it must be defined. As many codewords occur multiple times in different transitions, the destination value is encoded as a variable length codeword each time it is used for the first time, and this variable length codeword is what is sent in the bitstream, preceded by a "new local codeword" header codeword. Similarly, when it occurs for the first time ever, it is encoded raw preceded by a "new global codeword" header codeword. These header codewords themselves are variable length and recalculated regularly, so they start off short as most codewords are new when a new environment is encountered, and they gradually lengthen as the transitions and concepts being encoded have been encountered before.

Video Compression (Cuts)

Cuts are compressed using spatial context from the same frame.

Cuts, RLE uniform shape, else assume independent and context=CUT_CW.

Cuts->editable, so needs efficient. First approximation at lower resolution e. g., 8×8.

Cuts-predict difference in mini-block codewords from previous one and uniform flag for current one.

Video Compression (Deltas)

The deltas can use temporal and spatial context.

Deltas shape-predict shape from uniformness of four neighbours and old shape.

Deltas-predict mini-block codeword differences from uniformness of this miniblock and old mini-block in time.

Datarate Reductions

Various simple but effective datarate reduction methods are employed. Noise in the input signal can lead to isolated small changes over the image, whose loss would not be noticed. Isolated changed mini-blocks are generally left out from the bitstream, though if the mini-block is sufficiently different they can still be updated. In addition, small changes in colour in high colour areas are generally ignored as these are almost always caused by noise.

Multi-level gap masks: 4×4, 16×16, 64×64

The bulk of the images are represented mbs and gaps between them. The gaps are spatially and temporally correlated. The spatial correlation is catered for by dividing the image into 4×4 blocks of mbs, representing 64 pixels each, with one bit per mini-block representing whether the mbs has changed on this frame. These 4×4 blocks are grouped into 4×4 blocks of these, with a set bit if any of the mbs it represents have changed. Similarly, these are grouped into 4×4 blocks, representing 128×128 pixels, which a set bit if any of the pixels has changed in the compressed representation. It turns out that trying to predict 16 bits at a time is too ambitious as the system does not have time to learn the correct distributions in a video of typical length. Predicting the masks 4×2 pixels at a time works well. The context for this is the corresponding gap masks from the two previous frames. The transition infrastructure above then gives efficient codewords for the gaps at various scales.

Multiple Datarates at Once

One of the features of internet or intranet video distribution is that the audience can have a wide range of receiving and decoding equipment. In particular the connection speed may vary widely. In a system such as this designed for transmission across the internet, it helps to support multiple datarates. So the compression filters the image once, then resamples it to the appropriate sizes involving for example cropping so that averaging pixels to make the final image the correct size involves averaging pixels in rectangular blocks of fixed size. There is a sophisticated datarate targeting system which skips frames independently for each output bitstream. The compression is sufficiently fast on a typical modern PC of this time to create modem or midband videos with multiple target datarates. The video is split into files for easy access, and these files may typically be 10 seconds long, and may start with a key frame. The player can detect whether its pre-load is ahead or behind target and load the next chunk at either lower or higher datarate to make use of the available bandwidth. This is particularly important if the serving is from a limited system where multiple simultaneous viewers may wish to access the video at the same time, so the limit to transmission speed is caused by the server rather than the receiver. The small files will cache well on a typical internet setup, reducing server load if viewers are watching the video from the same ISP, office, or even the same computer at different times.

Key Frames

The video may be split into a number of files to allow easy access to parts of the video which are not the beginning. In these cases, the files may start with a key frame. A key frame contains all information required to start decompressing the bitstream from this point, including a cut-style video frame and information about the status of the Transition Tables, such as starting with completely blank tables.

Digital Rights Management (DRM)

DRM is an increasingly important component of a video solution, particularly now content is so readily accessible of the internet. Data typically included in DRM may be an expiry data for the video, a restricted set of URLs the video can be played from. Once the compressor itself is sold, the same video may be compressed twice with different DRM data in an attempt to crack the DRM by looking at the difference between the two files. The compression described here is designed to allow small changes to the initial state of the transition or global compression tables to effectively randomise the bitstream. By randomizing a few bits each time a video is compressed, the entire bitstream is randomized each time the video is compressed, making it much harder to detect differences in compressed data caused by changes to the information encoded in DRM.

Miscellaneous

The Y values for each pixel within a single super-block can also be approximated.

In many cases, there is only one or part of one object in a super-block. In these cases, a single Y value is often sufficient to approximate the entire super-block's pixel Y values, particularly when the context of neighbouring super-blocks is used to help reconstruct the image on decompression.

In many further cases, there are only two or parts of two objects in a super-block.

In these cases, a pair of Y values is often sufficient to approximate the entire superblock's Y values, particularly when the context of the neighbouring super-blocks is used to help reconstruct the image on decompression. In the cases where there are two Y values, a mask is used to show which of the two Y values is to be used for each pixel when reconstructing the original super-block. These masks can be compressed in a variety of ways, depending on their content, as it turns out that the distribution of masks is very skewed. In addition, masks often change by small amounts between frames, allowing the differences between masks on different frames to be compressed efficiently.

Improvements to image quality can be obtained by allowing masks with more than two Y values, although this increases the amount of information needed to specify which Y value to use.

Although this disclosure has been given with particular reference to video data, it will be appreciated that it could also be applied to other types of data such as audio data.

EXAMPLES

Figure 2A:
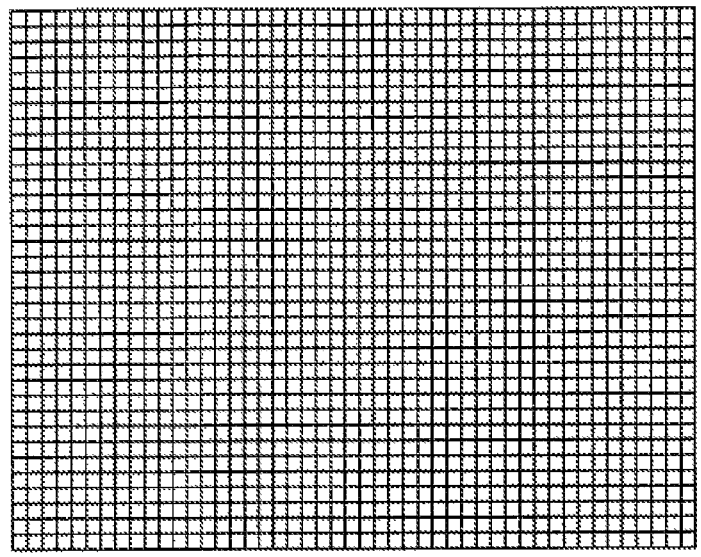
FIG. 2A shows a typical image of 376×280 pixels divided into 8×8 pixel super-blocks.
Figure 2B:
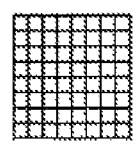
FIG. 2B shows a typical super-block of 8×8 pixels divided into 64 pixels.
Figure 3:
FIG. 3 shows a typical mini-block of 2×2 pixels divided into 4 pixels.
Figure 4:
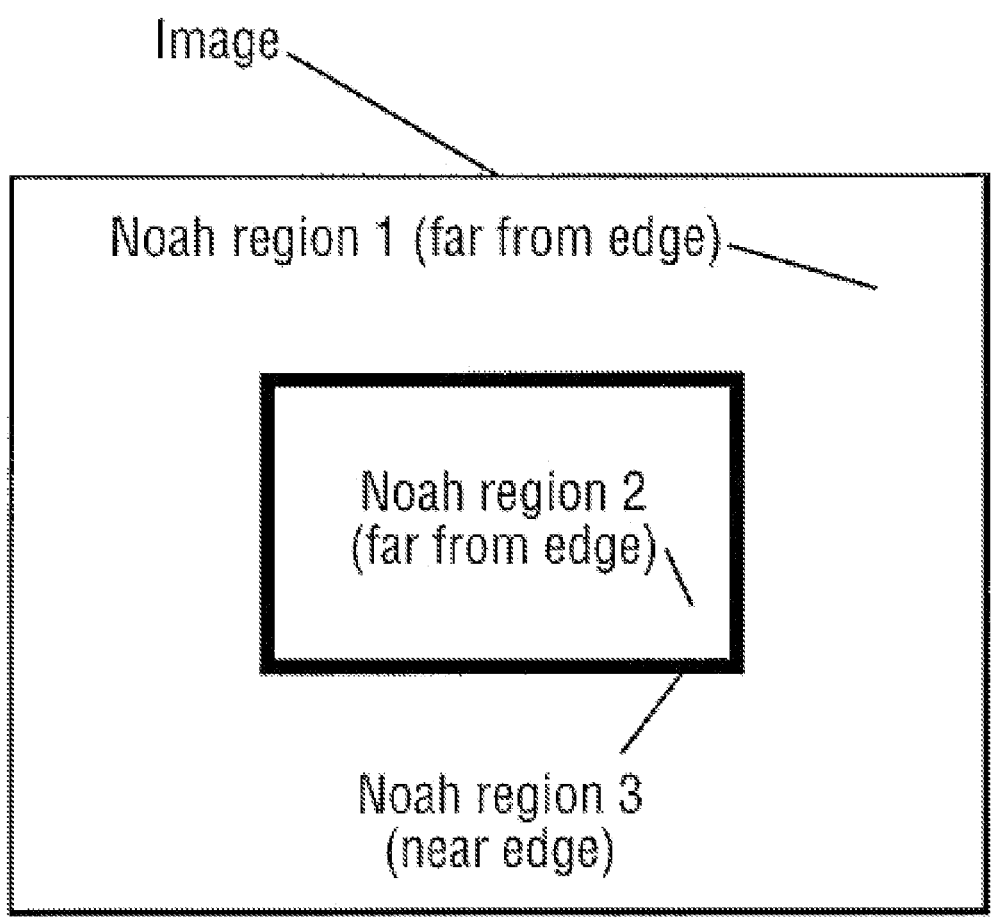
FIG. 4 shows an example image containing two Noah regions and a Noah edge.
Figure 9:
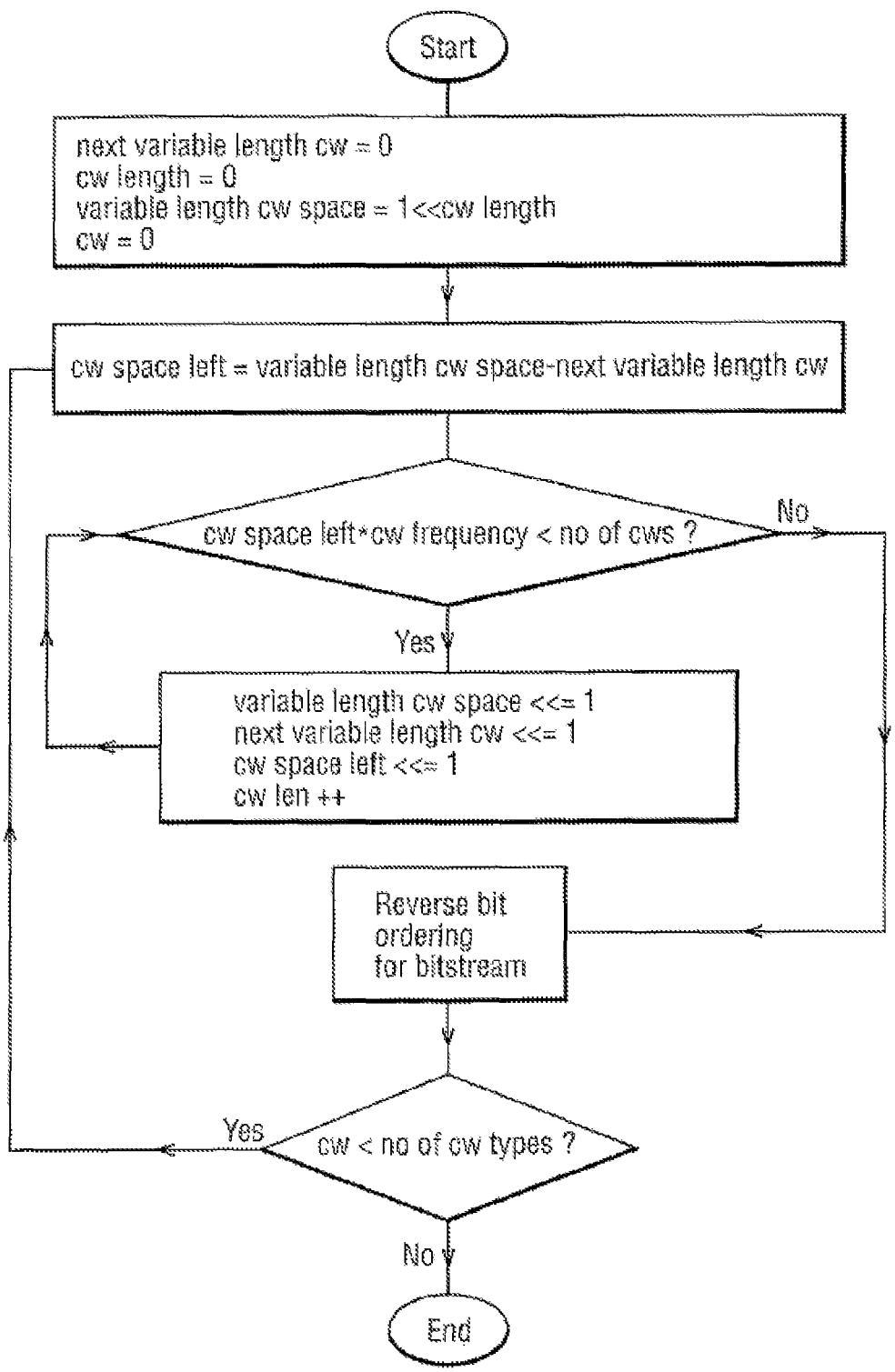
FIG. 9 is a flowchart showing how variable length codewords may be generated from a list of codewords sorted by frequency.

Video frames of typically 384×288, 376×280, 320×240, 192×144, 160×120 or 128×96 pixels (see e.g. FIG. 2A) are divided into pixel blocks, typically 8×8 pixels in size (see e.g. FIG. 2B), and also into pixel blocks, typically 2×2 pixels in size, called mini-blocks (see e.g. FIG. 3). In addition, the video frames are divided into Noah regions (see e.g. FIG. 4), indicating how complex an area of the image is.

In one implementation, each super-block is divided into regions, each region in each super-block approximating the corresponding pixels in the original image and containing the following information:

1 Y values (typically 8 bits)
   1 U value (typically 8 bits)
   1 V value (typically 8 bits)
   64 bits of mask specifying which YUV value to use when reconstructing this super-block.

In this implementation, each mini-block contains the following information:

2 Y values (typically 8 bits each)
   1 U value (typically 8 bits)
   1 V value (typically 8 bits)

4 bits of mask specifying which Y value to use when reconstructing this mini-block.

Temporal Gaps

If more latency is acceptable, temporal gaps rather than spatial gaps turn out to be an efficient representation. This involves coding each changed mini-block with a codeword indicating the next time (if any) in which it changes.

Interpolation Between Uniform Super-Blocks

Where uniform super-blocks neighbour each other, bilinear interpolation between the Y, U and V values used to represent each block is used to find the Y, U and V values to use for each pixel on playback.

In an example, there is provided a method of processing digital video information for transmission or storage after compression, said method comprising: reading digital data representing individual picture elements (pixels) of a video frame as a series of binary coded words; segmenting the image into regions of locally relatively similar pixels and locally relatively distinct pixels; having a mechanism for learning how contextual information relates to codewords requiring compression and encoding such codewords in a way which is efficient both computationally and in terms of compression rate of the encoded codewords and which dynamically varies to adjust as the relationship between the context and the codewords requiring compression changes and which is computationally efficient to decompress; establishing a reduced number of possible luminance values for each block of pixels (typically no more than four); encoding to derive from the words representing individual pixels further words describing blocks or groups of pixels each described as a single derived word which at least includes a representation of the luminance of a block component of at least eight by eight individual pixels (super-block); establishing a reduced number of possible luminance values for each block of pixels (typically no more than four); encoding to derive from the words representing individual pixels further words describing blocks or groups of pixels each described as a single derived word which at least includes a representation of the luminance of a block component of typically two by two individual pixels (mini-block); establishing a reduced number of possible luminance values for each block of pixels (typically one or two); providing a series of changeable stored masks as a mechanism for indicating which of the possible luminance values are to be used in determining the appropriate luminance value of each pixel for display; comparing and evaluating the words representing corresponding portions of one frame with another frame or frames in a predetermined sequential order of the elements making up the groups to detect differences and hence changes; identifying any of the masks which require updating to reflect such differences and choosing a fresh mask as the most appropriate to represent such differences and storing the fresh mask or masks for transmission or storage; using context which will be available at the time of decompression to encode the masks, the changes in Y values, U values, and V values, and the spatial or temporal gaps between changed blocks, combined with the efficient encoding scheme, to give an efficient compressed real time representation of the video; using variable length codewords to represent the result of transitions in a way which is nearly optimal from a compression point of view, and computational very efficient to calculate.

There is provided a method of compressing digital data comprising the steps of: (i) reading digital data as series of binary coded words representing a context and a codeword to be compressed; (ii) calculating distribution output data for the input data and assigning variable length codewords to the result; and (iii) periodically recalculating the codewords in accordance with a predetermined schedule, in order to continuously update the codewords and their lengths.

The method may be one in which the codewords are recalculated each time the number of codewords has doubled. The method may be one in which the codewords are recalculated for every new frame of data. The method may be one in which some codeword space is reserved at each recalculation so as to allow successive new codewords to be assigned for data of lower frequency.

There is provided a method of processing digital video information so as to compress it for transmission or storage, said method comprising: reading digital data representing individual picture elements (pixels) of a video frame as a series of binary coded words; segmenting the image into regions of locally relatively similar pixels and locally relatively distinct pixels; establishing a reduced number of possible luminance values for each block of pixels (typically no more than four); carrying out an encoding process so as to derive from the words representing individual pixels, further words describing blocks or groups of pixels each described as a single derived word which at least includes a representation of the luminance of a block component of at least eight by eight individual pixels (super-block); establishing a reduced number of possible luminance values for each smaller block of pixels (typically no more than four); carrying out an encoding process so as to derive from the words representing individual pixels, further words describing blocks or groups of pixels each described as a single derived word which at least includes a representation of the luminance of a block component of typically two by two individual pixels (mini-block); establishing a reduced number of possible luminance values for each block of pixels (typically one or two); providing a series of changeable stored masks to indicate which of the possible luminance values are to be used in determining the appropriate luminance value of each pixel for display; comparing and evaluating the words representing corresponding portions of one frame with another frame or frames in a predetermined sequential order of the elements making up the groups to detect differences and hence changes; identifying any of the masks which require updating to reflect such differences and choosing a fresh mask as the most appropriate to represent such differences and storing the fresh mask or mask for transmission or storage; using context which will be available the time of decompression to encode the masks, the changes in Y values (luminance), U values (chrominance), and V values (chrominance) and the spatial or temporal gaps between changed blocks, combined with the efficient encoding scheme, to give an efficient compressed real time representation of the video; and using variable length codewords to represent the result of transitions.

The method may be one in which the method further comprises an adaptive learning process for deriving a relationship between contextual information and codewords requiring compression, and a process for dynamically adjusting the relationship so as to optimise the compression rate and the efficiency of decompression.

There is provided a method of compressing digital data for storage or transmission, comprising the steps of:
(i) reading inputted digital data as series of binary coded words representing a context and an input codeword to be compressed;
(ii) calculating distribution output data for the inputted digital data and generating variable length prefix codewords for each combination of context and input codeword, and generating a respective sorted Transition Table of variable length prefix codewords for each context, in a manner in which codeword space at the long end is left available to represent new input codewords, which have not yet occurred with corresponding contexts, as they occur; and (iii) repeating the process of step (ii) from time to time;

(iv) wherein the inputted digital data can be subsequently replayed by recalculating the sorted Transition Table of local codewords at corresponding times in the inputted digital data.

The method may be one in which the codewords are recalculated for every new frame of data. The method may be one in which some codeword space is reserved at each recalculation so as to allow successive new codewords to be assigned for data of lower frequency. The method may be one in which some codeword space is reserved at each recalculation so as to allow successive new codewords to be assigned for data of lower frequency.

There is provided a method of compressing digital data for storage or transmission, comprising the steps of:

(i) reading digital data as a series of binary coded words representing a context and a codeword to be compressed;

(ii) calculating distribution output data for the input data and generating variable length prefix codewords for each combination of context and input codeword so as to form a respective sorted Transition Table of local codewords for each context, in a manner which reserves logical codeword space at the long end to represent any new input codewords, which have not yet occurred with that context, as they occur for the first time; and (iii) repeating the process of step (ii) from time to time;

(iv) wherein the input data can be subsequently replayed by recalculating the codeword tables at corresponding times in the input data, wherein the codewords are recalculated each time the number of codewords has doubled.

There is provided a method of compressing digital data for storage or transmission, comprising the steps of:

(i) reading digital data as a series of binary coded words representing a context and a codeword to be compressed;

(ii) calculating distribution output data for the input data and generating variable length prefix codewords for each combination of context and input codeword so as to form a respective sorted Transition Table of local codewords for each context, in a manner which reserves logical codeword space at the long end to represent any new input codewords, which have not yet occurred with that context, as they occur for the first time; and (iii) repeating the process of step (ii) from time to time;

(iv) wherein the input data can be subsequently replayed by recalculating the codeword tables at corresponding times in the input data, wherein the method further comprises an adaptive learning process for deriving a relationship between contextual information and codewords requiring compression, and a process for dynamically adjusting the relationship so as to optimize the compression rate and the efficiency of decompression.

A Method of Compressing Video Data and a Media Player for Implementing the Method This section of this document relates to disclosures made in WO2007077447A2 and U.S. Pat. No. 8,660,181B2, which may relate to the inventions of the present document.

There is provided a method of receiving video data comprising the steps of: receiving at least one chunk of video data comprising a number of sequential key video frames where the number is at least two and, constructing at least one delta frame between a nearest preceding key frame and a nearest subsequent key frame from data contained in the either or each of the nearest preceding and subsequent frames.

Visual recordings of moving things are generally made up of sequences of successive images. Each such image represents a scene at a different time or range of times. This disclosure relates to such sequences of images such as are found, for example, in video, film and animation.

Video takes a large amount of memory, even when compressed. The result is that video is generally stored remotely from the main memory of the computer. In traditional video editing systems, this would be on hard discs or removable disc storage, which are generally fast enough to access the video at full quality and frame rate. Some people would like to access and edit video files content remotely, over the internet, in real time. This disclosure relates to the applications of video editing (important as much video content on the web will have been edited to some extent), video streaming, and video on demand.

At present any media player editor implementing a method of transferring video data across the internet in real time suffers the technical problems that: (a) the internet connection speed available to internet users is, from moment to moment, variable and unpredictable; and (b) that the central processing unit (CPU) speed available to internet users is from moment to moment variable and unpredictable.

For the application of video editing, consistent image quality is very preferable, because many editing decisions are based on aspects of the image, for example, whether the image was taken in focus or out.

It is an object of the present disclosure to alleviate at least some of the aforementioned technical problems. Accordingly this disclosure provides a method of receiving video data comprising the steps of: receiving at least one chunk of video data comprising a number (n) of sequential key video frames where the number (n) is at least two and, constructing at least one delta frame between a nearest preceding key frame and a nearest subsequent key frame from data contained in either, or each, of the nearest preceding and subsequent frames.

Preferably the delta frame is composed of a plurality of component blocks or pixels and each component of the delta frame is constructed according to data indicating it is one of: the same as the corresponding component in the nearest preceding key frame, or the same as the corresponding component in the nearest subsequent key frame, or a new value compressed using some or all of the spatial compression of the delta frame and information from the nearest preceding and subsequent frames. After the step of construction, the delta frame may be treated as a key frame for the construction of one or more further delta frames. Delta frames may continue to be constructed in a chunk until either: a sufficiently good predetermined image playback quality criterion is met or the time constraints of playing the video in real time require the frames to be displayed. The number of key frames in a chunk may be in the range from n=3 to n=10.

Although the method may have other applications, it is particularly advantageous when the video data is downloaded across the internet. In such a case it is convenient to download each key frame in a separate download slot, the number of said download slots equating to the maximum number of download slots supportable by the internet connection at any moment in time. Preferably each slot is implemented in a separate thread. Where it is desired to subsequently edit the video it is preferable that each frame, particularly the key frames, are cached upon first viewing to enable subsequent video editing.

According to another aspect of this disclosure, there is provided a media player arranged to implement the method which preferably comprises a receiver to receive chunks of video data including at least two key frames, and a processor adapted to construct a delta frame sequentially between a nearest preceding key frame and a nearest subsequent key frame. Preferably, a memory is also provided for caching frames as they are first viewed to reduce the subsequent requirements for downloading.

According to a third aspect of this disclosure, there is provided a method of compressing video data so that the video can be streamed across a limited bandwidth connection with no loss of quality on displayed frames which entails storing video frames at various temporal resolutions which can be accessed in a pre-defined order, stopping at any point. Thus multiple simultaneous internet accesses can ensure a fairly stable frame rate over a connection by (within the resolution of the multitasking nature of the machine) simultaneously loading the first or subsequent temporal resolution groups of frames from each of a number of non-intersecting subsets of consecutive video frames until either all the frames in the group are downloaded, or there would probably not be time to download the group, in which case a new group is started.

This disclosure includes a method for enabling accurate editing decisions to be made over a wide range of internet connection speeds, as well as video playback which uses available bandwidth efficiently to give a better experience to users with higher bandwidth. Traditional systems have a constant frame rate, but the present disclosure relates to improving quality by adding extra delta frame data, where bandwidth allows.

A source which contains images making up a video, film, animation or other moving picture is available for the delivery of video over the internet. Images (2, 4, 6 . . . ) in the source are digitised and labelled with frame numbers (starting from zero) where later times correspond to bigger frame numbers and consecutive frames have consecutive frame numbers. The video also has audio content, which is split into sections.

The video frames are split into chunks as follows: A value of n is chosen to be a small integer 0≤n. In one implementation, n is chosen to be 5. A chunk is a set of consecutive frames of length 2^n. All frames appear in at least one chunk, and the end of each chunk is always followed immediately by the beginning of another chunk.

Figure 10:
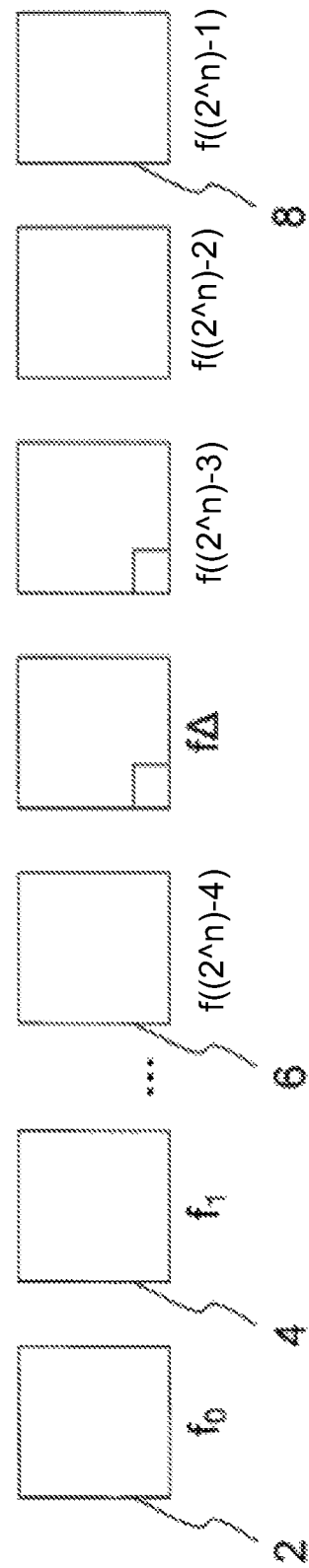
FIG. 10 is a schematic diagram of a sequence of video frames.

"f" represent the frame number in the chunk, where the earliest frame (2) in each chunk has f=0, and the last (8) has f=(2^n)-1 (see e.g. FIG. 10).

Figure 11:
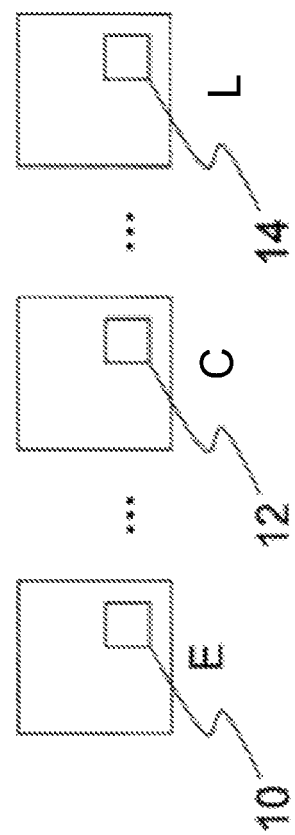
FIG. 11 is a schematic diagram illustrating an example of a construction of a delta frame.

All f=0 frames in a chunk are compressed as key frames—that is they can be recreated without using data from any other frames. All frames equidistant in time between previously compressed frames are compressed as delta frames recursively as follows: Let frame C (see e.g. FIG. 11) be the delta frame being compressed. Then there is a nearest key frame earlier than this frame, and a nearest key frame later than this frame, which have already been compressed. Let us call them E and L respectively. Each frame is converted into a spatially compressed representation, in one implementation comprising rectangular blocks of various sizes with four Y or UV values representing the four corner values of each block in the luminance and chrominance respectively.

Frame C is compressed as a delta frame using information from frames E and L (which are known to the decompressor), as well as information as it becomes available about frame C.

In one implementation, the delta frame is reconstructed as follows:

Each component (12) of the image (pixel or block) is represented as either: the same as the corresponding component (10) in frame E; or the same as the corresponding component (14) in frame L; or a new value compressed using some or all of spatial compression of frame C, and information from frames E and L.

Compressing the video data in this way allows the second part of this disclosure to function. This is described next. When transferring data across the internet, using the HTTP protocol used by web browsers, the described compression has advantages, for example enabling access through many firewalls. The two significant factors relevant to this disclosure are latency and bandwidth. The latency here is the time taken between asking for the data and it starting to arrive. The bandwidth here is the speed at which data arrives once it has started arriving. For a typical domestic broadband connection, the latency can be expected to be between 20 ms and 1s, and the bandwidth can be expected to be between 256 kb/s and 8 Mb/s.

Figure 12:
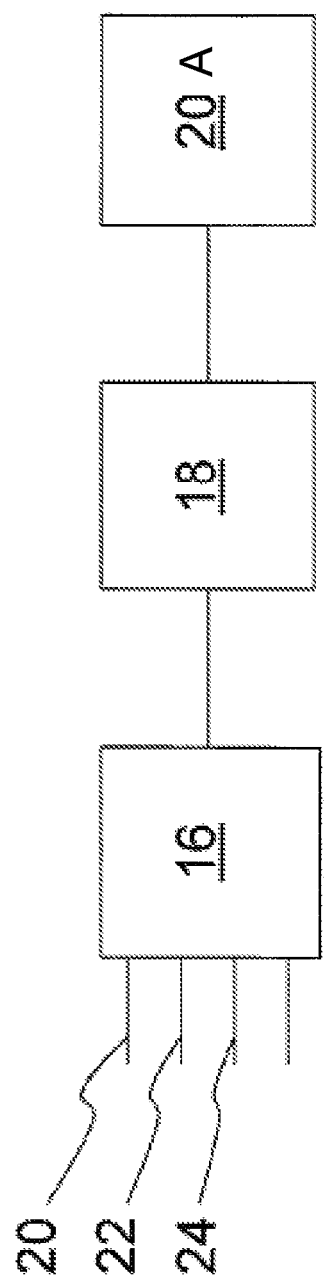
FIG. 12 is a schematic diagram of an example of a media player.

The disclosure involves one compression step for all supported bandwidths of connection, so the player (e.g. 16, FIG. 12) has to determine the data to request which gives the best playback experience. This may be done as follows:

The player has a number of download slots (20, 22, 24 . . . ) for performing overlapping downloads, each running effectively simultaneously with the others. At any time, any of these may be blocked by waiting for the latency or by lost packets. Each download slot is used to download a key frame, and then subsequent files (if there is time) at each successive granularity. When all files pertaining to a particular section are downloaded, or when there would not be time to download a section before it is needed for decompression by the processor (18), the download slot is applied to the next unaccounted for key frame.

In one implementation of the disclosure, each slot is implemented in a separate thread.

A fast link results in all frames being downloaded, but slower links download a variable frame rate at e.g. 1, ½, ¼, ⅛ etc of the frame rate of the original source video for each chunk. This way the video can play back with in real time at full quality, possibly with some sections of the video at lower frame rate.

In a further implementation, as used for video editing, frames downloaded in this way are cached in a memory (20A) when they are first seen, so that on subsequent accesses, only the finer granularity videos need be downloaded.

The number of slots depends on the latency and the bandwidth and the size of each file, but is chosen to be the smallest number which ensures the internet connection is fully busy substantially all of the time.

In one implementation, when choosing what order to download or access the data in, the audio is given highest priority (with earlier audio having priority over later audio), then the key frames, and then the delta frames (within each chunk) in the order required for decompression with the earliest first.

There is provided a method of receiving video data comprising the steps of: receiving at least one chunk of video data comprising a number (n) of sequential key video frames where the number (n) is at least two and, constructing at least one delta frame (C) between a nearest preceding key frame (E) and a nearest subsequent key frame (L) from data contained in the either or each of the nearest preceding and subsequent frames.

The method may be one wherein the delta frame (C) is composed of a plurality of component blocks or pixels and each component of the delta frame is constructed according to data indicating it is one of:
  (a) the same as the corresponding component in the nearest preceding key frame (E), or
  (b) the same as the corresponding component in the nearest subsequent key frame (L), or (c) a new value compressed using some or all of the spatial compression of frame C, and information from the nearest preceding and subsequent frames.

The method may be one wherein after the step of construction, the delta frame is treated as a key frame for the construction of one or more delta frames.

The method may be one wherein delta frames continue to be constructed in a chunk until either: a sufficiently good predetermined image playback quality criterion is met or the time constraints of playing the video in real time require the frames to be displayed.

The method may be one wherein the number of key frames is in the range from n=3 to n=10.

The method may be one comprising downloading the video data across the internet.

The method may be one comprising downloading each key frame in a separate download slot, the number of said download slots equating to the maximum number of download slots supportable by the internet connection at any moment in time.

The method may be one wherein each slot is implemented in a separate thread.

The method may be one wherein each frame is cached upon first viewing to enable subsequent video editing.

The method may be one wherein the key frames are cached.

There is provided a media player configured to implement the method according to any one of the above statements.

The media player may be one having: a receiver to receive chunks of video data including at least two key frames, a processor adapted to construct a delta frame sequentially between a nearest preceding key frame and a nearest subsequent key frame.

There is provided a method of compressing video data so that the video can be streamed across a limited bandwidth connection with no loss of quality on displayed frames, the method comprising storing video frames at various temporal resolutions which can be accessed in a pre-defined order, stopping at any point.

The method may be one where multiple simultaneous internet accesses can ensure a fairly stable frame rate over a connection by simultaneously loading the first or subsequent temporal resolution groups of frames from each of a number of non-intersecting subsets of consecutive video frames until either all the frames in the group are downloaded, or until a predetermined time has elapsed, and then in starting a new group.

There is provided a method of compressing video data with no loss of frame image quality on the displayed frames, by varying the frame rate relative to the original source video, the method comprising the steps of:
  receiving at least two chunks of uncompressed video data, each chunk comprising at least two sequential video frames and,
  compressing at least one frame in each chunk as a key frame, for reconstruction without the need for data from any other frames,
  compressing at least one intermediate frame as a delta frame between a nearest preceding key frame and a nearest subsequent key frame from data contained in either or each of the nearest preceding and subsequent frames,
  wherein further intermediate frames are compressed as further delta frames within the same chunk, by treating any previously compressed delta frame as a key frame for constructing said further delta frames, and
  storing the compressed video frames at various mutually exclusive temporal resolutions, which are accessed in a pre-defined order, in use, starting with key frames, and followed by each successive granularity of delta frames, stopping at any point; and
  wherein the frame rate is progressively increased as more intermediate data is accessed.

The method may be one wherein the delta frame is composed of a plurality of component blocks or pixels and each component of the delta frame is constructed according to data indicating it is one of:
  (a) the same as the corresponding component in the nearest preceding key frame, or
  (b) the same as the corresponding component in the nearest subsequent key frame, or
  (c) a new value compressed using some or all of the spatial compression of frame, and information from the nearest preceding and subsequent frames.

The method may be one wherein after the step of construction, the delta frame is treated as a key frame for the construction of one or more delta frames.

The method may be one wherein delta frames continue to be constructed in a chunk until either: a predetermined image playback quality criterion, including a frame rate required by an end-user, is met or the time constraints of playing the video in real time require the frame to be displayed.

The method may be one wherein the number of frames in a chunk is $2^n$, and n is in the range from n=3 to n=10.

The method may be one comprising downloading the video data across the internet.

The method may be one comprising downloading each key frame in a separate download slot, the number of said download slots equating to the minimum number to fully utilize the internet connection.

The method may be one wherein each slot is implemented in a separate thread.

The method may be one wherein each frame is cached upon first viewing to enable subsequent video editing.

The method may be one wherein the key frames are cached.

There is provided a method of processing video data comprising the steps of:
  receiving at least one chunk of video data comprising $2^n$ frames and one key video frame, and the next key video frame;
  constructing a delta frame (C) equidistant between a nearest preceding key frame (E) and a nearest subsequent key frame (L) from data that includes data contained in either or each of the nearest preceding and subsequent key frames;

constructing additional delta frames equidistant between a nearest preceding key frame and a nearest subsequent key frame from data that includes data contained in either or each of the nearest preceding and subsequent key frames, wherein at least one of the nearest preceding key frame or the nearest subsequent key frame is any previously constructed delta frame; storing the additional delta frames at various mutually exclusive temporal resolutions, which are accessible in a predefined order, in use, starting with the key frames, and followed by each successive granularity of delta frames, stopping at any point; and continuing to construct the additional delta frames in a chunk until either a predetermined image playback quality criterion, including a user selected frame rate, is achieved, or a time constraint associated with playing of the chunk of video data in real time requires the frames to be displayed.

The method may be one further comprising downloading the at least one chunk of video data at a frame rate that is less than an original frame rate associated with the received video data.

The method may be one further comprising determining a speed associated with the receipt of the at least one image chunk, and only displaying a plurality of constructed frames in accordance with the time constraint and the determined speed.

A Method for Enabling Efficient Navigation of Video

This section of this document relates to disclosures made in EP1738365B1, WO2005101408A1 and U.S. Pat. No. 8,255,802B2, which may relate to the inventions of the present document.

A method is provided of facilitating navigation of a sequence of source images, the method using tokens representing each source image which are scaled versions of each source image and which are arranged adjacently on a display device in a continuous band of token images so that a pointer device can point to a token and the identity of the corresponding image is available for further processing.

Visual recordings of moving things are generally made up of sequences of successive images. Each such image represents a scene at a different time or range of times. This disclosure relates to recordings including sequences of images such as are found, for example, in video, film and animation.

The common video standard PAL used in Europe comprises 25 frames per second. This implies that an hour of video will include nearly 100,000 frames. Other video formats, such as the NTSC standard used in the USA and Japan, have similar number of frames per hour as PAL.

A requirement for a human operator to locate accurately and to access reliably a particular frame from within many can arise. One application where this requirement arises is video editing. In this case, the need may not just be for accurate access on the scale of individual frames, but also easy access to different scenes many frames apart.

In other words, there is a need to be able to access video frames over a range of time scales which may be up to five or six orders of magnitude apart.

The disclosure provided herein includes a method for enabling efficient access to video content over a range of temporal scales.

Assume there is a source which contains images making up a video, film, animation or other moving picture. Images in the source are digitised and labelled with frame numbers where later times correspond to bigger frame numbers and consecutive frames have consecutive frame numbers.

Each image is given an associated token image, which may be a copy of the source image. In practice, these source images may be too big to fit many on a display device such as a computer screen, a smartphone screen, or a tablet screen, at the same time. In this case, the token image will be a reduced size version of the original image. The token images are small enough that a number of token images can be displayed on the display device at the same time. In an application according to this disclosure, this size reduction is achieved by averaging a number of pixels in the source image to give each corresponding pixel in the smaller token images. There are many tools available to achieve this. In this application, there are typically between ten and fifty token images visible at a time.

Figure 13:
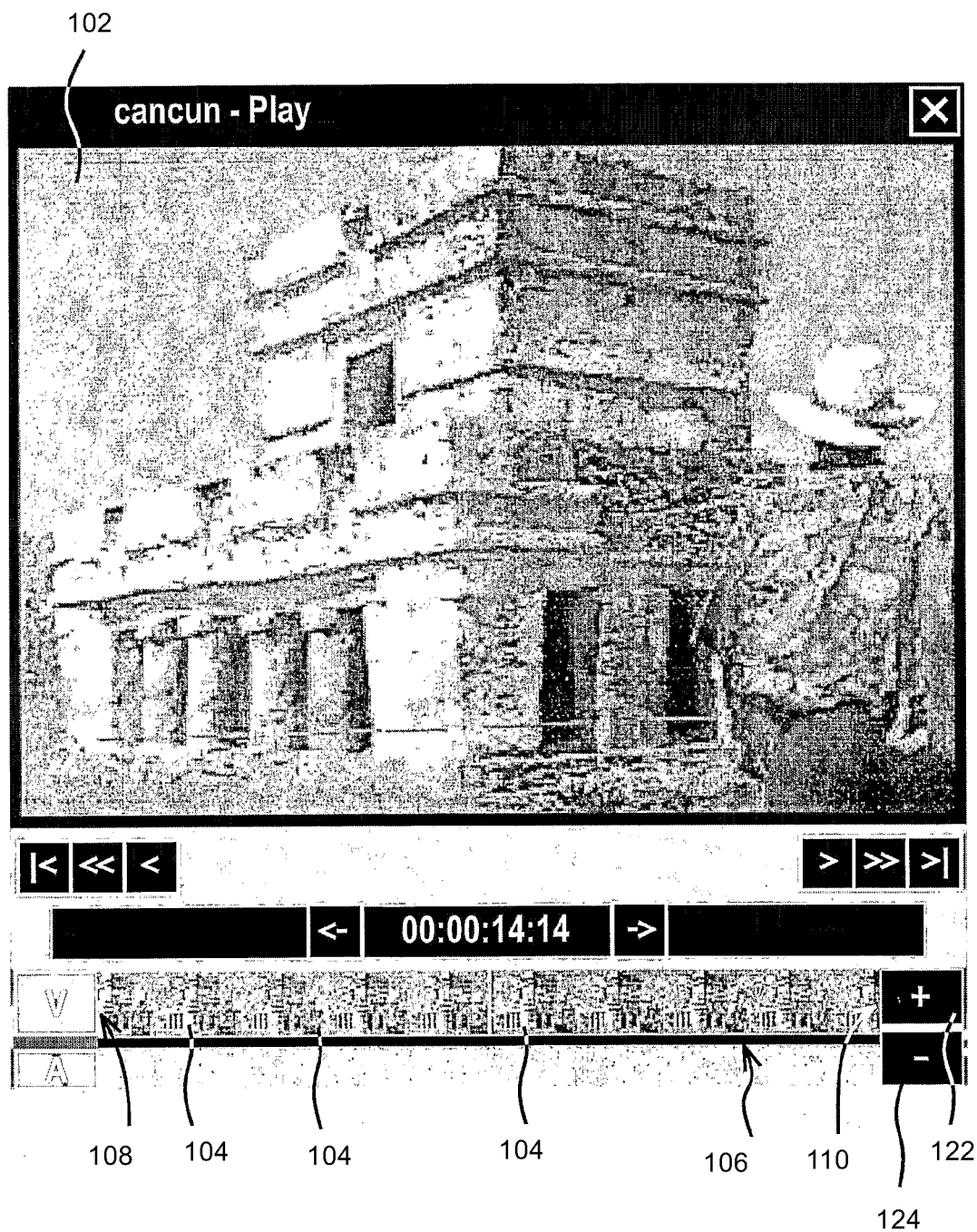
FIG. 13 is an example of a computer display providing a method of enabling efficient navigation of video.

Referring to FIG. 13, in an example, there is provided a computer display whose resolution is 1024×768 pixels, and the images (102) from the source video are digitised at 320×240 pixels, and the tokens (104) representing the source images are 32×24 pixels. In one commercial application, the token images have the same aspect ratio as the original images.

The token images are then combined consecutively with no gaps between them in a continuous band (106) which is preferably horizontal. This band is then displayed on the computer screen, although if the source is more than a few images in length, the band will be wider than the available display area, and only a subset of it will be visible at any one time.

The video is navigated to frame accuracy by using a pointing device, such as a mouse, which is pointed at a particular token within the horizontal band. This causes the original image corresponding to this token to be selected. Any appropriate action can then be carried out on the selected frame. For example, the selected frame can then be displayed. In another example, the time code of the selected frame can be passed on for further processing. In a further example, the image pixels of the selected frame can be passed on for further processing.

In a further refinement, in one implementation, when the pointing device points near to the edge (108) or (110) of the displayed subset of the horizontal band, the band automatically and smoothly scrolls so that the token originally being pointed to moves towards the centre of the displayed range. This allows access beyond the original displayed area of the horizontal band.

Figure 14:
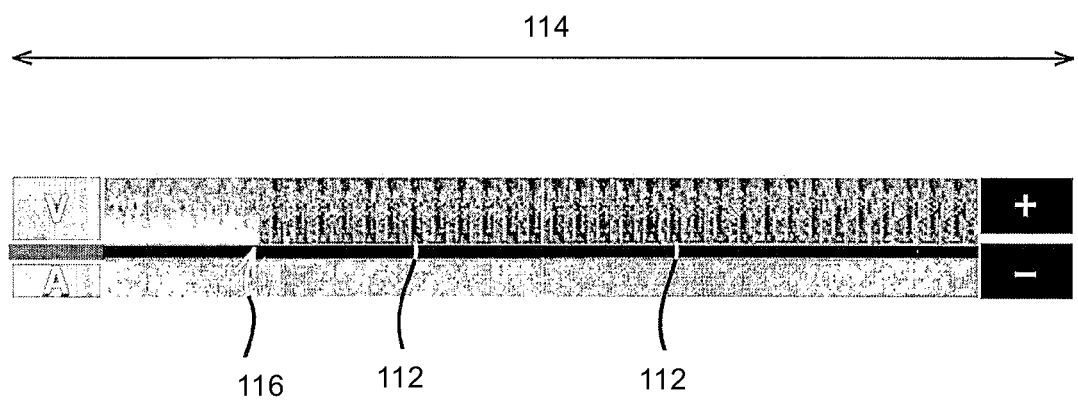
FIG. 14 is an example of a sequence of source image frames processed to provide a method of enabling efficient navigation of video.

The above description therefore shows how frame accurate access is simple for short clips. The same principle can be extended to longer sequences of source image frames, as illustrated for example in FIG. 14.

Each token is reduced in size, but this time only horizontally. This reduction leaves each new token (112) at least one pixel wide. Where the reduction in size is by a factor of x, the resulting token is called an x-token within this document. So, for example, 2-tokens are half the width of tokens, but the same height. The x-tokens are then displayed adjacent to each other in the same order as the original image frames to create a horizontal band as with the tokens, but with the difference that more of these x-tokens fit in the same space than the corresponding tokens, by a factor of x.

Navigation proceeds as before, the difference being that each x-token is narrower than before, so that more of them are visible than with the original tokens, and a smaller pointer movement is needed to achieve the same movement in frames.

In one such implementation, the space (114) allocated to the horizontal band for tokens and x-tokens is 320 pixels. The tokens (104) are 32×24 pixels, and the x-tokens (112)

are created in a variety of sizes down to 1×24 pixels. In the 32-token case, the horizontal band corresponds to 320 frames of video, compared with ten frames for the token image. This range of 320 frames can be navigated successfully with the pointer.

This design is a significant departure from existing commercial systems where instead of a horizontal band made of all the x-tokens, the corresponding band may contain one token in every x. In this disclosure, subject to the colour resolution of the display device, every pixel in every image contributes some information to each horizontal band. Even with x-tokens only one pixel wide, the position of any cut (116) on the source is visible to frame accuracy, as are sudden changes in the video content.

Figure 15:
FIG. 15 is an example of additional horizontal reductions, in a method of enabling efficient navigation of video.

The x-tokens are fine for navigating short clips, but to navigate longer sources, further horizontal reductions are required, see e.g. FIG. 15. In the case where each horizontal pixel on the horizontal display band represents y frames, the horizontal band made of 1 pixel wide x-tokens is squashed horizontally by a factor of y. If y is an integer, this is achieved by combining y adjacent non-intersecting sets of 1 pixel wide x-tokens (by for example averaging) to make a y-token one pixel wide and the same height as the tokens. Significant changes of video content (118, 120) can still be identified, even for quite large values of y.

In one implementation, values of x and y used are powers of two, and the resulting horizontal display bands represent all scales from 0 frames to 5120 frames. Larger values of y will be appropriate for longer videos.

In the x-tokens and y-tokens, the values of x and y need not be integers, although appropriate weightings between vertical lines within image frames and between image frames will then be needed if image artefacts are to be avoided.

In one implementation, the tokens, x-tokens and y-tokens are created in advance of their use for editing in order to facilitate rapid access to the horizontal bands. The x-tokens and y-tokens are created at multiple resolutions. Switching between horizontal bands representing different scales is facilitated by zoom in and zoom out buttons (122, 124) which move through the range of horizontal contractions available.

There is provided a method of facilitating navigation of a sequence of source images, the method using tokens representing each source image which are scaled versions of each source image and which are arranged adjacently on a display device in a continuous band of token images so that a pointer device can point to a token and the identity of the corresponding image is available for further processing.

The method may be one where one or more new bands can be constructed by squashing the band in the longitudinal direction by one or more factors in each case squashing by a factor which is no wider than the pixel width of the individual tokens making up the band.

The method may be one where neighbouring tokens are first combined to make new tokens corresponding to multiple frames and these new tokens are arranged next to each other in a band. The method may be one where the widths and heights of different tokens differ. The method may be one in which the band is arranged horizontally on a display device together with a normal video display generated from the source images. The method may be one which is so arranged that, when the pointer device points to a token near to the edge of the displayed subset of the continuous band, the band automatically scrolls, so that the token moves towards the centre of the displayed range, thereby allowing access to a region beyond the original displayed area.

Further Disclosures, which May Relate to the Inventions of the Present Document

WO2017021688A1 discloses a method of encoding a series of frames in a video or media, including receiving a first key frame, receiving subsequent chunks of frames including at least one key frame, dividing each frame into a plurality of blocks, subdividing a first block of the plurality of blocks into a plurality of pixel groups, averaging the pixels in each pixel group to generate a single value, creating a first mini-block wherein each element of said first mini block corresponds with a pixel group of the corresponding first block and contains said single value, repeating for each block of each frame of the chunk, comparing a first of said plurality of mini blocks of a first frame with mini blocks of a second frame, where said second frame mini blocks are not necessarily aligned to mini blocks in the first frame, until a best match is achieved.

WO2018127695A2 discloses a method for encoding and decoding a video stream comprising dividing the video stream into a first Key frame, and subsequent chunks each comprising $2^n$ frames, each chunk including a Key frame and $2^{n-1}$ Delta ($D^x$) frames, where x is a positive integer and denotes the level of the Delta frame, and where $2^{x-1}$ denotes the number of Delta frames at that level in the chunk; the method including the step of constructing $D^x$ level frames from adjacent Earlier and Later $D^y$ frames, (where y<x and where for y=0, $D^y$ is a Key frame), for all frames in a chunk where x>0; wherein the constructing step includes: dividing the frame into Motion Regions representing groups of pixels; determining a pixel group in an Earlier (E: $D^y$) and later (L: $D^y$) frame that is a best match for a pixel group in a Motion Region of a Current (C: $D^x$) frame; determining motion vectors for the best matches for Motion Regions, or by intra-frame compression of frame C. The method is characterised by eliminating unnecessary information when building a bitstream such that as x increases, motion vector and other data relating to a combination of $D^x$ frames (more numerous than the $D^{x-1}$ frames) is represented by a quantity of data in the bitstream that, for a typical video, increases at a much lower rate than the quantity of frames in $D^x$ compared to the quantity of frames in $D^{x-1}$.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer-implemented method of providing a personalized video, the method including the steps of:
   (i) receiving one or more video files;
   (ii) converting the one or more video files into a compressed format structure;
   (iii) storing the compressed format structure on a first server;
   (iv) receiving a request from a user of a user terminal to provide in a web browser executing on the user terminal, or in a video player executing on the user terminal, a personalized video play corresponding to a personalized video defined by the compressed format structure and a personalized electronic edit decision list;

(v) accessing a profile of the user of the user terminal;

(vi) accessing a record corresponding to the compressed format structure, the record including a record of respective portions of the compressed format structure corresponding to respective portions of video that have been selected by respective other users;

(vii) accessing profiles of the respective other users, and identifying which respective other users' profiles most closely match the profile of the user;

(viii) identifying portions of the compressed format structure corresponding to the respective portions of video which have been selected by the respective other users whose profiles most closely match the profile of the user;

(ix) generating a personalized electronic edit decision list which generates from the compressed format structure a personalized video which provides respective portions of the one or more videos which have been selected by the respective other users whose profiles most closely match the profile of the user, and storing the personalized electronic edit decision list e.g. on the first server or on a second server, or on the user terminal;

(x) sending or providing to the web browser code executable in the web browser, or to the video player code executable in the video player, to provide the personalized video play corresponding to the personalized video defined by the compressed format structure stored on the first server and the personalized electronic edit decision list e.g. stored on the first server or on the second server, or on the user terminal, and (xi) responding to requests from the code when executing in the web browser or in the video player, to provide content corresponding to the compressed format structure stored on the first server, in accordance with the personalized electronic edit decision list, e.g. stored on the first server or on the second server, or on the user terminal, to the web browser or to the video player, to provide the personalized video play.

2. The method of claim 1, wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy.

3. The method of claim 1, wherein the compressed format structure includes loss free compression.

4. The method of claim 3, in which the loss free compression includes use of Transition Tables.

5. The method of claim 1, wherein the user can share the personalized EDL with another user.

6. The method of claim 1, wherein the personalized electronic edit decision list is generated according to a user selected duration of the personalized video, by using respective portions of the one or more videos which have been selected by the respective other users whose profiles most closely match the profile of the user, to provide the user selected duration of the personalized video.

7. The method of claim 1, wherein the personalized electronic edit decision list is generated according to a user selected proportion (e.g. a percentage) of the duration of the one or more videos, by using respective portions of the one or more videos which have been selected by the respective other users whose profiles most closely match the profile of the user, to provide the user selected proportion (e.g. a percentage) of the duration of the personalized video.

8. The method of claim 1, in which one or more advertisements are selected for inclusion in the personalized video play, according to the user profile.

9. The method of claim 8, in which the one or more advertisements are selected using an artificial intelligence (AI) system which uses the user profile as an input.

10. The method of claim 8, in which the video Player supports click through, allowing viewers to click and order online, while the video Player waits to resume.

11. The method of claim 1, wherein the video player provides multiple options, which are set at a video publishing time, including, but not limited to, how navigation options are displayed, whether clipping is allowed, which sharing destinations (such as a new web page, email and/or combinations of social media) are allowed, which resize and embed options are available, whether the media plays automatically or needs a (usually manual) trigger, which manual or automated feedback options are available, as well as monetisation options.

12. The method of claim 1, wherein the method reduces global emissions of $CO_2$ compared to prior art methods, which is environmentally beneficial.

13. The method of claim 1, wherein the user terminal is a desktop computer, or a laptop computer, or a smart TV, or a smartphone, or a tablet computer, or a smartwatch.

14. A computer-implemented method of providing a personalized video, the method including the steps of:

(i) receiving one or more video files;

(ii) converting the one or more video files into a compressed format structure;

(iii) storing the compressed format structure on a first server;

(iv) storing on the first server metadata which characterizes portions of the one or more video files by viewing statistics;

(v) receiving a request from a user of a user terminal to provide in a web browser executing on the user terminal, or in a video player executing on the user terminal, a personalized video play corresponding to a personalized video defined by the compressed format structure and a personalized electronic edit decision list;

(vi) receiving a user-defined metric which defines a personalization metric to be used to provide the personalized video;

(vii) accessing the metadata which characterizes portions of the one or more video files by viewing statistics, and using the metadata to identify the portions of the one or more video files which best match the user-defined metric;

(viii) using the identified portions of the one or more video files to identify portions of the compressed format structure corresponding to the identified portions of the one or more video files which best match the user-defined metric;

(ix) generating the personalized electronic edit decision list which generates from the compressed format structure a personalized video which provides the identified portions of the one or more video files which best match the user-defined metric, and storing the personalized electronic edit decision list e.g. on the first server or on a second server, or on the user terminal;

(x) sending or providing to the web browser code executable in the web browser, or to the video player code executable in the video player, to provide the personalized video play corresponding to the personalized video defined by the compressed format structure stored on the first server and the personalized electronic edit decision list e.g. stored on the first server or on the second server, or on the user terminal, and (xi) responding to requests from the code when executing in the web browser or in the video player, to provide content corresponding to the compressed format structure stored on the first server, in accordance with the personalized electronic edit decision list, e.g. stored on the first server or on the second server, or on the user terminal, to the web browser or to the video player, to provide the personalized video play.

15. The method of claim 14, wherein metadata which characterizes portions of the one or more video files by viewing statistics relate to one or more of: the most watched content; the least skipped content; the most engaged-with content; the most shared content.

16. The method of claim 14, wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy.

17. The method of claim 14, wherein the video player uses a microphone and/or video camera to monitor and to measure user engagement while the user watches videos, and wherein the video player uses the measured user engagement of the user to choose which portions of one or more video files best match the measured user engagement, and generates an EDL to show the portions of one or more video files which best match the measured user engagement, and then plays a personalized video using the EDL.

18. A computer-implemented method of providing a personalized video, the method including the steps of:

(i) receiving a plurality of video files;

(ii) converting the plurality of video files each into a compressed format structure;

(iii) storing the plurality of video files each in the compressed format structure on a first server;

(iv) storing on the first server metadata which characterizes portions of the plurality of video files by content type;

(v) a video player executing on a user terminal using a microphone and/or video camera of the user terminal to monitor and to measure user engagement while the user watches videos using the video player, and storing the measured user engagement of the user on the user terminal;

(vi) the video player executing on the user terminal identifying the content types with the highest user engagement, using the metadata and the stored measured user engagement of the user;

(vii) the video player executing on the user terminal selecting a video for display, based on a match between the identified content types with the highest user engagement, with a video including content corresponding to the identified content types with the highest user engagement, based on metadata of the video; and (viii) the video player displaying the selected video, or offering to display the selected video.

19. The method of claim 18, wherein the video player uses the identified content types with the highest user engagement to choose which portions of the video file best match the measured user engagement, and to generate a personalized electronic edit decision list, wherein the personalized electronic edit decision list generates from the compressed format structure a personalized video which provides the chosen portions of the video file which best match the measured user engagement, and storing the personalized electronic edit decision list e.g. on the user terminal;

the video player executing code to provide the personalized video play corresponding to a personalized video defined by the compressed format structure stored on the first server and the personalized electronic edit decision list e.g. stored on the user terminal, and responding to requests from the code when executing in the video player, to provide content corresponding to the compressed format structure stored on the first server, in accordance with the personalized electronic edit decision list, e.g. stored on the user terminal, to the video player, to provide the personalized video play.

20. The method of claim 18, wherein the compressed format structure includes a hierarchy of levels of temporal resolution of frames, each respective level of the hierarchy including frames corresponding to a respective temporal resolution of the respective level of the hierarchy, but not including frames which are included in any (e.g. one or more) lower levels of lower temporal resolution of frames of the hierarchy.

* * * * *